(12) United States Patent
Aotsu et al.

(10) Patent No.: US 12,448,362 B2
(45) Date of Patent: *Oct. 21, 2025

(54) FLUORINE-CONTAINING PYRIMIDINE COMPOUND AND FLUORINE-CONTAINING PYRIMIDINONE COMPOUND

(71) Applicant: UNIMATEC CO., LTD., Tokyo (JP)

(72) Inventors: Rie Aotsu, Kitaibaraki (JP); Junya Seino, Kitaibaraki (JP); Keisuke Kokin, Kitaibaraki (JP)

(73) Assignee: UNIMATEC CO., LTD. (JP)

( * ) Notice: Subject to any disclaimer, the term of this patent is extended or adjusted under 35 U.S.C. 154(b) by 528 days.

This patent is subject to a terminal disclaimer.

(21) Appl. No.: 17/923,250

(22) PCT Filed: May 18, 2021

(86) PCT No.: PCT/JP2021/018719
§ 371 (c)(1),
(2) Date: Nov. 4, 2022

(87) PCT Pub. No.: WO2021/235420
PCT Pub. Date: Nov. 25, 2021

(65) Prior Publication Data
US 2025/0223274 A1  Jul. 10, 2025

(30) Foreign Application Priority Data
May 19, 2020  (JP) ................. 2020-087729

(51) Int. Cl.
*C07D 401/04* (2006.01)
*A01N 43/54* (2006.01)
*A01P 3/00* (2006.01)

(52) U.S. Cl.
CPC ........... *C07D 401/04* (2013.01); *A01N 43/54* (2013.01); *A01P 3/00* (2021.08)

(58) Field of Classification Search
CPC .................................................. C07D 401/04
See application file for complete search history.

(56) References Cited

U.S. PATENT DOCUMENTS

| 5,250,530 A | 10/1993 | Giencke et al. |
| 2004/0033896 A1 | 2/2004 | Koether et al. |

(Continued)

FOREIGN PATENT DOCUMENTS

| CN | 101460475 A | 6/2009 |
| CN | 101903351 A | 12/2010 |

(Continued)

OTHER PUBLICATIONS

Office Action issued in corresponding Indian Patent Application No. 202237067044 dated Sep. 29, 2023, with English translation (6 Pages).

(Continued)

*Primary Examiner* — Valerie Rodriguez-Garcia
(74) *Attorney, Agent, or Firm* — Harness, Dickey & Pierce, P.L.C.

(57) ABSTRACT

A fluorine-containing pyrimidine compound is provided represented by general formula (1), (2), or (3):

[Formula 1]

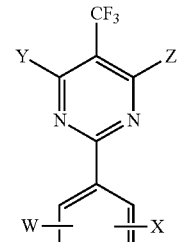

(1)

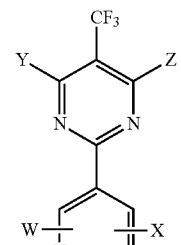

(2)

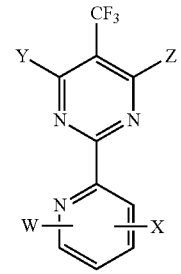

(3)

wherein: W and X each independently represent a hydrogen atom, a halogen atom, a hydrocarbon group having 1 to 10 carbon atoms, $-C_nF_{2n+1}$ where n is an integer of 1 to 10, a nitro group, $-OA^1$, $-SO_mA^1$, $-SA^1$, $-NA^1A^2$, $-B(OA^1)(OA^2)$, $-COA^1$, $-COOA^1$, or $-CONA^1A^2$; Y represents a halogen atom, a hydrocarbon group having 1 to 10 carbon atoms, $-C_nF_{2n+1}$ where n is an integer of 1 to 10, a cyano group, a nitro group, $-OA^1$, $-SO_mA^1$, $-SA^1$, $-NA^1A^2$, $-B(OA^1)(OA^2)$, $-COA^1$, $-COOA^1$, or $-CONA^1A^2$; Z represents a halogen atom or $-OA^3$; $A^1$ and $A^2$ each independently represent a hydrogen atom or a (Continued)

hydrocarbon group having 1 to 10 carbon atoms; and $A^3$ represents a hydrocarbon group having 1 to 12 carbon atoms.

4 Claims, No Drawings

(56) References Cited

U.S. PATENT DOCUMENTS

| | | | |
|---|---|---|---|
| 2008/0132522 | A1 | 6/2008 | Rheinheimer et al. |
| 2009/0105072 | A1 | 4/2009 | Grammenos et al. |
| 2009/0275590 | A1 | 11/2009 | Guzzo et al. |
| 2010/0144760 | A1 | 6/2010 | Alvaro et al. |
| 2011/0021486 | A1 | 1/2011 | Beaulieu et al. |
| 2012/0214783 | A1 | 8/2012 | Beaulieu et al. |
| 2013/0216498 | A1 | 8/2013 | Eastwood et al. |
| 2013/0331391 | A1 | 12/2013 | Beaulieu et al. |
| 2014/0206696 | A1 | 7/2014 | Guzzo et al. |
| 2014/0221366 | A1 | 8/2014 | Heinrich et al. |
| 2016/0157489 | A1 | 6/2016 | Shioda et al. |
| 2016/0159798 | A1 | 6/2016 | Guzzo et al. |
| 2016/0237059 | A1 | 8/2016 | Straub et al. |
| 2016/0257641 | A1 | 9/2016 | Kobayashi et al. |
| 2016/0264567 | A1 | 9/2016 | Yuen et al. |
| 2017/0204095 | A1 | 7/2017 | Guzzo et al. |
| 2017/0267672 | A1 | 9/2017 | Stoller et al. |
| 2020/0123157 | A1 | 4/2020 | Carswell et al. |
| 2020/0267980 | A1 | 8/2020 | Wailes et al. |
| 2021/0403455 | A1 | 12/2021 | Seino et al. |

FOREIGN PATENT DOCUMENTS

| | | | |
|---|---|---|---|
| CN | 102695706 | A | 9/2012 |
| CN | 110036006 | A | 7/2019 |
| CN | 112739689 | A | 4/2021 |
| EP | 0407899 | A2 | 1/1991 |
| EP | 3892617 | A1 | 10/2021 |
| JP | S59104364 | A | 6/1984 |
| JP | H7-118235 | A | 5/1995 |
| JP | 2011-506491 | A | 3/2011 |
| JP | 2013-515688 | A | 5/2013 |
| JP | 6802416 | B2 | 12/2020 |
| WO | 98-009960 | A1 | 3/1998 |
| WO | 99-028301 | A1 | 6/1999 |
| WO | 2009-089482 | A1 | 7/2009 |
| WO | 2010-063663 | A1 | 6/2010 |
| WO | 2013-004332 | A1 | 1/2013 |
| WO | 2015-016372 | A1 | 2/2015 |
| WO | 2015-036560 | A1 | 3/2015 |
| WO | 2015-056782 | A1 | 4/2015 |
| WO | 2016-030229 | A1 | 3/2016 |
| WO | 2016-113205 | A1 | 7/2016 |
| WO | 2016-128529 | A1 | 8/2016 |
| WO | 2018-055402 | A1 | 3/2018 |
| WO | 2019-057721 | A1 | 3/2019 |
| WO | 2020-116296 | A1 | 6/2020 |
| ZA | 199707427 | B | 3/1998 |

OTHER PUBLICATIONS

Extended European Search Report issued in corresponding European Patent Application No. 21808076.0 dated Jun. 7, 2024 (9 Pages).
First Office Action issued in corresponding Chinese Patent Application No. 202180034008.8 dated Aug. 12, 2023, with English translation (14 Pages).
Notice of Reasons for Refusal issued in corresponding Japanese Patent Application No. 20227524482 dated Aug. 29, 2023, with English translation (7 Pages).
Written Opinion of the International Searching Authority issued in PCT/JP2019/046489, mailed Feb. 10, 2020 with English Translation (7 pages).
Inouye, Y, et al., A Facile One-pot Preparation of 2-Methyl- and 2-Phenyl-4-fluoro-5-trifluoromethyl-6-methoxypyrimidine from Methyl 2-hydryl-2-(F-methyl)-F-propyl Ether, Journal of Fluorine Chemistry, 1985, 27 ( 2 ) , pp. 231-236, DOI 10.1016/S0022-1139(00)84991-X, entire text (6 pages).
Zhang, Pei-Zhi, et al., "Direct regioselective Csp2-H trifluoromethylation of pyrimidinones and pyridinones", Tetrahedron, vol. 72, 2016, pp. 3250-3255 (6 pages).
Yang, Bin, et al., "Visible-Light Photoredox Decarboxylation of Perfluoroarene Iodine(III) Trifluoroacetates for C—H Trifluoromethylation of (Hetero)arenes", ACS Catalysis, vol. 8,, pp. 2839-2843, Published 2018 (5 pages).
Ouyang, Yao, et al., Trifluoromethanesulfonic Anhydride as a Low-Cost and Versatile Trifluoromethylation Reagent, Angewandte Chem. Int. Ed 2018, vol. 57, pp. 6926-6929, 2018 (4 pages).
International Search Report (English and Japanese) and Written Opinion (in Japanese) of the International Searching Authority issued in PCT/JP2019/046489, mailed Feb. 10, 2020; ISA/JP (10 pages).
1st Chinese Office Action for corresponding Application No. CN 201980061589.7 dated Jul. 30, 2021 with English translation (15 pages).
European Search Report issued for the corresponding European Patent Application No. 19893651.0; dated Aug. 1, 2022 (total 6 pages).
Decision of Refusal issued in corresponding Chinese Patent Application No. 202180034008.8 dated Mar. 27, 2024, with English translation (10 Pages).
International Search Report (English and Japanese) issued in PCT/JP2021/018719, mailed Jul. 20, 2021; ISA/JP (5 pages).
Dubrovskiy, A. et al., "Comprehensive Organic Transformation: A Guide to Functional Group Preparations", 3rd Edition, Richard C. Larock, John Wiley & Sons Inc., 2018, Description (1 page).
Inouye, Y. et al., "A facile one-pot preparation of 2-methyl-and 2-phenyl-4-fluoro-5-trifluoromethyl-6-methoxypyrimidine", Journal of Flourine Chemistry, 1985, 27, p. 231-236 (6 pages).
International Preliminary Report on Patentability for corresponding International Application No. PCT/JP2021/018719 dated Jul. 20, 2021, with English translation (9 Pages).
Written Opinion for corresponding International Application No. PCT/JP2021/018719 dated Jul. 20, 2021, with English translation (8 Pages).
Notice of Reasons for Refusal issued in corresponding Japanese Patent Application No. 2022-524482 dated Dec. 12, 2023, with English translation (5 Pages).
Second Office Action issued in corresponding Chinese Patent Application No. 202180034008.8 dated Jan. 12, 2024, with English translation (5 Pages).

FLUORINE-CONTAINING PYRIMIDINE COMPOUND AND FLUORINE-CONTAINING PYRIMIDINONE COMPOUND

CROSS REFERENCE TO RELATED APPLICATIONS

This is the National Stage of International Application No. PCT/JP2021/018719, filed May 18, 2021, which claims the benefit of Japanese Patent Application No. 2020-087729 filed May 19, 2020.

BACKGROUND

Technical Field

The present disclosure relates to a fluorine-containing pyrimidine compound and a fluorine-containing pyrimidinone compound.

Related Art

It has been reported that fluorine-containing pyrimidine compounds have various biological activities. Among them, a compound having a pyridine ring at a 2-position and a trifluoromethyl group at a 5-position of the pyrimidine ring is expected to be used in pharmaceutical and agrochemical fields.

More specifically, it has been reported in International Publication Nos. WO 2009/089482 and WO 2015/056782 that 2-(4-pyridyl)-5-trifluoromethylpyrimidine derivatives have human melanin-concentrating hormone inhibitory activity and acetyl-CoA carboxylase 2 inhibitory activity. In International Publication Nos. WO 2015/016372, WO 2010/063663, WO 2013/004332, and WO 2016/030229, it has been reported that 2-(3-pyridyl)-5-trifluoromethylpyrimidine derivatives have bactericidal activity, insecticidal activity, orexin receptor inhibitory activity, focal adhesion kinase inhibitory activity, and acetyl-CoA carboxylase 2 inhibitory activity. In International Publication Nos. WO 2015/016372 and 1999/028301, it has been reported that 2-(2-pyridyl)-5-trifluoromethylpyrimidine derivatives have bactericidal activity, insecticidal activity, and herbicidal activity. From such viewpoints, there is an interest in introducing substituents into 4- and 6-positions of the pyrimidine ring in expectation of further improvement in activity.

In addition, it has been reported that pyridylpyrimidine derivatives have bactericidal activity. For example, it has been reported in Japanese Patent Application Laid-Open No. 7-118235 that a pyridylpyrimidine derivative having various substituents exhibits preventive and therapeutic control effects on many plant diseases such as rice blast, wheat eyespot, and apple scab.

It has been difficult to produce a fluorine-containing pyrimidine compound having a fluorine-containing substituent at a 5-position of a pyrimidine ring, a heterocyclic ring as a substituent at a 2-position of the pyrimidine ring, and substituents at 4- and the 6-positions of the pyrimidine ring from the viewpoint of reactivity and selectivity, and such a fluorine-containing pyrimidine compound has not been reported. The fluorine-containing pyrimidine compound has been expected to have various biological activities, and a novel fluorine-containing pyrimidine compound having substituents at the 4- and 6-positions of the pyrimidine ring and a heterocyclic ring as a substituent at the 2-position of the pyrimidine ring has been desired.

The present disclosure provides a novel fluorine-containing pyrimidine compound and a fluorine-containing pyrimidinone compound having substituents at the 4- and 6-positions of the pyrimidine ring and having a pyridine ring structure as the substituent at the 2-position of the pyrimidine ring, which have not been known heretofore.

SUMMARY

A fluorine-containing pyrimidine compound according to an embodiment of the present disclosure is represented by the following general formula (1), (2), or (3):

[Formula 1]

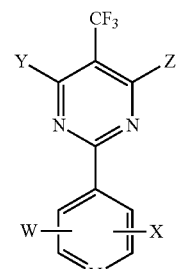

(1)

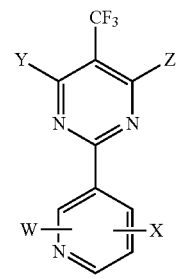

(2)

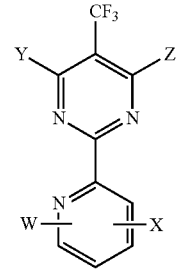

(3)

wherein:
W and X each independently represent a hydrogen atom, a halogen atom, a hydrocarbon group having 1 to 10 carbon atoms, $-C_nF_{2n+1}$ where n is an integer of 1 to 10, a nitro group, $-OA^1$, $-SO_mA^1$ where m is an integer of 1 to 3, $-SA^1$, $-NA^1A^2$, $-B(OA^1)(OA^2)$, $-COA^1$, $-COOA^1$, or $-CONA^1A^2$;
Y represents a halogen atom, a hydrocarbon group having 1 to 10 carbon atoms, $-C_nF_{2n+1}$ where n is an integer of 1 to 10, a cyano group, a nitro group, $-OA^1$, $-SO_mA^1$ where m is an integer of 1 to 3, $-SA^1$, $-NA^1A^2$, $-B(OA^1)(OA^2)$, $-COA^1$, $-COOA^1$, or $-CONA^1A^2$;
Z represents a halogen atom or $-OA^3$;
$A^1$ and $A^2$ each independently represent a hydrogen atom or a hydrocarbon group having 1 to 10 carbon atoms; and
$A^3$ represents a hydrocarbon group having 1 to 12 carbon atoms.

A fluorine-containing pyrimidinone compound according to an embodiment of the present disclosure is represented by the following general formula (31), (32), or (33):

[Formula 2]

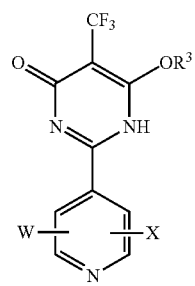

(31)

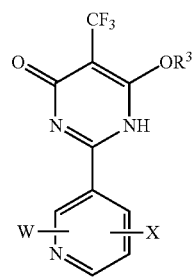

(32)

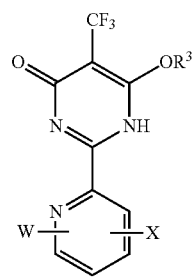

(33)

wherein:

$R^3$ represents a hydrogen atom or a hydrocarbon group having 1 to 12 carbon atoms;

W and X each independently represent a hydrogen atom, a halogen atom, a hydrocarbon group having 1 to 10 carbon atoms, —$C_nF_{2n+1}$ where n is an integer of 1 to 10, a nitro group, —$OA^1$, —$SO_mA^1$ where m is an integer of 1 to 3, —$SA^1$, —$NA^1A^2$, —$B(OA^1)(OA^2)$, —$COA^1$, —$COOA^1$, or —$CONA^1A^2$; and $A^1$ and $A^2$ each independently represent a hydrogen atom or a hydrocarbon group having 1 to 10 carbon atoms.

In one embodiment of the present disclosure, each of W and X is a hydrogen atom.

Effects of Disclosure

According to the present disclosure, it is possible to provide a novel fluorine-containing pyrimidine compound and a fluorine-containing pyrimidinone compound having substituents at the 4- and 6-positions of the pyrimidine ring and having a pyridine ring structure as the substituent at the 2-position of the pyrimidine ring.

DETAILED DESCRIPTION (Fluorine-Containing Pyrimidine Compound)

A fluorine-containing pyrimidine compound of the present embodiment is represented b the following general formula (1), 2), or (3):

[Formula 3]

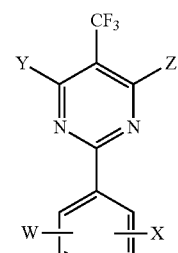

(1)

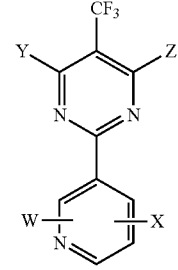

(2)

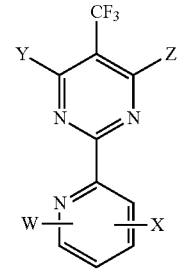

(3)

wherein:

W and X each independently represent a hydrogen atom, a halogen atom, a hydrocarbon group having 1 to 10 carbon atoms, —$C_nF_{2n+1}$ where n is an integer of 1 to 10, a nitro group, —$OA^1$, —$SO_mA^1$ where m is an integer of 1 to 3, —$SA^1$, —$NA^1A^2$, —$B(OA^1)(OA^2)$, —$COA^1$, —$COOA^1$, or —$CONA^1A^2$;

Y represents a halogen atom, a hydrocarbon group having 1 to 10 carbon atoms, —$C_nF_{2n+1}$ where n is an integer of 1 to 10, a cyano group, a nitro group, —$OA^1$, —$SA^1$, —$SO_mA^1$ where m is an integer of 1 to 3, —$SA^1$, —$NA^1A^2$, —$B(OA^1)(OA^2)$, —$COA^1$, —$COOA^1$, or —$CONA^1A^2$;

Z represents a halogen atom or —$OA^3$;

$A^1$ and $A^2$ each independently represent a hydrogen atom or a hydrocarbon group having 1 to 10 carbon atoms; and $A^3$ represents a hydrocarbon group having 1 to 12 carbon atoms.

When Z is a halogen atom, the halogen atom is F, Cl, Br, or I, preferably F or Cl.

When Z is —$OA^3$, $A^3$ represents a hydrocarbon group having 1 to 12 carbon atoms, and is not particularly limited as long as the hydrocarbon group having 1 to 12 carbon atoms is composed of a carbon atom and a hydrogen atom. Examples thereof include a chain hydrocarbon group, an aromatic hydrocarbon group, and an alicyclic hydrocarbon group. The chain hydrocarbon group is not particularly limited as long as the total number of carbon atoms is 1 to 12, and may be a linear hydrocarbon group or a branched chain hydrocarbon group. The aromatic hydrocarbon group is not particularly limited as long as the total number of carbon atoms is 6 to 12, and may be an aromatic hydrocarbon group having a substituent or an aromatic hydrocarbon group having no substituent. The aromatic hydrocarbon group may also have a condensed polycyclic structure. The alicyclic hydrocarbon group is not particularly limited as long as the total number of carbon atoms is 3 to 12, and may be an alicyclic hydrocarbon group having a substituent or an alicyclic hydrocarbon group having no substituent. The alicyclic hydrocarbon group may also have a bridged ring structure.

Examples of the chain hydrocarbon group include alkyl groups such as a methyl group, an ethyl group, an n-propyl group, an i-propyl group, an n-butyl group, an i-butyl group, a sec-butyl group, a ter-butyl group, a pentyl group, a hexyl group, a heptyl group, an octyl group, a nonyl group, a decyl group, an undecyl group, and a dodecyl group;

alkenyl groups such as an ethenyl group, a propenyl group, a butenyl group, a pentenyl group, a hexenyl group, a heptenyl group, an octenyl group, a nonenyl group, a decenyl group, an undecenyl group, and a dodecenyl group; and alkynyl groups such as an ethynyl group, a propynyl group, a butynyl group, a pentynyl group, a hexynyl group, a heptynyl group, an octynyl group, a nonynyl group, a decynyl group, an undecynyl group, and a dodecynyl group.

Examples of the aromatic hydrocarbon group include a phenyl group, a benzyl group, a tolyl group, and a naphthyl group. The tolyl group may be any of an o-tolyl group, an m-tolyl group, and a p-tolyl group, and a p-tolyl group is preferable.

Examples of the alicyclic hydrocarbon group include a saturated or unsaturated annular hydrocarbon group, and examples of the annular hydrocarbon group include a cyclopropyl group, a cyclobutyl group, a cyclohexyl group, a cyclopentyl group, an adamantyl group, and a norbornyl group.

W and X each independently represent a hydrogen atom, a halogen atom, a hydrocarbon group having 1 to 10 carbon atoms, —$C_nF_{2n+1}$ where n is an integer of 1 to 10, a nitro group, a boronic acid group, —$OA^1$, —$SO_mA^1$ where m is an integer of 1 to 3, —$SA^1$, —$NA^1A^2$, —$COOA^1$, or —$CONA^1A^2$, preferably represent a hydrogen atom, a halogen atom or a hydrocarbon group having 1 to 10 carbon atoms, and particularly preferably represent a hydrogen atom. W and X may be the same or different from each other.

In W and X, the halogen atom is F, Cl, Br or I, preferably F or Cl.

In W and X, the hydrocarbon group having 1 to 10 carbon atoms is not particularly limited as long as the hydrocarbon group is composed of a carbon atom and a hydrogen atom, and may be, for example, a hydrocarbon group having 1 to 10 carbon atoms among the hydrocarbon groups listed in $A^3$ above.

In W and X, —$C_nF_{2n+1}$ is not particularly limited as long as it is a perfluoroalkyl group being composed of a carbon atom and a fluorine atom, and may be linear or branched. In addition, n is an integer of 1 to 10, preferably an integer of 1 to 3.

In W and X, $A^1$ contained in —$OA^1$, —$SO_mA^1$, —$SA^1$, $COA^1$, and —$COOA^1$ represents a hydrogen atom or a hydrocarbon group having 1 to 10 carbon atoms. When $A^1$ represents a hydrocarbon group having 1 to 10 carbon atoms, a hydrocarbon group having 1 to 10 carbon atoms among the hydrocarbon groups listed in $A^3$ above can be used, for example. In addition, m is an integer of 1 to 3, preferably 1.

In W and X, $A^1$ and $A^2$ contained in —$NA^1A^2$ each independently represent a hydrogen atom or a hydrocarbon group having 1 to 10 carbon atoms. $A^1$ and $A^2$ may be the same or different from each other. When each of $A^1$ and $A^2$ represents a hydrocarbon group having 1 to 10 carbon atoms, a hydrocarbon group having 1 to 10 carbon atoms among the hydrocarbon groups listed in $A^3$ above can be used, for example.

In W and X, $A^1$ and $A^2$ contained in —$B(OA^1)(OA^2)$ each independently represent a hydrogen atom or a hydrocarbon group having 1 to 10 carbon atoms. $A^1$ and $A^2$ may be the same or different from each other. When each of $A^1$ and $A^2$ represents a hydrocarbon group having 1 to 10 carbon atoms, a hydrocarbon group having 1 to 10 carbon atoms among the hydrocarbon groups listed in $A^3$ above can be used, for example.

In W and X, $A^1$ and $A^2$ contained in —$CONA^1A^2$ each independently represent a hydrogen atom or a hydrocarbon group having 1 to 10 carbon atoms. $A^1$ and $A^2$ may be the same or different from each other. When each of $A^1$ and $A^2$ represents a hydrocarbon group having 1 to 10 carbon atoms, a hydrocarbon group having 1 to 10 carbon atoms among the hydrocarbon groups listed in $A^3$ above can be used, for example.

Y represents a halogen atom, a hydrocarbon group having 1 to 10 carbon atoms, —$C_nF_{2n+1}$ where n is an integer of 1 to 10, a cyano group, a nitro group, —$OA^1$, —$SO_mA^1$ where m is an integer of 1 to 3, —$SA^1$, —$NA^1A^2$, —$B(OA^1)(OA^2)$, —$COA^1$, —$COOA^1$, or —$CONA^1A^2$, and preferably represents a halogen atom, —$OA^1$, —$SO_mA^1$ where m is an integer of 1 to 3, —$SA^1$, or —$NA^1A^2$.

In Y, the halogen atom is F, Cl, Br or I, preferably F or Cl.

In Y, the hydrocarbon group having 1 to 10 carbon atoms is not particularly limited as long as the hydrocarbon group is composed of a carbon atom and a hydrogen atom, and may be, for example, a hydrocarbon group having 1 to 10 carbon atoms among the hydrocarbon groups listed in $A^3$ above.

In Y, —$C_nF_{2n+1}$ is not particularly limited as long as it is a perfluoroalkyl group being composed of a carbon atom and a fluorine atom, and may be linear or branched. In addition, n is an integer of 1 to 10, preferably an integer of 1 to 3.

In Y, $A^1$ contained in —$OA^1$, —$SO_mA^1$, —$SA^1$, $COA^1$, and —$COOA^1$ represents a hydrogen atom or a hydrocarbon group having 1 to 10 carbon atoms. When $A^1$ represents a hydrocarbon group having 1 to 10 carbon atoms, a hydrocarbon group having 1 to 10 carbon atoms among the hydrocarbon groups listed in $A^3$ above can be used, for example. In addition, m is an integer of 1 to 3, preferably 1 or 2.

In Y, $A^1$ and $A^2$ contained in —$NA^1A^2$ each independently represent a hydrogen atom or a hydrocarbon group having 1 to 10 carbon atoms. $A^1$ and $A^2$ may be the same or different from each other. When each of $A^1$ and $A^2$ represents a hydrocarbon group having 1 to 10 carbon atoms, a hydrocarbon group having 1 to 10 carbon atoms among the hydrocarbon groups listed in $A^3$ above can be used, for example.

In Y, $A^1$ and $A^2$ contained in —B($OA^1$)($OA^2$) each independently represent a hydrogen atom or a hydrocarbon group having 1 to 10 carbon atoms. $A^1$ and $A^2$ may be the same or different from each other. When each of $A^1$ and $A^2$ represents a hydrocarbon group having 1 to 10 carbon atoms, a hydrocarbon group having 1 to 10 carbon atoms among the hydrocarbon groups listed in $A^3$ above can be used, for example.

In Y, $A^1$ and $A^2$ contained in —$CONA^1A^2$ each independently represent a hydrogen atom or a hydrocarbon group having 1 to 10 carbon atoms. $A^1$ and $A^2$ may be the same or different from each other. When each of $A^1$ and $A^2$ represents a hydrocarbon group having 1 to 10 carbon atoms, a hydrocarbon group having 1 to 10 carbon atoms among the hydrocarbon groups listed in $A^3$ above can be used, for example.

Since a fluorine-containing pyrimidine compound in the present embodiment has a specific substituent (pyridyl group) at the 2-position of the pyrimidine ring and specific substituents (Z and —$CF_3$) at the 6- and 5-positions of the pyrimidine ring, the fluorine-containing pyrimidine compound can have excellent effects from the viewpoint of structural extensibility. In particular, the fluorine-containing pyrimidine compound in the present embodiment can be expected to have desired biological activities (for example, inhibitory activity of hormones and enzymes, bactericidal activity, insecticidal activity, and herbicidal activity), can be used as, for example, a compound having pharmacological activity or an intermediate thereof. Thus, the fluorine-containing pyrimidine compound can be expected as a bactericide or an intermediate thereof exhibiting a preventive or therapeutic control effects on many plant diseases, especially pathogenic bacteria such as cucumber powdery mildew. Specifically, the bactericide containing the fluorine-containing pyrimidine compound in the present disclosure is useful as a substance exhibiting a disinfecting effect on pathogenic bacteria of cucumber powdery mildew. The pyridine ring structure located at the 2-position of the pyrimidine ring may or may not have an additional substituent. When the pyridine ring structure has a substituent, additional properties are imparted to the fluorine-containing pyrimidine compound in the present embodiment. The fluorine-containing pyrimidine compound in the present embodiment is useful in the field of electronic materials such as organic semiconductors and liquid crystals.

(Method for Producing Fluorine-Containing Pyrimidine Compound)

In a method for producing a fluorine-containing pyrimidine compound in the present embodiment, the fluorine-containing pyrimidine compound can be produced, for example, by appropriately improving a known method described in reference documents such as Comprehensive Organic Transformation: A Guide to Functional Group Preparations, $3^{rd}$ Edition (Richard C. Larock, John Wiley & Sons Inc., 2018) or a method shown in Examples described later and using the methods in combination. Hereinafter, a part of the method for producing the fluorine-containing pyrimidine compound in the present embodiment will be exemplified.

Specific examples of the method for producing the fluorine-containing pyrimidine compound in the present embodiment include the following reactions.

<<Nucleophilic Substitution or Electrophilic Addition>>

(A) 4-Pyridyl Group-Containing Pyrimidine Compound (a-1)

A fluorine-containing pyrimidine compound represented by the following general formula (5) is obtained by reacting a pyridylpyrimidine derivative represented by general formula (4) with a nucleophile (Step (a-1)).

[Formula 4]

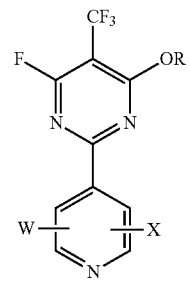

(4)

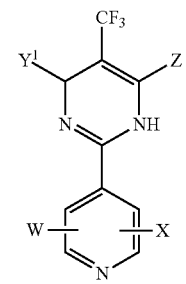

(5)

(a-2)

When $Y^1$ is —$SA^1$ in the general formula (5), S is optionally oxidized by additional reaction of a fluorine-containing pyrimidine compound represented by the following general formula (6) with hydrogen peroxide as an electrophile to give a fluorine-containing pyrimidine compound of the following general formula (7) (Step (a-2)).

[Formula 5]

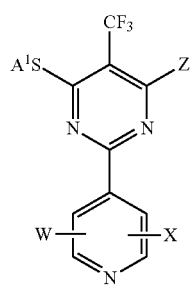

(6)

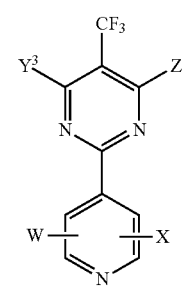

(7)

(In the general formula (7), $Y^3$ is $—SO_mA^1$, and m is an integer of 1 to 3.)

(a-3)

When $Y^1$ is a halogen atom in the general formula (5), a halogen atom of $Y^{1a}$ is optionally substituted by additional reaction of a fluorine-containing pyrimidine compound represented by the following general formula (5-1) with an amine, an alkoxide, a thiolate, an organometallic reagent, or a halogen atom different from $Y^{1a}$ as a nucleophile to give a fluorine-containing pyrimidine compound of the following general formula (7-1) (Step (a-3)).

[Formula 6]

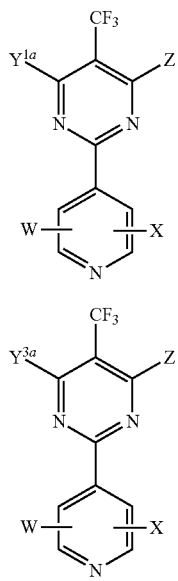

(5-1)

(7-1)

(In the general formula (5-1), $Y^{1a}$ is a halogen atom; in the general formula (7-1), $Y^{3a}$ is $—NA^1A^2$, $OA^1$, $SA^1$, a hydrocarbon group having 1 to 10 carbon atoms, or a halogen atom different from $Y^{1a}$, and $A^1$ and $A^2$ each independently represent a hydrogen atom or a hydrocarbon group having 1 to 10 carbon atoms.)

(a-4)

When $Y^1$ and Z are each $—OA^3$ in the general formula (5), an alkoxy group of a fluorine-containing pyrimidine compound represented by the following general formula (5-2) is optionally dealkylated, and then $—OA^3$ of $Y^{1b}$ and $Z^a$ are each substituted by reacting a halogen atom as a nucleophile to give a fluorine-containing pyrimidine compound of the following general formula (7-2) (Step (a-4)).

[Formula 7]

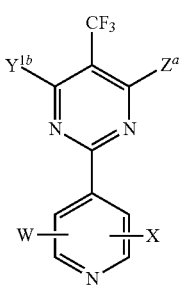

(5-2)

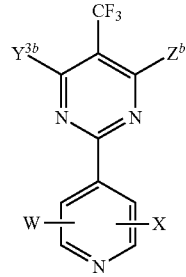

(7-2)

(In the general formula (5-2), $Y^{1b}$ and $Z^a$ are each $—OA^3$, and in the general formula (7-2), $Y^{3b}$ and $Z^b$ each represent a halogen atom.)

(a-5)

The halogen atom of $Y^{3b}$ is optionally substituted by additional reaction of the fluorine-containing pyrimidine compound represented by the general formula (7-2) with amine, hydroxide ion, alkoxide, or thiolate as a nucleophile and optionally the halogen atom of $Z^b$ to give a fluorine-containing pyrimidine compound represented by the following general formula (7-3) (Step (a-5)).

[Formula 8]

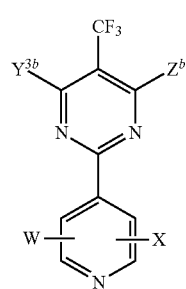

(7-2)

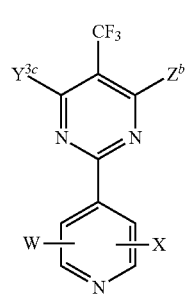

(7-3)

(In the general formula (7-3), $Y^{3c}$ represents $—NA^1A^2$, $OA^1$, or $SA^1$; and $Z^b$ represents a halogen atom or $OA^1$. $A^1$ and $A^2$ each independently represent a hydrogen atom or a hydrocarbon group having 1 to 10 carbon atoms.)

(B) 3-Pyridyl Group-Containing Pyrimidine Compound (b-1)

A fluorine-containing pyrimidine compound represented by the following general formula (9) is obtained by reacting a pyridylpyrimidine derivative represented by general formula (8) with a nucleophile (Step (b-1)).

[Formula 9]

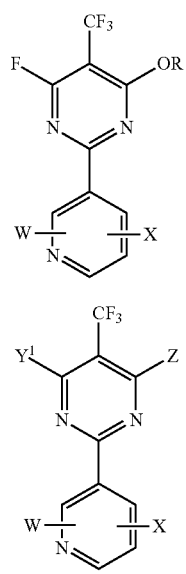

(8)

(9)

(b-2)
When $Y^1$ is $-SA^1$ in the general formula (9), S is optionally oxidized by additional reaction of a fluorine-containing pyrimidine compound represented by the following general formula (10) with an oxidizing agent such as hydrogen peroxide as an electrophile to give a fluorine-containing pyrimidine compound of the following general formula (11) (Step (b-2)).

[Formula 10]

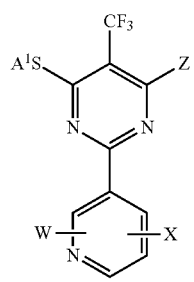

(10)

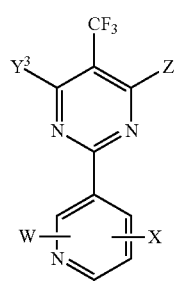

(11)

(In the general formula (11), $Y^3$ is $-SO_mA^1$, and m is an integer of 1 to 3.)

(b-3)
When $Y^1$ is a halogen atom in the general formula (9), a halogen atom of $Y^{1a}$ is optionally substituted by additional reaction of a fluorine-containing pyrimidine compound represented by the following general formula (9-1) with an amine, an alkoxide, a thiolate, an organometallic reagent, or a halogen atom different from $Y^{1a}$ as a nucleophile to give a fluorine-containing pyrimidine compound of the following general formula (11-1) (Step (b-3)).

[Formula 11]

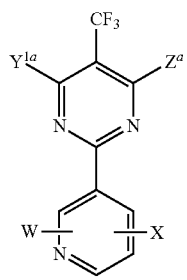

(9-1)

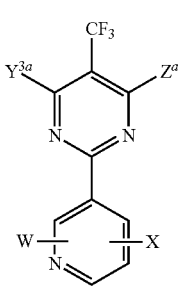

(11-1)

(In the general formula (9-1), $Y^{1a}$ is a halogen atom; in the general formula (11-1), $Y^{3a}$ is $-NA^1A^2$, $OA^1$, $SA^1$, a hydrocarbon group having 1 to 10 carbon atoms, or a halogen atom different from $Y^1$, and $A^1$ and $A^2$ each independently represent a hydrogen atom or a hydrocarbon group having 1 to 10 carbon atoms.)

(b-4)
When $Y^1$ and Z are each $-OA^3$ in the general formula (9), an alkoxy group of a fluorine-containing pyrimidine compound represented by the following general formula (9-2) is optionally dealkylated, and then $-OA^3$ of $Y^b$ and $Z^a$ are each substituted by reacting a halogen atom as a nucleophile to give a fluorine-containing pyrimidine compound of the following general formula (11-2) (Step (b-4)).

[Formula 12]

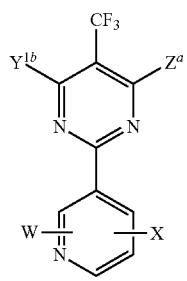

(9-2)

(11-2)

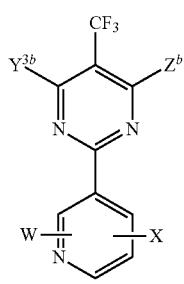

[Formula 14]

(12)

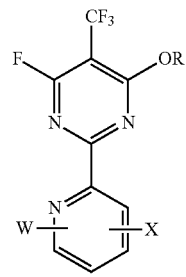

(In the general formula (9-2), $Y^{1b}$ and $Z^a$ are each —$OA^3$, and in the general formula (11-2), $Y^{3b}$ and $Z^b$ each represent a halogen atom.)

(b-5)

The halogen atom of $Y^{3b}$ is optionally substituted by additional reaction of the fluorine-containing pyrimidine compound represented by the general formula (11-2) with amine, hydroxide ion, alkoxide, or thiolate as a nucleophile and optionally the halogen atom of $Z^b$ to give a fluorine-containing pyrimidine compound represented by the following general formula (11-3) (Step (b-5)).

[Formula 13]

(11-2)

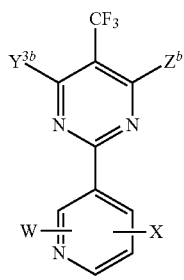

(13)

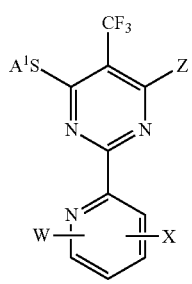

(c-2)

When $Y^1$ is —$SA^1$ in the general formula (13), S is optionally oxidized by additional reaction of a fluorine-containing pyrimidine compound represented by the following general formula (14) with an oxidizing agent such as hydrogen peroxide as an electrophile to give a fluorine-containing pyrimidine compound of the following general formula (15) (Step (c-2)).

[Formula 15]

(14)

(11-3)

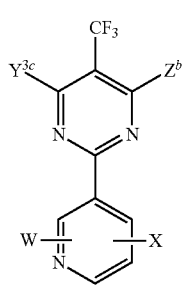

(15)

(In the general formula (11-3), $Y^3$ represents —$NA^1A^2$, $OA^1$, or $SA^1$; and $Z^b$ represents a halogen atom or $OA^1$. $A^1$ and $A^2$ each independently represent a hydrogen atom or a hydrocarbon group having 1 to 10 carbon atoms.)

(C) 2-Pyridyl Group-Containing Pyrimidine Compound (c-1)

A fluorine-containing pyrimidine compound represented by the following general formula (13) is obtained by reacting a pyridylpyrimidine derivative represented b general formula (12) with a nucleophile (Step (c-1)).

(In the general formula (15), $Y^3$ is —$SO_mA^1$, and m is an integer of 1 to 3.)

(c-3)

When $Y^1$ is a halogen atom in the general formula (13), a halogen atom of $Y^{1a}$ is optionally substituted by additional reaction of a fluorine-containing pyrimidine compound represented by the following general formula (13-1) with an amine, an alkoxide, a thiolate, an organometallic reagent, or a halogen atom different from $Y^{1a}$ as a nucleophile to give a fluorine-containing pyrimidine compound of the following general formula (15-1) (Step (c-3)).

[Formula 16]

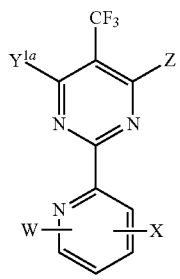
(13-1)

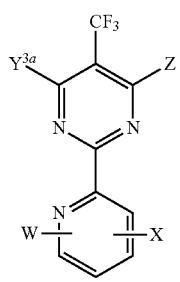
(15-1)

(In the general formula (13-1), $Y^{1a}$ is a halogen atom;

in the general formula (15-1), $Y^{3a}$ is —$NA^1A^2$, $OA^1$, $SA^1$, a hydrocarbon group having 1 to 10 carbon atoms, or a halogen atom different from $Y^1$, and $A^1$ and $A^2$ each independently represent a hydrogen atom or a hydrocarbon group having 1 to 10 carbon atoms.)

(c-4)

When $Y^1$ and Z are each —$OA^3$ in the general formula (13), an alkoxy group of a fluorine-containing pyrimidine compound represented by the following general formula (13-2) is optionally dealkylated, and then —$OA^3$ of $Y^b$ and $Z^a$ are each substituted by reacting a halogen atom as a nucleophile to give a fluorine-containing pyrimidine compound of the following general formula (15-2) (Step (c-4)).

[Formula 17]

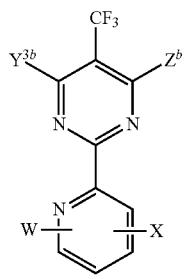
(13-2)

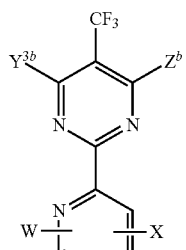
(15-2)

(In the general formula (13-2), $Y^{1b}$ and $Z^a$ are each —$OA^3$, and in the general formula (15-2), $Y^{3b}$ and $Z^b$ each represent a halogen atom.)

(c-5)

The halogen atom of $Y^{3b}$ is optionally substituted by additional reaction of the fluorine-containing pyrimidine compound represented by the general formula (15-2) with amine, hydroxide ion, alkoxide, and thiolate as a nucleophile and optionally the halogen atom of $Z^b$ to give a fluorine-containing pyrimidine compound represented by the following general formula (15-3) (Step (c-5)).

[Formula 18]

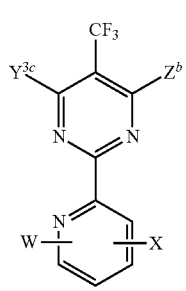
(15-2)

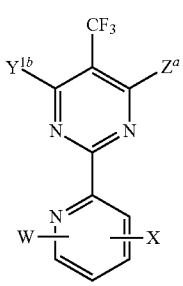
(15-3)

(In the general formula (15-3), $Y^{3c}$ represents —$NA^1A^2$, $OA^1$, or $SA^1$; and $Z^b$ represents a halogen atom or $OA^1$. $A^1$ and $A^2$ each independently represent a hydrogen atom or a hydrocarbon group having 1 to 10 carbon atoms.)

<Two Step Process of Hydrolysis Reaction and Halogenation>

(D) 4-Pyridyl Group-Containing Pyrimidine Compound (d-1)

A pyridylpyrimidine derivative represented by the following general formula (4) is hydrolyzed to give a pyridylpyrimidinone derivative of the following general formula (16) (Step (d-1)).

[Formula 19]

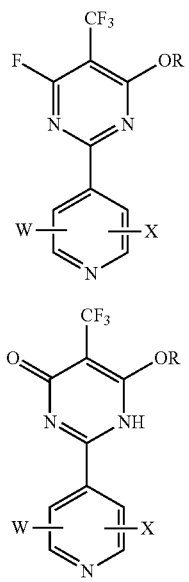

(4)

(16)

(d-2)

The obtained pyridylpyrimidinone derivative represented by the general formula (16) is halogenated to give a fluorine-containing pyrimidine compound of the following general formula (19) (Step (d-2)).

[Formula 20]

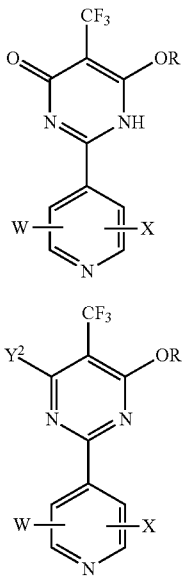

(16)

(19)

(In the general formula (19), $Y^2$ represents a halogen atom.)

(E) 3-Pyridyl Group-Containing Pyrimidine Compound (e-1)

A pyridylpyrimidine derivative represented by the following general formula (8) is hydrolyzed to give a pyridylpyrimidinone derivative of the following general formula (17) (Step (e-1)).

[Formula 21]

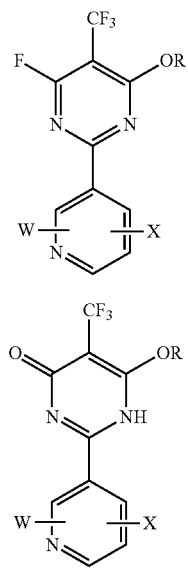

(8)

(17)

(e-2)

The obtained pyridylpyrimidinone derivative represented by the general formula (17) is halogenated to give a fluorine-containing pyrimidine compound of the following general formula (20) (Step (e-2)).

[Formula 22]

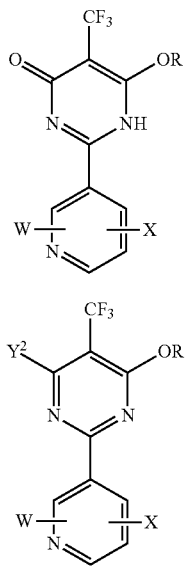

(17)

(20)

(In the general formula (20), $Y^2$ represents a halogen atom.)

(F) 2-Pyridyl Group-Containing Pyrimidine Compound (f-1)

A pyridylpyrimidine derivative represented by the following general formula (12) is hydrolyzed to give a pyridylpyrimidinone derivative of the following general formula (18) (Step (f-1)).

[Formula 23]

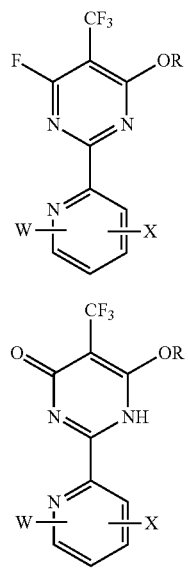

(f-2)

The obtained pyridylpyrimidinone derivative represented by the general formula (18) is halogenated to give a fluorine-containing pyrimidine compound of the following general formula (21) (Step (f-2)).

[Formula 24]

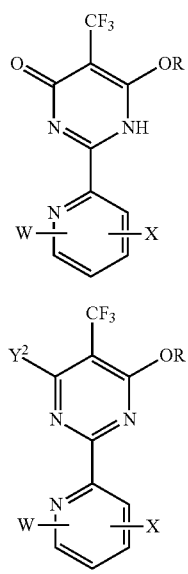

(In the general formula (21), $Y^2$ represents a halogen atom.)

(G) 4-Pyridyl Group-Containing Pyrimidine Compound (g-1)

A pyridylpyrimidine derivative represented by the following general formula (22) is dealkylated to give a pyridylpyrimidinone derivative of the following general formula (23) (Step (g-1)).

[Formula 25]

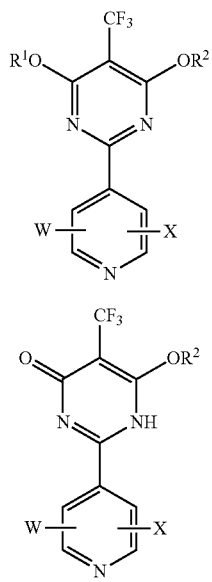

(g-2)

The obtained pyridylpyrimidinone derivative represented by the general formula (23) is halogenated to give a fluorine-containing pyrimidine compound of the following general formula (24) (Step (g-2)).

[Formula 26]

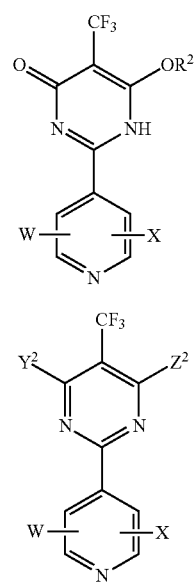

(In the general formula (24), $Y^2$ represents a halogen atom.)

(g-3)

When $Y^2$ is a halogen atom in the general formula (24), a halogen atom of $Y^2$ is optionally substituted by additional reaction of a fluorine-containing pyrimidine compound represented by the following general formula (24-1) with amine, hydroxide ion, alkoxide, thiolate, or a halogen atom different from $Y^{2a}$ as a nucleophile to give a fluorine-containing pyrimidine compound of the following general formula (24-2) (Step (g-3)).

[Formula 27]

(24-1)

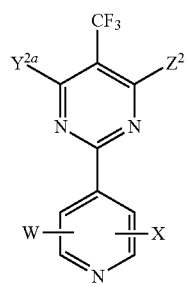

(24-2)

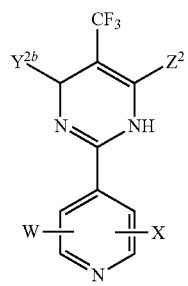

(In the general formula (24-1), $Y^{2a}$ is a halogen atom; in the general formula (24-2), $Y^{2b}$ is —$NA^1A^2$, $OA^1$, $SA^1$, or a halogen atom different from $Y^{2a}$, and $A^1$ and $A^2$ each independently represent a hydrogen atom or a hydrocarbon group having 1 to 10 carbon atoms.)

(H) 3-Pyridyl Group-Containing Pyrimidine Compound (h-1)

A pyridylpyrimidine derivative represented by the following general formula (25) is hydrolyzed to give a pyridylpyrimidinone derivative of the following general formula (26) (Step (h-1)).

[Formula 28]

(25)

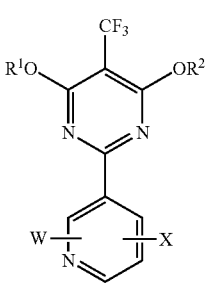

(26)

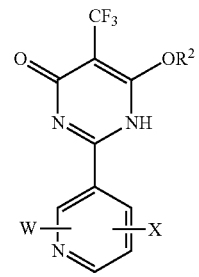

(h-2)

The obtained pyridylpyrimidinone derivative represented by the general formula (26) is halogenated to give a fluorine-containing pyrimidine compound of the following general formula (27) (Step (h-2)).

[Formula 29]

(26)

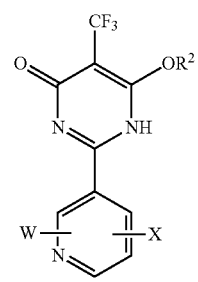

(27)

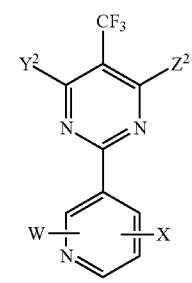

(In the general formula (27), $Y^2$ represents a halogen atom.)

(h-3)

When $Y^2$ is a halogen atom in the general formula (27), a halogen atom of $Y^{2a}$ is optionally substituted by additional reaction of a fluorine-containing pyrimidine compound represented by the following general formula (27-1) with amine, hydroxide ion, alkoxide, thiolate, or a halogen atom different from $Y^{2a}$ as a nucleophile to give a fluorine-containing pyrimidine compound of the following general formula (27-2) (Step (h-3)).

[Formula 30]

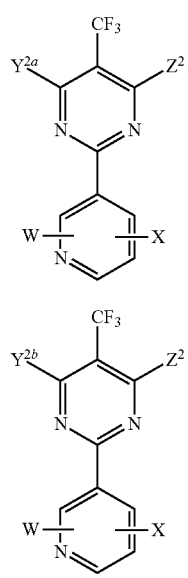

(27-1)

(27-2)

(In the general formula (27-1), $Y^{2a}$ is a halogen atom;

in the general formula (27-2), $Y^{2b}$ is —$NA^1A^2$, $OA^1$, $SA^1$, or a halogen atom different from $Y^{2a}$, and $A^1$ and $A^2$ each independently represent a hydrogen atom or a hydrocarbon group having 1 to 10 carbon atoms.)

(I) 2-Pyridyl Group-Containing Pyrimidine Compound (i-1)

A pyridylpyrimidine derivative represented by the following general formula (28) is hydrolyzed to give a pyridylpyrimidinone derivative of the following general formula 29 Step (i-1)).

[Formula 31]

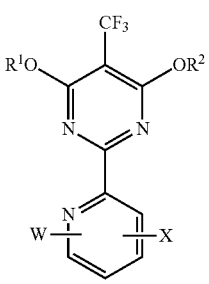

(28)

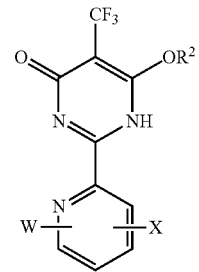

(29)

(i-2)

The obtained pyridylpyrimidinone derivative represented by the general formula (29) is halogenated to give a fluorine-containing pyrimidine compound of the following general formula (30) (Step (i-2)).

[Formula 32]

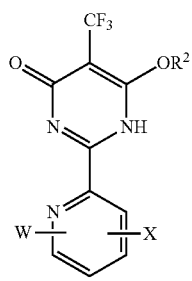

(29)

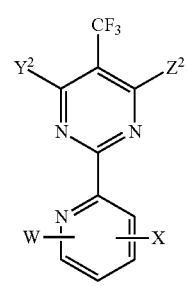

(30)

(In the general formula (30), $Y^2$ represents a halogen atom.)

(i-3)

When $Y^2$ is a halogen atom in the general formula (30), a halogen atom of $Y^{2a}$ is optionally substituted by additional reaction of a fluorine-containing pyrimidine compound represented by the following general formula (30-1) with amine, hydroxide ion, alkoxide, thiolate, or a halogen atom different from $Y^{2a}$ as a nucleophile to give a fluorine-containing pyrimidine compound of the following general formula (30-2) (Step (i-3)).

[Formula 33]

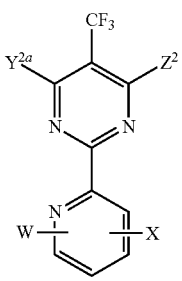

(30-1)

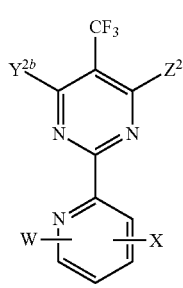

(In the general formula (30-1), $Y^{2a}$ is a halogen atom;

in the general formula (30-2), $Y^{2b}$ is —$NA^1A^2$, $OA^1$, $SA^1$, or a halogen atom different from $Y^{2a}$, and $A^1$ and $A^2$ each independently represent a hydrogen atom or a hydrocarbon group having 1 to 10 carbon atoms.)

In each general formulas shown in each of the above steps, except in the case of particular limitations, each of R and $R^1$ represents a hydrocarbon group having 1 to 12 carbon atoms;

$R^2$ represents a hydrogen atom or a hydrocarbon group having 1 to 12 carbon atoms;

W and X each independently represent a hydrogen atom, a halogen atom, a hydrocarbon group having 1 to 10 carbon atoms, —$C_nF_{2n+1}$ where n is an integer of 1 to 10, a nitro group, —$OA^1$, —$SO_mA^1$ where m is an integer of 1 to 3, —$SA^1$, —$NA^1A^2$, —$B(OA^1)(OA^2)$, —$COA^1$, —$COOA^1$, or —$CONA^1A^2$;

$Y^1$ represents a hydrocarbon group having 1 to 10 carbon atoms, —$C_nF_{2n+1}$ where n is an integer of 1 to 10, a cyano group, a nitro group, —$OA^1$, —$SO_mA^1$ where m is an integer of 1 to 3, —$SA^1$, —$NA^1A^2$, —$B(OA^1)(OA^2)$, —$COA^1$, —$COOA^1$, or —$CONA^1A^2$;

$Y^2$ represents a halogen atom;

Z represents a halogen atom or —$OA^3$;

$Z^2$ represents a halogen atom, —OH, or —$OA^3$;

$A^1$ and $A^2$ each independently represent a hydrogen atom or a hydrocarbon group having 1 to 10 carbon atoms; and $A^3$ represents a hydrocarbon group having 1 to 12 carbon atoms.

(Fluorine-Containing Pyrimidinone Compound)

In (D)-(I) above, a fluorine-containing pyrimidine compound is obtained via the two-step process, and a pyridylpyrimidinone derivative is obtained as an intermediate product in the first step. Such a pyridylpyrimidinone derivative corresponds to a fluorine-containing pyrimidinone compound represented by the following general formula (31), (32), or (33). Since the fluorine-containing pyrimidinone compound in the present disclosure is an intermediate product of the above-described fluorine-containing pyrimidine compound in the present disclosure, the fluorine-containing pyrimidinone compound is useful as an intermediate of a substance exhibiting desired biological activities possessed by the fluorine-containing pyrimidine compound in the present embodiment.

[Formula 34]

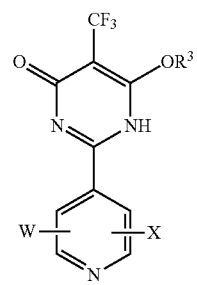

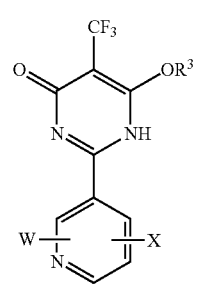

(In the general formulas (31) to (33), $R^3$ represents a hydrogen atom or a hydrocarbon group having 1 to 12 carbon atoms;

W and X each independently represent a hydrogen atom, a halogen atom, a hydrocarbon group having 1 to 10 carbon atoms, —$C_nF_{2n+1}$ where n is an integer of 1 to 10, a nitro group, —$OA^1$, —$SO_mA^1$ where m is an integer of 1 to 3, —$SA^1$, —$NA^1A^2$, —$B(OA^1)(OA^2)$, —$COA^1$, —$COOA^1$, or —$CONA^1A^2$;

$A^1$ and $A^2$ each independently represent a hydrogen atom or a hydrocarbon group having 1 to 10 carbon atoms.)

The fluorine-containing pyrimidinone compound represented by the general formula (16), (17), (18), (23), (26), or (29) is halogenated using a halogenating agent to produce each fluorine-containing pyrimidinone compound represented by the general formula (31), (32), or (33).

In each of the above general formulae, each of W and X is the same as defined in the fluorine-containing pyrimidine compounds represented by the above-described general formulas (1) to (3), W and X may be the same or different from each other. In each of the general formulas with Z or $Z^2$, each of Z and $Z^2$ is the same as Z defined in the fluorine-containing pyrimidine compounds represented by the above-described general formulae (1) to (3), and the halogen atom and —$OA^3$ specified in the definition of Z or $Z^2$ are the same as those defined in the fluorine-containing pyrimidine compounds represented by the above-described general formulas (1) to (3). In each of the general formulas with $Y^1$, $Y^1$ is the same as that defined for Y in the fluorine-containing pyrimidine compounds represented by the general formulas (1) to (3) (except for halogen atoms), and in each of the general formulas with $Y^2$, the halogen atom specified in the definition of $Y^2$ is the same as that defined in the fluorine-containing pyrimidine compounds represented by the above-described general formulas (1) to (3). Further, in each of the general formulas with R and/or $R^1$, R and $R^1$ are the same as those defined for $A^3$ in the fluorine-containing pyrimidine represented by the above-described general formulas (1) to (3), in each of the general formulas with $R^2$, $R^2$ is the same as $R^3$ defined in the fluorine-containing pyrimidinone compounds represented by the above-described general formulas (31) to (33), and the hydrocarbon group having 1 to 12 carbon atoms specified in the definition of $R^3$ is the same as $A^3$ defined in the fluorine-containing pyrimidine represented by the above-described general formulas (1) to (3).

In each of the above general formulas, R, $R^1$, $R^2$, and $R^3$ preferably represent an alkyl group having 1 to 10 carbon atoms. In the above general formulas (4) to (33), each of W and X preferably represents a hydrogen atom, a halogen atom, or a hydrocarbon group having 1 to 10 carbon atoms, and particularly preferably represents a hydrogen atom. Such a hydrocarbon group may be, for example, an alkyl group having 1 to 10 carbon atoms among the hydrocarbon groups listed as $A^3$ in the fluorine-containing pyrimidine compounds represented by the above-described formulas (1) to (3).

The nucleophilic substitution using the above-described nucleophile is carried out, for example, through reactions at 0 to 100° C. in the present of a nucleophile (sodium methoxide, sodium ethoxide, potassium tert-butoxide, sodium cyanide, potassium cyanide, potassium fluoride, or alcohol treated with a base such as sodium hydride, amine, thiol, and the like) in an organic solvent (tetrahydrofuran, dimethylformamide, dimethylsulfoxide, sulfolane, acetone, diethyl ether, and the like).

The electrophilic addition using the above-described electrophile is carried out, for example, through reactions at 0 to 65° C. in the presence of an electrophile (hydrogen peroxide, peracetic acid, m-chloroperoxybenzoic acid, potassium permanganate, or the like) in an organic solvent (acetic acid, chloroform, dichloromethane, dimethylformamide, acetonitrile, or the like).

The above-described hydrolysis reaction can be carried out in the presence of an acid or a base according to a method to be considered in general organic synthetic chemistry. In this reaction, an acid or a base and a solvent can be usually used. The acid and the base are not particularly limited as long as the hydrolysis reaction progresses, and one or more kinds of acids and bases can be used by appropriately selecting and mixing, for example, inorganic acids such as hydrochloric acid and sulfuric acid; organic acids such as acetic acid and trifluoroacetic acid; alkali metal hydroxides such as lithium hydroxide, sodium hydroxide, and potassium hydroxide; alkaline earth metal hydroxides such as calcium hydroxide and barium hydroxide; alkali metal carbonates such as sodium carbonate, potassium carbonate, and cesium carbonate; and alkaline earth metal carbonates such as calcium carbonate and barium carbonate. The solvent is not particularly limited as long as the hydrolysis reaction progresses, and any solvent may be used as long as it is inert to the reaction. As such a solvent, one or more kinds of solvents can be used by appropriately selecting and mixing, for example, alcohols such as methanol, ethanol, and isopropyl alcohol; aprotic polar solvents such as acetonitrile, N,N-dimethylformamide, dimethyl sulfoxide, dimethylacetamide, and sulfolane; nonpolar solvents such as dichloromethane; ethers such as diethyl ether, tert-butyl methyl ether, 1,4-dioxane, tetrahydrofuran, and 1,2-dimethoxyethane; and water. The reaction temperature is usually 0 to 150° C., and the reaction time is usually 0.5 to 72 hours.

Examples of the halogenating agent include thionyl chloride, phosgene, phosphorus oxychloride, phosphorus pentachloride, phosphorus oxybromide, and phosphorus tribromide. In the reaction with the halogenating agent, the reaction temperature is typically 50 to 150° C., the reaction time is 1 to 10 hours, and the amount of halogenating agent (reagent) used in the reaction is usually 1 to 10 equivalents with respect to 1 equivalent of the pyridylpyrimidine derivative (fluorine-containing pyrimidinone compound). A solvent is not necessarily required in the reaction with the halogenating agent, but the reaction is generally carried out in the presence of a solvent. Examples of the solvent that can be used include aromatic hydrocarbons such as benzene and toluene, and halogenated hydrocarbons such as chlorobenzene.

Although embodiments of the present disclosure have been described above, the present disclosure is not limited to the above-described embodiments, and may be modified in various ways within the scope of the present disclosure, including all aspects included in the concepts and claims of the present disclosure.

EXAMPLES

Hereinafter, Examples of the present disclosure will be described, but the present disclosure is not limited to these Examples as long as the gist of the present disclosure is not exceeded. In addition, unless otherwise specified, room temperature is within a range of 20° C.±5° C.

Example 1

Production of 4,6-dimethoxy-2-(4-pyridyl)-5-trifluoromethylpyrimidine

In 1.0 ml of methanol, 0.11 g (0.40 mmol) of 4-fluoro-6-methoxy-2-(4-pyridyl)-5-trifluoromethylpyrimidine was dissolved, 1.0 ml of a 28% sodium methoxide methanol solution was added thereto, and the mixture was stirred at room temperature for 1 day. Subsequently, water was added to the reaction solution, the mixture was extracted with ethyl acetate, and the organic phase was dried over sodium sulfate. The dried organic phase was filtered, and the filtrate was concentrated to give 0.11 g (0.38 mmol) of 4,6-dimethoxy-2-(4-pyridyl)-5-trifluoromethylpyrimidine having the following structural formula. The yield was 93%.

[Formula 35]

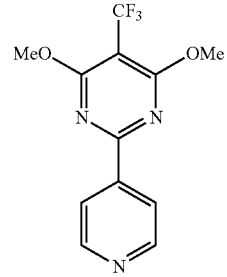

The analysis results were as follows.

¹H NMR (400 MHz, CDCl₃) δppm: 8.79 (dd, J=4.4, 1.6 Hz, 2H), 8.26 (dd, J=4.8, 1.6 Hz, 2H), 4.18 (s, 6H)

APCI-MS (m/z): 286.8 [M+H]⁺

Example 2

Production of 6-methoxy-4-phenoxy-2-(4-pyridyl)-5-trifluoromethylpyrimidine

In 1.5 ml of tetrahydrofuran (THF), 0.04 g (0.46 mmol) of phenol was dissolved, 0.05 g (0.47 mmol) of potassium tert-butoxide and 0.11 g (0.39 mmol) of 4-fluoro-6-methoxy-2-(4-pyridyl)-5-trifluoromethylpyrimidine were added thereto, and the mixture was stirred at room temperature for 1 day. Water was added to the reaction solution, the mixture was extracted with ethyl acetate, and the organic phase was dried over sodium sulfate. The dried organic phase was filtered, and the filtrate was concentrated to give 0.07 g (0.19 mmol) of 6-methoxy-4-phenoxy-2-(4-pyridyl)-5-trifluoromethylpyrimidine having the following structural formula. The yield was 48%.

[Formula 36]

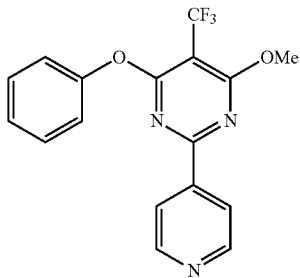

The analysis results were as follows.
¹H NMR (400 MHz, CDCl₃) δppm: 8.77 (dd, J=4.8, 1.6 Hz, 2H), 7.96 (dd, J=4.8, 1.6 Hz, 2H), 7.44-7.49 (m, 2H), 7.30-7.34 (m, 1H), 7.18-7.24 (m, 2H), 4.22 (s, 3H)

APCI-MS (m/z): 349.0 [M+H]⁺

Example 3

Production of 6-methoxy-4-(phenylmethoxy)-2-(4-pyridyl)-5-trifluoromethylpyrimidine In 3.0 ml of dimethylformamide (DMF), 0.05 g (0.35 mmol) of benzyl alcohol was dissolved, 0.01 g (0.35 mmol) of sodium hydride was added thereto, and the mixture was stirred at room temperature for 1 hour. 0.10 g (0.35 mmol) of 4-fluoro-6-methoxy-2-(4-pyridyl)-5-trifluoromethylpyrimidine was then added thereto, and the mixture was stirred at room temperature for 16.7 hours, at 70° C. for 16 hours, and then at 100° C. for 10.5 hours. After the reaction solution was cooled to room temperature in the air, water was added thereto, the mixture was extracted with ethyl acetate, and the organic phase was dried over sodium sulfate. The dried organic phase was filtered, and the filtrate was concentrated, followed by column purification, to give 0.05 g (0.13 mmol) of 6-methoxy-4-(phenylmethoxy)-2-(4-pyridyl)-5-trifluoromethylpyrimidine having the following structural formula. The yield was 31%.

[Formula 37]

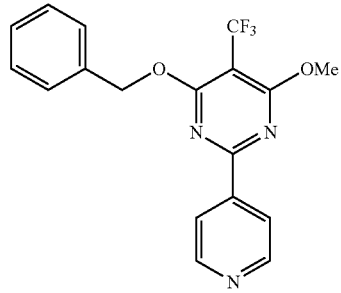

The analysis results were as follows.
¹H NMR (400 MHz, CDCl₃) δppm: 8.78-8.80 (m, 2H), 8.19-8.23 (m, 2H), 7.30-7.48 (m, 5H), 5.65 (s, 3H), 4.16 (s, 2H)

APCI-MS (m/z): 361.7 [M+H]⁺

Example 4

Production of 6-methoxy-N-propyl-2-(4-pyridyl)-5-(trifluoromethyl)-4-pyrimidinamine In 5.0 ml of DMF, 0.03 g (0.35 mmol) of n-propylamine was dissolved, 0.02 g (0.53 mmol) of sodium hydride was added thereto, and the mixture was stirred at room temperature for 50 minutes. 0.10 g (0.35 mmol) of 4-fluoro-6-methoxy-2-(4-pyridyl)-5-trifluoromethylpyrimidine was then added thereto, and the mixture was stirred at room temperature for 16.7 hours and at 70° C. for 8 hours. After the reaction solution was cooled to room temperature in the air, water was added thereto, the mixture was extracted with ethyl acetate, and the organic phase was dried over sodium sulfate. The dried organic phase was filtered, and the filtrate was concentrated, followed by column purification, to give 0.09 g (0.29 mmol) of 6-methoxy-N-propyl-2-(4-pyridyl)-5-(trifluoromethyl)-4-pyrimidinamine having the following structural formula. The yield was 79%.

[Formula 38]

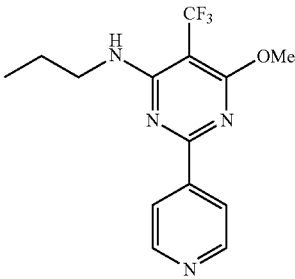

The analysis results were as follows.
¹H NMR (400 MHz, CDCl₃) δppm: 8.75 (dd, J=4.8, 1.6 Hz, 2H), 8.22 (d, J=4.4, 1.6 Hz, 2H), 5.67 (br, 1H), 4.11 (s, 3H), 3.61 (dt, J=6.4, 6.8 Hz, 2H), 1.71 (tq, J=7.6, 7.2 Hz, 2H), 1.02 (t, J=7.6 Hz, 3H)

APCI-MS (m/z): 313.9 [M+H]⁺

Example 5

Production of N,N-diethyl-6-methoxy-2-(4-pyridyl)-5-(trifluoromethyl)-4-pyrimidinamine In 5.0 ml of DMF, 0.04 g (0.52 mmol) of diethylamine was dissolved, 0.02 g (0.58 mmol) of sodium hydride was added thereto, and the mixture was stirred at room temperature for 1 hour. 0.10 g (0.37 mmol) of 4-fluoro-6-methoxy-2-(4-pyridyl)-5-trifluoromethylpyrimidine was then added thereto, and the mixture was stirred at room temperature for 16.7 hours and at 70° C. for 16 hours. After the reaction solution was cooled to room temperature in the air, water was added thereto, the mixture was extracted with ethyl acetate, and the organic phase was dried over sodium sulfate. The dried organic phase was filtered, and the filtrate was concentrated, followed by column purification, to give 0.03 g (0.09 mmol) of N,N-diethyl-6-methoxy-2-(4-pyridyl)-5-(trifluoromethyl)-4-pyrimidinamine having the following structural formula. The yield was 25%.

[Formula 39]

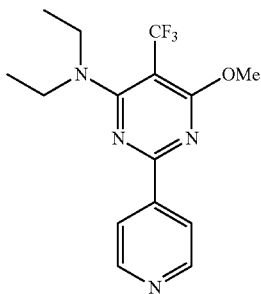

The analysis results were as follows.
$^1$H NMR (400 MHz, CDCl$_3$) δppm: 8.74 (dd, J=4.4, 1.2 Hz, 2H), 8.20 (dd, J=4.4, 1.6 Hz, 2H), 4.12 (s, 3H), 3.59 (q, J=7.2 Hz, 4H), 1.26 (t, J=7.2 Hz, 6H)
APCI-MS (m/z): 326.8 [M+H]$^+$ Example 6

Production of 6-methoxy-N-phenyl-2-(4-pyridyl)-5-(trifluoromethyl)-4-pyrimidinamine In 5.0 ml of DMF, 0.04 g (0.39 mmol) of aniline was dissolved, 0.02 g (0.58 mmol) of sodium hydride was added thereto, and the mixture was stirred at room temperature for 1 hour. 0.10 g (0.37 mmol) of 4-fluoro-6-methoxy-2-(4-pyridyl)-5-trifluoromethylpyrimidine was then added thereto, the mixture was stirred at room temperature for 16.7 hours, at 70° C. for 8 hours, further at room temperature for 16 hours, then at 70° C. for 8 hours, and 100° C. for 10.5 hours. After the reaction solution was cooled to room temperature in the air, water was added thereto, the mixture was extracted with ethyl acetate, and the organic phase was dried over sodium sulfate. The dried organic phase was filtered, and the filtrate was concentrated, followed by column purification, to give 0.03 g (0.08 mmol) of 6-methoxy-N-phenyl-2-(4-pyridyl)-5-(trifluoromethyl)-4-pyrimidinamine having the following structural formula. The yield was 22%.

[Formula 40]

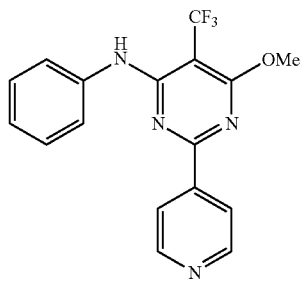

The analysis results were as follows.
$^1$H NMR (400 MHz, CDCl$_3$) δppm: 8.73 (m, 2H), 8.14 (dd, J=4.8, 1.6 Hz, 2H), 7.41-7.55 (m, 4H), 7.21-7.25 (m, 1H), 4.16 (s, 3H)
APCI-MS (m/z): 346.6 [M+H]$^+$ Example 7

Production of 6-methoxy-2-(3-pyridyl)-5-(trifluoromethyl)-4(3H)-pyrimidinone

In 1.0 ml of DMF and 1.0 ml of water, 0.11 g (0.39 mmol) of 4-fluoro-6-methoxy-2-(3-pyridyl)-5-trifluoromethylpyrimidine was dissolved, 5 drops of triethylamine were added thereto, and the mixture was stirred at 70° C. for 7 hours and at 80° C. for 16 hours. After the reaction solution was cooled to room temperature in the air, water and acetic acid were added thereto, the mixture was extracted with ethyl acetate, and the organic phase was dried over sodium sulfate. The dried organic phase was filtered, and the filtrate was concentrated, followed by column purification, to give 0.01 g (0.05 mmol) of 6-methoxy-2-(3-pyridyl)-5-(trifluoromethyl)-4(3H)-pyrimidinone having the following structural formula. The yield was 12%.

[Formula 41]

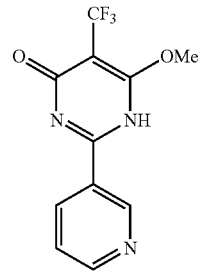

The analysis results were as follows.
$^1$H NMR (400 MHz, CDCl$_3$) δppm: 9.61 (dd, J=2.4, 0.8 Hz, 1H), 8.72 (dd, J=4.8, 1.6, 1H), 8.61 (ddd, J=8.0, 2.0, 2.0 Hz, 1H), 7.39 (ddd, J=7.6, 4.8, 0.8 Hz, 1H), 5.50 (br, 1H), 4.12 (s, 3H)
APCI-MS (m/z): 270.1 [M+H]$^+$ Example 8

Production of 6-methoxy-4-(1-methylethoxy)-2-(4-pyridyl)-5-trifluoromethylpyrimidine and 4,6-bis(1-methylethoxy)-2-(4-pyridyl)-5-trifluoromethylpyrimidine In 1.0 ml of THF, 0.10 g (0.34 mmol) of 4-fluoro-6-methoxy-2-(4-pyridyl)-5-trifluoromethylpyrimidine was dissolved, 1.0 ml of isopropyl alcohol and 0.01 g (0.35 mmol) of sodium hydride were added thereto, and the mixture was stirred at room temperature for 3 hours. 0.02 g (0.48 mmol) of sodium hydride was added thereto, and the mixture was stirred at 50° C. for 7 hours. After the reaction solution was cooled to room temperature in the air, water was added thereto, the mixture was extracted with ethyl acetate, and the organic phase was dried over sodium sulfate. The dried organic phase was filtered, and the filtrate was concentrated, followed by column purification, to give 0.01 g (0.03 mmol) of 6-methoxy-4-(1-methylethoxy)-2-(4-pyridyl)-5-trifluoromethylpyrimidine. The yield was 9.6%.

[Formula 42]

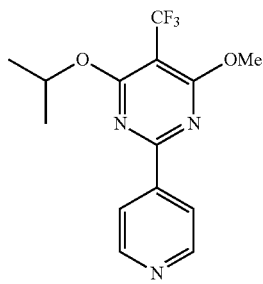

Analysis results of 6-methoxy-4-(1-methylethoxy)-2-(4-pyridyl)-5-trifluoromethylpyrimidine were as follows.
$^1$H NMR (400 MHz, CDCl$_3$) δppm: 8.78 (dd, J=4.8, 2.0 Hz, 2H), 8.22 (dd, J=4.4, 1.6 Hz, 2H), 5.61 (hept, J=6.0 Hz, 1H), 4.16 (s, 3H), 1.45 (d, J=6.0 Hz, 6H)
APCI-MS (m/z): 313.5 [M+H]$^+$
At the same time, 0.02 g (yield: 19%) of 4,6-bis(1-methylethoxy)-2-(4-pyridyl)-5-trifluoromethylpyrimidine was also obtained.

[Formula 43]

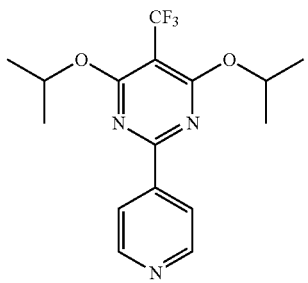

Analysis results of 4,6-bis(1-methylethoxy)-2-(4-pyridyl)-5-trifluoromethylpyrimidine were as follows.
$^1$H NMR (400 MHz, CDCl$_3$) δppm: 8.77 (dd, J=4.8, 2.0 Hz, 2H), 8.20 (dd, J=4.4, 1.6 Hz, 2H), 5.60 (hept, J=6.0 Hz, 2H), 1.44 (d, J=6.0 Hz, 12H)
APCI-MS (m/z): 341.5 [M+H]$^+$ Example 9

Production of 4-(1,1-dimethylethoxy)-6-methoxy-2-(4-pyridyl)-5-trifluoromethylpyrimidine and 4,6-bis(1,1-dimethylethoxy)-2-(4-pyridyl)-5-trifluoromethylpyrimidine In 6.0 ml of THF, 0.50 g (1.83 mmol) of 4-fluoro-6-methoxy-2-(4-pyridyl)-5-trifluoromethylpyrimidine was dissolved, 0.043 g (3.85 mmol) of potassium tert-butoxide was added thereto, and the mixture was stirred at room temperature for 1 day. The reaction solution was concentrated, followed by column purification, to give 0.37 g (1.14 mmol) of 4-(1,1-dimethylethoxy)-6-methoxy-2-(4-pyridyl)-5-trifluoromethylpyrimidine. The yield was 62%.

[Formula 44]

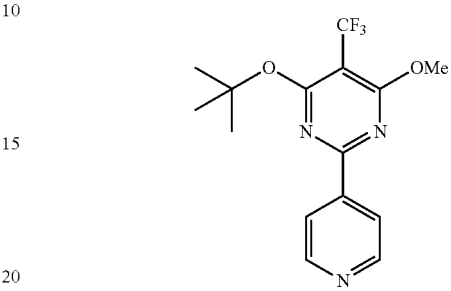

Analysis results of 4-(1,1-dimethylethoxy)-6-methoxy-2-(4-pyridyl)-5-trifluoromethylpyrimidine were as follows.
$^1$H NMR (400 MHz, CDCl$_3$) δppm: 8.79 (dd, J=4.8, 1.6 Hz, 2H), 8.20 (dd, J=4.4, 1.6 Hz, 2H), 4, 15 (s, 3H), 1.71 (s, 9H)
APCI-MS (m/z): 327.5 [M+H]$^+$
At the same time, 0.04 g (yield: 5%) of 4,6-bis(1,1-dimethylethoxy)-2-(4-pyridyl)-5-trifluoromethylpyrimidine was also obtained.

[Formula 45]

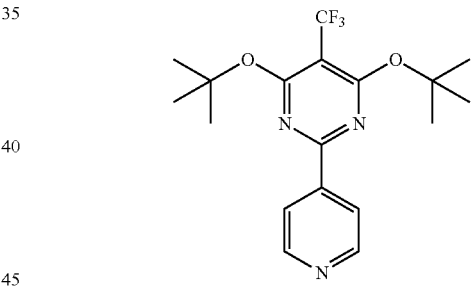

Analysis results of 4,6-bis(1,1-dimethylethoxy)-2-(4-pyridyl)-5-trifluoromethylpyrimidine were as follows.
$^1$H NMR (400 MHz, CDCl$_3$) δppm: 8.79 (dd, J=4.4, 1.6 Hz, 2H), 8.14 (dd, J=4.8, 1.6 Hz, 2H), 1.70 (s, 18H)
APCI-MS (m/z): 369.3 [M+H]$^+$ Example 10

Production of 4-chloro-6-methoxy-2-(4-pyridyl)-5-trifluoromethylpyrimidine

Step 1) Production of 6-methoxy-2-(4-pyridyl)-5-(trifluoromethyl)-4(3H)-pyrimidinone In 2.0 ml of methanol, 0.10 g (0.31 mmol) of 4-(1,1-dimethylethoxy)-6-methoxy-2-(4-pyridyl)-5-trifluoromethylpyrimidine was dissolved, 4 drops of concentrated hydrochloric acid were added thereto, and the mixture was stirred at room temperature for 23 hours, and then stirred at 50° C. for another 4 hours. After being cooled to room temperature in the air, the reaction solution was concentrated, then washed with ethyl acetate and filtered to give 0.07 g of 6-methoxy-2-(4-pyridyl)-5-(trifluoromethyl)-4(3H)-pyrimidinone having the following structural formula. The yield was 87%.

[Formula 46]

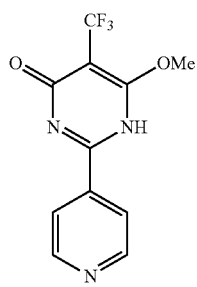

The analysis results were as follows.

$^1$H NMR (400 MHz, CD$_3$OD) δppm: 9.01 (dd, J=5.6, 1.2 Hz, 2H), 8.88 (d, J=6.4 Hz, 2H), 4, 21 (s, 3H)

APCI-MS (m/z): 271.0 [M+H]$^+$

Step 2) Production of 4-chloro-6-methoxy-2-(4-pyridyl)-5-trifluoromethylpyrimidine In 1.0 ml of POCl$_3$, 0.105 g of a crude product of 6-methoxy-2-(4-pyridyl)-5-(trifluoromethyl)-4(3H)-pyrimidinone obtained in Step 1) was dissolved and stirred at 60° C. for 4 hours, at 100° C. for 1.5 hours, and at 110° C. for 17.5 hours. After being cooled to room temperature in the air, the reaction solution was added dropwise to ice and extracted with ethyl acetate, and the organic phase was dried over sodium sulfate. The dried organic phase was filtered, and the filtrate was concentrated, followed by column purification, to give 0.006 g (0.031 mmol) of 4-chloro-6-methoxy-2-(4-pyridyl)-5-trifluoromethylpyrimidine having the following structural formula. The yield was approximately 8%.

[Formula 47]

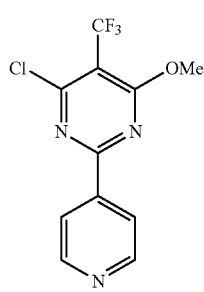

The analysis results were as follows.

$^1$H NMR (400 MHz, CDCl$_3$) δppm: 8.84 (s, 2H), 8.33 (d, J=5.2 Hz, 2H), 4, 25 (s, 3H)

APCI-MS (m/z): 390.4 [M+H]$^+$

Example 11

Production of 4,6-dichloro-2-(4-pyridyl)-5-trifluoromethylpyrimidine

Step 1) Production of 6-hydroxy-2-(4-pyridyl)-5-(trifluoromethyl)-4(3H)-pyrimidinone In 1.0 ml of dichloromethane, 0.21 g (0.57 mmol) of 4,6-bis(1,1-dimethylethoxy)-2-(4-pyridyl)-5-trifluoromethylpyrimidine was dissolved, 1.0 ml of trifluoroacetic acid (TFA) was added thereto, and the mixture was stirred at room temperature for 3 hours. The reaction solution was then concentrated, washed with ethyl acetate, and filtered to give 0.13 g (0.51 mmol) of 6-hydroxy-2-(4-pyridyl)-5-(trifluoromethyl)-4(3H)-pyrimidinone having the following structural formula. The yield was 89%.

[Formula 48]

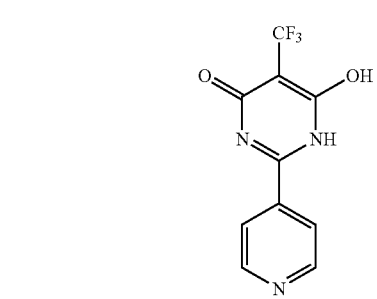

The analysis results were as follows. Note that the obtained pyrimidinone compound had poor solubility in a solvent used for APCI-MS measurement, and thus the MS measurement could not be performed.

$^1$H NMR (400 MHz, DMSO-d6) δppm: 8.82 (dd, J=4.8, 2.0 Hz, 2H), 7.97 (dd, J=4.4, 1.6 Hz, 2H)

Step 2) Production of 4,6-dichloro-2-(4-pyridyl)-5-trifluoromethylpyrimidine

In 1.0 ml of POCl$_3$, 0.10 g (0.38 mmol) of a crude product of 6-hydroxy-2-(4-pyridyl)-5-(trifluoromethyl)-4(3H)-pyrimidinone obtained in Step 1) was dissolved and stirred under conditions of heat reflux for 1 hour. After being cooled to room temperature in the air, the reaction solution was added dropwise to ice and neutralized by addition of sodium hydrogen carbonate, followed by extraction with ethyl acetate, and the organic phase was dried over sodium sulfate. The dried organic phase was filtered, and the filtrate was concentrated, followed by column purification, to give 0.08 g (0.28 mmol) of 4,6-dichloro-2-(4-pyridyl)-5-trifluoromethylpyrimidine having the following structural formula. The yield was 73%.

[Formula 49]

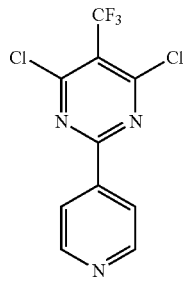

The analysis results were as follows.
$^1$H NMR (400 MHz, CDCl$_3$) δppm: 8.86 (dd, J=4.8, 1.6 Hz, 2H), 8.28 (dd, J=4.4, 1.6 Hz, 2H)
APCI-MS (m/z): 294.5 [M+H]$^+$ Example 12

Production of 6-methoxy-4-[(4-methylphenyl)thio]-2-(4-pyridyl)-5-trifluoromethylpyrimidine In 5.0 ml of DMF, 0.1 g (0.81 mmol) of p-toluenethiol was dissolved, 0.05 g (1.3 mmol) of sodium hydride was added thereto, and the mixture was stirred at room temperature for 30 minutes. 0.10 g (0.37 mmol) of 4-fluoro-6-methoxy-2-(4-pyridyl)-5-trifluoromethylpyrimidine was then added thereto, and the mixture was stirred at room temperature for 6 days. Water was added to the reaction solution, the mixture was extracted with ethyl acetate, and the organic phase was dried over sodium sulfate. The dried organic phase was filtered, and the filtrate was concentrated, followed by column purification, to give 0.10 g (0.25 mmol) of 6-methoxy-4-[(4-methylphenyl)thio]-2-(4-pyridyl)-5-trifluoromethylpyrimidine having the following structural formula. The yield was 52.7%.

[Formula 50]

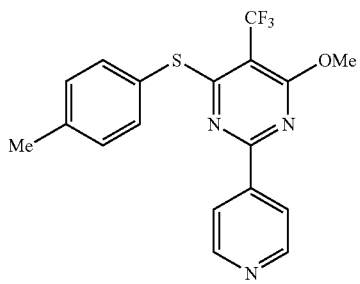

The analysis results were as follows.
$^1$H NMR (400 MHz, CDCl$_3$) δppm: 8.60 (dd, J=4.4, 1.2 Hz, 2H), 7.72 (dd, J=4.8, 2.0 Hz, 2H), 7.46 (d, J=8.4 Hz, 2H), 7.32 (d, J=8.0 Hz, 2H), 4.17 (s, 3H), 2.49 (s, 3H)
APCI-MS (m/z): 377.5 [M+H]$^+$ Example 13

Production of 6-methoxy-4-[(4-methylphenyl)sulfinyl]-2-(4-pyridyl)-5-trifluoromethylpyrimidine and 6-methoxy-4-[(4-methylphenyl)sulfonyl]-2-(4-pyridyl)-5-trifluoromethylpyrimidine To 0.10 g (0.25 mmol) of 6-methoxy-4-[(4-methylphenyl)thio]-2-(4-pyridyl)-5-trifluoromethylpyrimidine obtained in Example 12 were added 1.0 ml of acetic acid and 6 drops of 30% aqueous hydrogen peroxide, and the mixture was stirred at room temperature for 30 hours. Water and sodium hydrogen carbonate were added to the reaction mixture to adjust the solution to pH 5, followed by extraction with ethyl acetate, and the organic phase was dried over sodium sulfate. The dried organic phase was filtered, and the filtrate was concentrated, followed by column purification, to give 0.11 g (0.11 mmol) of 6-methoxy-4-[(4-methylphenyl)sulfinyl]-2-(4-pyridyl)-5-trifluoromethylpyrimidine. The yield was 32.2%.

[Formula 51]

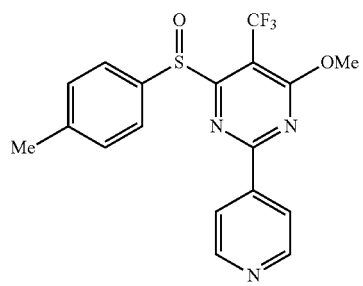

Analysis results of 6-methoxy-4-[(4-methylphenyl)sulfinyl]-2-(4-pyridyl)-5-trifluoromethylpyrimidine were as follows.
$^1$H NMR (400 MHz, CD$_3$OD) δppm: 8.85 (dd, J=4.8, 2.0 Hz, 2H), 8.38 (dd, J=4.8, 2.0 Hz, 2H), 7.75 (d, J=8.0 Hz, 2H), 7.28 (d, J=8.4 Hz, 2H), 4.23 (s, 3H), 2.37 (s, 3H)
APCI-MS (m/z): 393.5 [M+H]$^+$ At the same time, 0.004 g (0.01 mmol) of 6-methoxy-4-[(4-methylphenyl)sulfonyl]-2-(4-pyridyl)-5-trifluoromethylpyrimidine was also obtained. The yield was 2.8%.

[Formula 52]

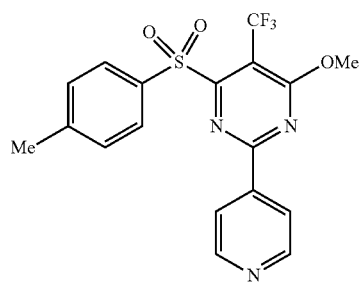

Analysis results of 6-methoxy-4-[(4-methylphenyl)sulfonyl]-2-(4-pyridyl)-5-trifluoromethylpyrimidine were as follows.
$^1$H NMR (400 MHz, CD$_3$OD) δppm: 8.67 (br, 2H), 7.93 (d, J=8.4 Hz, 2H), 7.66 (d, J=4.4 Hz, 2H), 7.47 (d, J=8.0 Hz, 2H), 4.27 (s, 3H), 2.56 (s, 3H)
APCI-MS (m/z): 409.5 [M+H]$^+$ Example 14

Production of 6-methoxy-2-(2-pyridyl)-5-(trifluoromethyl)-4(3H)-pyrimidinone

In 5.0 ml of acetic acid, 0.10 g (0.37 mmol) of 4-fluoro-6-methoxy-2-(2-pyridyl)-5-trifluoromethylpyrimidine was dissolved, stirred at room temperature for 18.5 hours, and then stirred at 70° C. for another 8 hours. After the reaction solution was cooled to room temperature, water was added thereto, the mixture was extracted with ethyl acetate, and the organic phase was dried over sodium sulfate. The dried organic phase was filtered, and the filtrate was concentrated, followed by column purification, to give of 6-methoxy-2-(2-pyridyl)-5-(trifluoromethyl)-4(3H)-pyrimidinone having the following structural formula.

[Formula 53]

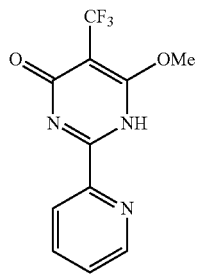

The analysis results were as follows.
$^1$H NMR (400 MHz, CDCl$_3$) δppm: 10.97 (br, 1H), 8.72 (d, J=4.4 Hz, 1H), 8.43 (d, J=7.6 Hz, 1H), 7.97 (ddd, J=8.0, 8.0, 1.6 Hz, 1H), 7.58 (ddd, J=7.2, 4.8, 0.8 Hz, 1H), 4, 17 (s, 3H)
APCI-MS (m/z): 271.2 [M+H]$^+$

Example 15

Production of 4-cyano-6-methoxy-2-(4-pyridyl)-5-trifluoromethylpyrimidine

In 1.0 ml of DMSO, 0.10 g (0.38 mmol) of 4-fluoro-6-methoxy-2-(4-pyridyl)-5-trifluoromethylpyrimidine was dissolved, 0.03 g (0.65 mmol) of sodium cyanide was added thereto, and the mixture was stirred at room temperature for 23 hours, at 80° C. for 5.5 hours, and at 100° C. for 5 hours. Water was added to the reaction solution, the mixture was extracted with ethyl acetate, and the organic phase was dried over sodium sulfate. The dried organic phase was filtered, and the filtrate was concentrated, followed by column purification, to give 0.003 g (0.01 mmol) of 4-cyano-6-methoxy-2-(4-pyridyl)-5-trifluoromethylpyrimidine having the following structure. The yield was 3%.

[Formula 54]

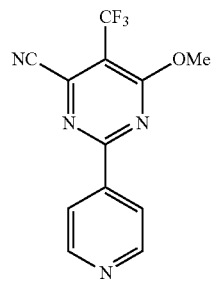

The analysis results were as follows.
$^1$H NMR (400 MHz, CDCl$_3$) δppm: 8.86 (d, J=5.6 Hz, 2H), 8.29 (d, J=6.0 Hz, 2H), 4.31 (s, 3H)
APCI-MS (m/z): 280.4 [M+H]$^+$

Example 16

Production of 4-ethoxy-6-methoxy-2-(4-pyridyl)-5-trifluoromethylpyrimidine

In 1.0 ml of ethanol, 0.12 g (0.42 mmol) of 4-fluoro-6-methoxy-2-(4-pyridyl)-5-trifluoromethylpyrimidine was dissolved, 5 drops of a 20% sodium ethoxide-containing ethanol solution were added thereto, and the mixture was stirred at room temperature for 22.8 hours. Another 5 drops of the 20% sodium ethoxide-containing ethanol solution and 1 ml of ethanol were added thereto, and the mixture was stirred at 50° C. for 5.8 hours. Further, 5 drops of the 20% sodium ethoxide-containing ethanol solution were added thereto, the mixture was stirred at 50° C. for 2 hours, followed by addition of water and extraction with ethyl acetate, and the organic phase was dried over sodium sulfate. The dried organic phase was filtered, and the filtrate was concentrated, followed by column purification, to give 0.11 g (0.37 mmol) of 4-ethoxy-6-methoxy-2-(4-pyridyl)-5-trifluoromethylpyrimidine having the following structure. The yield was 87%.

[Formula 55]

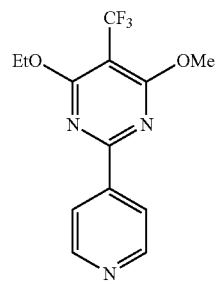

The analysis results were as follows.
$^1$H NMR (400 MHz, CDCl$_3$) δppm: 8.79 (d, J=5.2 Hz, 2H), 8.24 (d, J=4.9 Hz, 2H), 4.65 (q, J=7.3 Hz, 2H), 4.17 (s, 3H), 1.48 (t, J=7.0 Hz, 3H)
APCI-MS (m/z): 300.0 [M+H]$^+$

Example 17

Production of 4,6-dimethoxy-2-(3-pyridyl)-5-trifluoromethylpyrimidine

In 1.0 ml of methanol, 0.11 g (0.38 mmol) of 4-fluoro-6-methoxy-2-(3-pyridyl)-5-trifluoromethylpyrimidine was dissolved, 1.0 ml of a 28% sodium methoxide-containing methanol solution was added thereto, and the mixture was stirred at room temperature for 8.3 hours. Water was added to the reaction solution, the mixture was extracted with ethyl acetate, and the organic phase was dried over sodium sulfate. The dried organic phase was filtered, and the filtrate was concentrated, followed by column purification, to give 0.11 g (0.38 mmol) of 4,6-dimethoxy-2-(3-pyridyl)-5-trifluoromethylpyrimidine having the following structure. The yield was 99%.

[Formula 56]

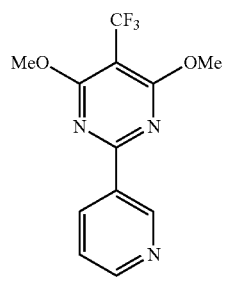

The analysis results were as follows.
$^1$H NMR (400 MHz, CDCl$_3$) δppm: 9.64 (d, J=1.5 Hz, 1H), 8.75 (dd, J=4.6, 1.5 Hz, 1H), 8.68 (ddd, J=8.0, 4.6, 1.5 Hz, 1H), 7.43 (ddd, J=8.0, 4.9, 0.9 Hz, 1H), 4.17 (s, 6H)
APCI-MS (m/z): 286.0 [M+H]$^+$ Example 18

Production of N-propyl-6-methoxy-2-(3-pyridyl)-5-(trifluoromethyl)-4-pyrimidinamine In 5.0 ml of DMF, 0.05 g (0.80 mmol) of n-propylamine was dissolved, 0.02 g (0.38 mmol) of sodium hydride was added thereto, and the mixture was stirred at room temperature for 45 minutes. 0.10 g (0.38 mmol) of 4-fluoro-6-methoxy-2-(3-pyridyl)-5-trifluoromethylpyrimidine was then added thereto, and the mixture was stirred at room temperature for 5.3 hours. Water was added to the reaction solution, the mixture was extracted with ethyl acetate, and the organic phase was dried over sodium sulfate. The dried organic phase was filtered, and the filtrate was concentrated, followed by column purification, to give 0.10 g (0.32 mmol) of N-propyl-6-methoxy-2-(3-pyridyl)-5-(trifluoromethyl)-4-pyrimidinamine having the following structure. The yield was 84%.

[Formula 57]

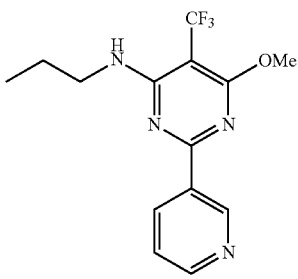

The analysis results were as follows.
$^1$H NMR (400 MHz, CDCl$_3$) δppm: 9.61 (dd, J=2.1, 0.9 Hz, 1H), 8.71 (dd, J=6.4, 1.5 Hz, 1H), 8.64 (ddd, J=8.0, 1.8, 1.8 Hz, 1H), 7.39 (ddd, J=8.0, 4.9, 0.9 Hz, 1H), 5.65 (br, 1H), 4.10 (s, 3H), 3.60 (dt, J=6.7, 6.7 Hz, 2H), 1.70 (tq, J=7.6, 7.0 Hz, 2H), 1.01 (t, J=7.3 Hz, 3H)
APCI-MS (m/z): 313.8 [M+H]$^+$ Example 19

Production of 4,6-dimethoxy-2-(2-pyridyl)-5-trifluoromethylpyrimidine

In 1.0 ml of methanol, 0.11 g (0.39 mmol) of 4-fluoro-6-methoxy-2-(2-pyridyl)-5-trifluoromethylpyrimidine was dissolved, 1.0 ml of a 28% sodium methoxide-containing methanol solution was added thereto, and the mixture was stirred at room temperature for 8.1 hours. Water was added to the reaction solution, the mixture was extracted with ethyl acetate, and the organic phase was dried over sodium sulfate. The dried organic phase was filtered, and the filtrate was concentrated, followed by column purification, to give 0.11 g (0.39 mmol) of 4,6-dimethoxy-2-(2-pyridyl)-5-trifluoromethylpyrimidine having the following structure. The yield was 99%.

[Formula 58]

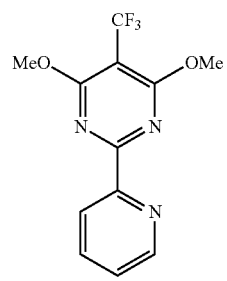

The analysis results were as follows.
$^1$H NMR (400 MHz, CDCl$_3$) δppm: 8.86 (m, 1H), 8.48 (m, 1H), 7.87 (ddd, J=8.0, 8.0, 1.8 Hz, 1H), 7.45 (ddd, J=7.5, 4.9, 1.2 Hz, 1H), 4.21 (s, 6H)
APCI-MS (m/z): 286.0 [M+H]$^+$ Example 20

Production of N-propyl-6-methoxy-2-(2-pyridyl)-5-(trifluoromethyl)-4-pyrimidinamine In 5.0 ml of DMF, 0.07 g (1.21 mmol) of n-propylamine was dissolved, 0.02 g (0.40 mmol) of sodium hydride was added thereto, and the mixture was stirred at room temperature for 45 minutes. 0.11 g (0.41 mmol) of 4-fluoro-6-methoxy-2-(2-pyridyl)-5-trifluoromethylpyrimidine was then added thereto, and the mixture was stirred at room temperature for 5.3 hours. Water was added to the reaction solution, the mixture was extracted with ethyl acetate, and the organic phase was dried over sodium sulfate. The dried organic phase was filtered, and the filtrate was concentrated, followed by column purification, to give 0.10 g (0.33 mmol) of N-propyl-6-methoxy-2-(2-pyridyl)-5-(trifluoromethyl)-4-pyrimidinamine having the following structure. The yield was 80%.

[Formula 59]

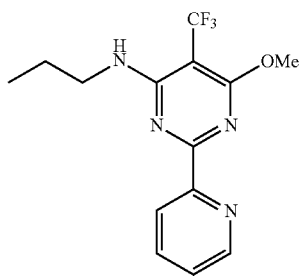

The analysis results were as follows.

¹H NMR (400 MHz, CDCl₃) δppm: 8.82 (ddd, J=4.9, 1.8, 0.9 Hz, 1H), 8.42 (ddd, J=8.0, 1.2, 0.9 Hz, 1H), 7.83 (ddd, J=7.6, 7.6, 1.8 Hz, 1H), 7.40 (ddd, J=7.6, 4.9, 1.2 Hz, 1H), 5.63 (br, 1H), 4.15 (s, 3H), 3.65 (dt, J=7.0, 5.8 Hz, 2H), 1.70 (tq, J=7.3, 7.3 Hz, 2H), 1.01 (t, J=7.3 Hz, 3H)

APCI-MS (m/z): 312.8 [M+H]⁺

Example 21

Production of 4,6-dibromo-2-(4-pyridyl)-5-trifluoromethylpyrimidine

In 1.0 ml of dichloroethane, 0.03 g of a crude product of 6-hydroxy-2-(4-pyridyl)-5-(trifluoromethyl)-4(3H)-pyrimidinone obtained in Step 1) of Example 11 was dissolved, 2.0 g of POBr₃ was added thereto, and the mixture was stirred at 65° C. for 40 minutes, at 80° C. for 2 hours, at 90° C. for 8 hours, and at 110° C. for 9.5 hours. After being cooled to room temperature in the air, the reaction solution was added dropwise to ice and extracted with ethyl acetate. After drying over magnesium sulfate, filtration was performed. The filtrate was concentrated, followed by column purification, to give a trace amount of 4,6-dibromo-2-(4-pyridyl)-5-trifluoromethylpyrimidine having the following structure.

[Formula 60]

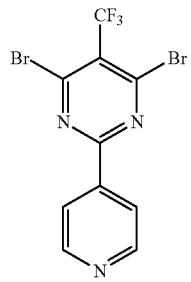

The analysis results were as follows.
¹H NMR (400 MHz, CDCl₃) δppm: 8.85 (dd, J=4.4, 1.6 Hz, 2H), 8.28 (dd, J=4.8, 2.0 Hz, 2H)

APCI-MS (m/z): 383.5 [M+H]⁺

Example 22

Production of 6-methoxy-4-[(4-methylphenyl)thio]-2-(3-pyridyl)-5-trifluoromethylpyrimidine In 5.0 ml of DMF, 0.04 g (0.33 mmol) of p-toluenethiol was dissolved, 0.01 g (0.25 mmol) of sodium hydride was added thereto, and the mixture was stirred at room temperature for 30 minutes. 0.10 g (0.36 mmol) of 4-fluoro-6-methoxy-2-(3-pyridyl)-5-trifluoromethylpyrimidine was then added thereto, and the mixture was stirred at room temperature for 26 hours. Water was added to the reaction solution, the mixture was extracted with ethyl acetate, and the organic phase was dried over sodium sulfate. The dried organic phase was filtered, and the filtrate was concentrated, followed by column purification, to give 6-methoxy-4-[(4-methylphenyl)thio]-2-(3-pyridyl)-5-trifluoromethylpyrimidine having the following structure.

[Formula 61]

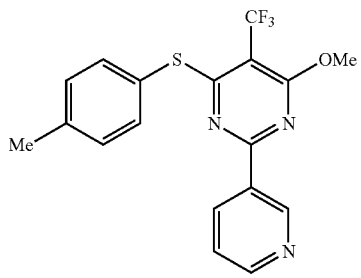

The analysis results were as follows.
¹H NMR (400 MHz, CDCl₃) δppm: 9.12 (dd, J=2.1, 0.9 Hz, 1H), 8.63 (dd, J=4.9, 1.5 Hz, 1H), 8.17 (ddd, J=8.0, 2.1, 1.8 Hz, 1H), 7.46 (d, J=8.3 Hz, 2H), 7.31 (d, J=7.6 Hz, 2H), 7.25 (ddd, J=8.0, 4.9, 0.6 Hz, 1H), 4.16 (s, 3H), 2.48 (s, 3H)

APCI-MS (m/z): 377.3 [M+H]⁺

Example 23

Production of 6-methoxy-4-[(4-methylphenyl)thio]-2-(2-pyridyl)-5-trifluoromethylpyrimidine In 5.0 ml of DMF, 0.04 g (0.34 mmol) of p-toluenethiol was dissolved, 0.01 g (0.23 mmol) of sodium hydride was added thereto, and the mixture was stirred at room temperature for 30 minutes. 0.10 g (0.37 mmol) of 4-fluoro-6-methoxy-2-(2-pyridyl)-5-trifluoromethylpyrimidine was then added thereto, and the mixture was stirred at room temperature for 26.5 hours. Water was added to the reaction solution, the mixture was extracted with ethyl acetate, and the organic phase was dried over sodium sulfate. The dried organic phase was filtered, and the filtrate was concentrated, followed by column purification, to give 0.11 g (0.28 mmol) of 6-methoxy-4-[(4-methylphenyl)thio]-2-(2-pyridyl)-5-trifluoromethylpyrimidine having the following structure. The yield was 76.7%.

[Formula 62]

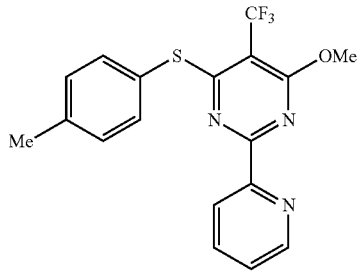

The analysis results were as follows.
¹H NMR (400 MHz, CDCl₃) δppm: 8.74 (ddd, J=4.9, 2.8, 1.5 Hz, 1H), 7.59 (m, 2H), 7.48 (m, 2H), 7.31 (m, 3H), 4.25 (s, 3H)

APCI-MS (m/z): 377.4 [M+H]⁺

Example 24

Production of 6-chloro-4-fluoro-2-(4-pyridyl)-5-trifluoromethylpyrimidine

To 25 ml of sulfolane dried under reduced pressure using 10 ml of toluene were added 0.10 g (0.35 mmol) of 4,6- dichloro-2-(4-pyridyl)-5-trifluoromethylpyrimidine obtained in Example 11 and 0.02 g (0.34 mmol) of potassium fluoride was added thereto, and the mixture was stirred at 148° C. for 18.8 hours. Another 0.02 g (0.34 mmol) of potassium fluoride was then added thereto, and the mixture was stirred at 148° C. for 7 hours. The mixture was cooled to room temperature in the air, followed by addition of water and extraction of diethyl ether. After drying over magnesium sulfate, filtration was performed, and the filtrate was concentrated, followed by column purification, to give a trace amount of 6-chloro-4-fluoro-2-(4-pyridyl)-5-trifluoromethylpyrimidine having the following structure.

[Formula 63]

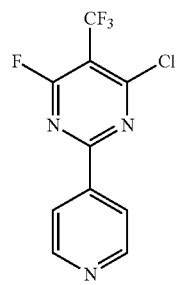

The analysis results were as follows.
$^1$H NMR (400 MHz, CDCl$_3$) δppm: 8.74 (d, J=4.9 Hz, 2H), 8.24 (d, J=5.4 Hz, 1H)
APCI-MS (m/z): 277.0 [M+H]$^+$ Example 25

Production of 6-methoxy-N-(4-methylphenyl)-2-(2-pyridyl)-5-(trifluoromethyl)-4-pyrimidinamine In 6.1 ml of DMF, 0.24 g (2.22 mmol) of p-toluidine was dissolved, 0.09 g (2.27 mmol) of sodium hydride was added thereto, and the mixture was stirred at room temperature for 30 minutes. Thereafter, 0.50 g (1.83 mmol) of 4-fluoro-6-methoxy-2-(2-pyridyl)-5-trifluoromethylpyridine was added thereto, and the mixture was stirred at 100° C. for 18.8 hours. Water was added to the reaction solution, the mixture was extracted with ethyl acetate, and the organic phase was dried over sodium sulfate. The dried organic phase was filtered, and the filtrate was concentrated, followed by column purification, to give 0.31 g (0.87 mmol) of 6-methoxy-N-(4-methylphenyl)-2-(2-pyridyl)-5-(trifluoromethyl)-4-pyrimidinamine having the following structure. The yield was 48%.

[Formula 64]

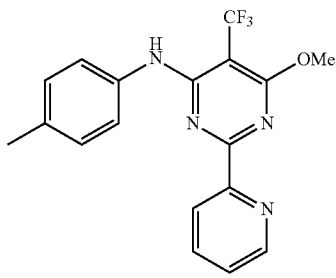

The analysis results were as follows.
$^1$H NMR (400 MHz, CDCl$_3$) δppm: 8.81 (m, 1H), 8.31 (d, J=8.0 Hz, 1H), 7.80 (ddd, J=7.6, 7.6, 1.8 Hz, 1H), 7.49 (d, J=8.2 Hz, 2H), 7.32-7.40 (m, 2H), 7.21 (d, J=8.3 Hz, 2H), 4.21 (s, 3H), 2.37 (s, 3H)
APCI-MS (m/z): 360.1 [M+H]$^+$ Example 26

Production of 6-methoxy-N-(4-methylphenyl)-2-(3-pyridyl)-5-(trifluoromethyl)-4-pyrimidinamine In 49.0 ml of DMF, 1.89 g (17.60 mmol) of p-toluidine was dissolved, 0.72 g (17.98 mmol) of sodium hydride was added thereto, and the mixture was stirred at room temperature for 30 minutes. Thereafter, 4.02 g (14.73 mmol) of 4-fluoro-6-methoxy-2-(3-pyridyl)-5-trifluoromethylpyridine was added thereto, and the mixture was stirred at 100° C. for 24 hours. Water was added to the reaction solution, the mixture was extracted with ethyl acetate, and the organic phase was dried over sodium sulfate. The dried organic phase was filtered, and the filtrate was concentrated, followed by column purification, to give 0.71 g (1.98 mmol) of 6-methoxy-N-(4-methylphenyl)-2-(3-pyridyl)-5-(trifluoromethyl)-4-pyrimidinamine having the following structure. The yield was 13%.

[Formula 65]

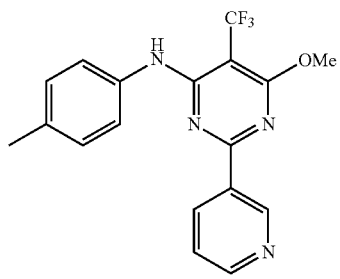

The analysis results were as follows.
$^1$H NMR (400 MHz, CDCl$_3$) δppm: 9.52 (m, 1H), 8.68 (dd, J=4.6, 1.2 Hz, 1H), 8.54 (ddd, J=8.0, 1.5, 1.5 Hz, 1H), 7.40 (d, J=8.3 Hz, 2H), 7.35 (dd, J=8.0, 4.9 Hz, 1H), 7.31 (br, 1H), 7.21 (d, J=8.3 Hz, 2H), 4.13 (s, 3H), 2.38 (s, 3H)
APCI-MS (m/z): 360.0 [M+H]$^+$ Example 27

Production of 6-methoxy-N-(4-methylphenyl)-2-(4-pyridyl)-5-(trifluoromethyl)-4-pyrimidinamine In 6.1 ml of DMF, 0.24 g (2.27 mmol) of p-toluidine was dissolved, 0.09 g (2.30 mmol) of sodium hydride was added thereto, and the mixture was stirred at room temperature for 30 minutes. Thereafter, 0.50 g (1.82 mmol) of 4-fluoro-6-methoxy-2-(4-pyridyl)-5-trifluoromethylpyridine was added thereto, and the mixture was stirred at 100° C. for 24 hours. Water was added to the reaction solution, the mixture was extracted with ethyl acetate, and the organic phase was dried over sodium sulfate. The dried organic phase was filtered, and the filtrate was concentrated, followed by column purification, to give 0.24 g (0.65 mmol) of 6-methoxy-N-(4-methylphenyl)-2-(4-pyridyl)-5-(trifluoromethyl)-4-pyrimidinamine having the following structure. The yield was 36%.

[Formula 66]

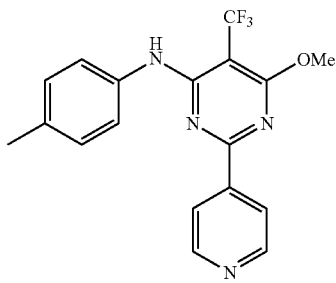

The analysis results were as follows.
$^1$H NMR (400 MHz, CDCl$_3$) δppm: 8.73 (dd, J=4.3, 1.4 Hz, 2H), 8.13 (dd, J=4.3, 1.8 Hz, 2H), 7.41 (d, J=8.3 Hz, 2H), 7.33 (br, 1H), 7.23 (d, J=8.3 Hz, 2H), 4.16 (s, 3H), 2.40 (s, 3H)
APCI-MS (m/z): 360.0 [M+H]$^+$ Example 28

Production of 6-chloro-N-(4-methylphenyl)-2-(4-pyridyl)-5-(trifluoromethyl)-4-pyrimidinamine In 1.1 ml of DMF, 0.04 g (0.36 mmol) of p-toluidine was dissolved, 0.02 g (0.45 mmol) of sodium hydride was added thereto, and the mixture was stirred at room temperature for 30 minutes. Thereafter, 0.10 g (0.34 mmol) of 4,6-dichloro-2-(4-pyridyl)-5-trifluoromethylpyrimidine obtained in Example 11 was added thereto, and the mixture was stirred at room temperature for 18.3 hours. Water was added to the reaction solution, the mixture was extracted with ethyl acetate, and the organic phase was dried over sodium sulfate. The dried organic phase was filtered, and the filtrate was concentrated, followed by column purification, to give 0.11 g (0.30 mmol) of 6-chloro-N-(4-methylphenyl)-2-(4-pyridyl)-5-(trifluoromethyl)-4-pyrimidinamine having the following structure. The yield was 89%.

[Formula 67]

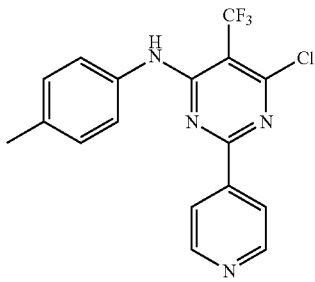

The analysis results were as follows.
$^1$H NMR (400 MHz, CDCl$_3$) δppm: 8.74 (dd, J=4.6, 1.5 Hz, 2H), 8.10 (dd, J=4.3, 1.8 Hz, 2H), 7.51 (br, 1H), 7.39 (d, J=8.3 Hz, 2H), 7.27 (d, J=8.3 Hz, 2H), 2.42 (s, 3H)
APCI-MS (m/z): 365.1 [M+H]$^+$ Example 29

Production of 4,6-bis(1,1-dimethylethoxy)-2-(2-pyridyl)-5-trifluoromethylpyrimidine In 48.0 ml of THF, 4.00 g (14.64 mmol) of 4-fluoro-6-methoxy-2-(2-pyridyl)-5-trifluoromethylpyridine was dissolved, 4.14 g (36.89 mmol) of potassium tert-butoxide was added thereto, and the mixture was stirred at 50° C. for 29.8 hours. After the reaction solution was concentrated, saturated aqueous ammonium chloride solution was added thereto, the mixture was extracted with ethyl acetate, and the extract was dried over sodium sulfate, filtered, concentrated, and purified by column to give 2.34 g (6.34 mmol) of 4,6-bis(1,1-dimethylethoxy)-2-(2-pyridyl)-5-trifluoromethylpyrimidine having the following structure. The yield was 43%.

[Formula 68]

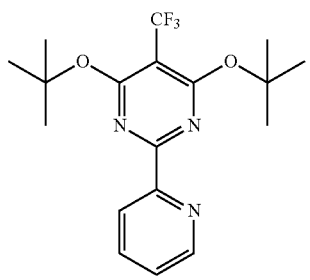

The analysis results were as follows. However, for APCI-MS (m/z), m/z of a product from which two tert-butyl groups had been removed was detected.
$^1$H NMR (400 MHz, CDCl$_3$) δppm: 8.81 (ddd, J=4.6, 1.8, 0.9 Hz, 1H), 8.29 (ddd, J=8.0, 1.2, 0.9 Hz, 1H), 7.82 (ddd, J=7.6, 7.6, 1.5 Hz, 1H), 7.38 (ddd, J=7.3, 4.6, 1.2 Hz, 1H), 1.71 (s, 18H)
APCI-MS (m/z): 257.9 [M−tBu]$^+$ Example 30

Production of 6-hydroxy-2-(2-pyridyl)-5-(trifluoromethyl)-4(3H)-pyrimidinone

In 10.5 ml of dichloromethane, 2.34 g (6.34 mmol) of 4,6-bis(1,1-dimethylethoxy)-2-(2-pyridyl)-5-trifluoromethylpyrimidine obtained in Example 29 was dissolved, 10.5 ml of trifluoroacetic acid (TFA) was added thereto, and the mixture was stirred at room temperature for 15.7 hours. Thereafter, the reaction solution was concentrated, washed with ethyl acetate, and filtered to give 1.55 g (6.01 mmol) of 6-hydroxy-2-(2-pyridyl)-5-(trifluoromethyl)-4(3H)-pyrimidinone having the following structure. The yield was 95%.

[Formula 69]

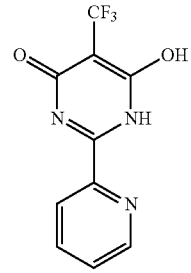

The analysis results were as follows.
$^1$H NMR (400 MHz, DMSO-d6) δppm: 12.74 (br, 2H), 8.79 (ddd, J=4.6, 1.5, 0.9 Hz, 1H), 8.27 (ddd, J=8.0, 1.2, 0.9 Hz, 1H), 8.11 (ddd, J=7.6, 7.6, 1.8 Hz, 1H), 7.72 (ddd, J=7.6, 4.6, 1.2 Hz, 1H)
APCI-MS (m/z): 255.7 [M+H]$^-$

Example 31

Production of 4,6-dichloro-2-(2-pyridyl)-5-trifluoromethylpyrimidine

In 10.0 ml of POCl₃, 1.00 g (3.88 mmol) of 6-hydroxy-2-(2-pyridyl)-5-(trifluoromethyl)-4(3H)-pyrimidinone obtained in Example 30 was dissolved, 3 drops of DMF were added thereto, and the mixture was stirred under conditions of heat reflux for 6 hours. After being cooled to room temperature in the air, the reaction solution was added dropwise to ice to which baking soda had been added, neutralized, and then extracted with ethyl acetate. After drying over sodium sulfate, filtration was performed. The filtrate was concentrated, followed by column purification, to give 0.98 g (3.34 mmol) of 4,6-dichloro-2-(2-pyridyl)-5-trifluoromethylpyrimidine having the following structure. The yield was 86%.

[Formula 70]

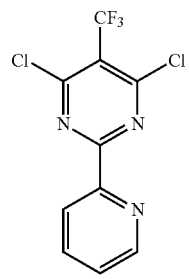

The analysis results were as follows.

¹H NMR (400 MHz, CDCl₃) δppm: 8.92 (d, J=4.6 Hz, 1H), 8.57 (d, J=8.0 Hz, 1H), 7.93 (ddd, J=8.0, 8.0, 1.8 Hz, 1H), 7.52 (ddd, J=7.6, 4.9, 1.2 Hz, 1H)

APCI-MS (m/z): 293.8 [M+H]⁺

Example 32

Production of 6-chloro-N-(4-methylphenyl)-2-(2-pyridyl)-5-(trifluoromethyl)-4-pyrimidinamine In 4.0 ml of DMF, 0.36 g (3.34 mmol) of p-toluidine was dissolved, 0.17 g (4.25 mmol) of sodium hydride was added thereto, and the mixture was stirred at room temperature for 30 minutes. Thereafter, 0.98 g (3.34 mmol) of 4,6-dichloro-2-(2-pyridyl)-5-trifluoromethylpyrimidine obtained in Example 30, which has been dissolved in 7.0 ml of DMF, was added thereto, and the mixture was stirred at room temperature for 21.7 hours. Water was added to the reaction solution, the mixture was extracted with ethyl acetate, and the organic phase was dried over sodium sulfate. The dried organic phase was filtered, and the filtrate was concentrated, followed by column purification, to give 0.89 g (2.44 mmol) of 6-chloro-N-(4-methylphenyl)-2-(2-pyridyl)-5-(trifluoromethyl)-4-pyrimidinamine having the following structure. The yield was 73%.

[Formula 71]

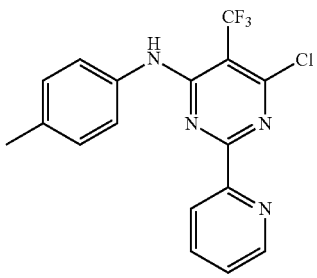

The analysis results were as follows.

¹H NMR (400 MHz, CDCl₃) δppm: 8.84 (ddd, J=4.6, 1.8, 0.9 Hz, 1H), 8.24 (ddd, J=8.0, 0.9, 0.9 Hz, 1H), 7.80 (ddd, J=8.0, 7.6, 1.8 Hz, 1H), 7.52 (br, 1H), 7.45 (dd, J=8.3, 1.8, 1.8 Hz, 2H), 7.41 (ddd, J=7.6, 4.9, 1.2 Hz, 1H), 7.25 (d, J=9.2 Hz, 2H), 2.40 (s, 3H)

APCI-MS (m/z): 365.0 [M+H]⁺

Example 33

Production of 4,6-bis(1,1-dimethylethoxy)-2-(3-pyridyl)-5-trifluoromethylpyrimidine In 48.0 ml of THF, 4.00 g (14.63 mmol) of 4-fluoro-6-methoxy-2-(3-pyridyl)-5-trifluoromethylpyridine was dissolved, 4.12 g (36.68 mmol) of potassium tert-butoxide was added thereto, and the mixture was stirred at 50° C. for 29.8 hours. After the reaction solution was concentrated, saturated aqueous ammonium chloride solution was added thereto, the mixture was extracted with ethyl acetate, which was dried over sodium sulfate and filtered. The filtrate was concentrated, followed by column purification, to give 2.2 g (6.0 mmol) of 4,6-bis(1,1-dimethylethoxy)-2-(3-pyridyl)-5-trifluoromethylpyrimidine having the following structure. The yield was 41%.

[Formula 72]

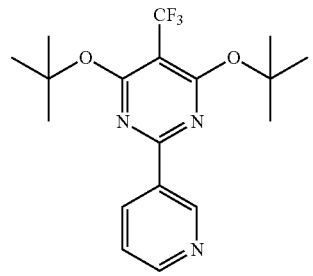

Analysis results of 4,6-bis(1,1-dimethylethoxy)-2-(3-pyridyl)-5-trifluoromethylpyrimidine were as follows.

¹H NMR (400 MHz, CDCl₃) δppm: 9.56 (dd, J=2.1, 0.6 Hz, 1H), 8.73 (dd, J=4.9, 1.5 Hz, 1H), 8.55 (dd, J=8.0, 2.1, 1.8 Hz, 1H), 7.43 (ddd, J=8.0, 4.9, 0.9 Hz, 1H), 1.70 (s, 18H)

APCI-MS (m/z): 370.1 [M+H]⁺

At the same time, 0.3 g (yield: 5%) of 4-(1,1-dimethylethoxy)-6-methoxy-2-(3-pyridyl)-5-trifluoromethylpyrimidine was also obtained.

[Formula 73]

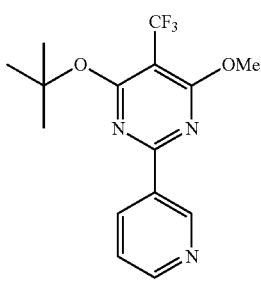

Analysis results of 4-(1,1-dimethylethoxy)-6-methoxy-2-(3-pyridyl)-5-trifluoromethylpyrimidine were as follows.
$^1$H NMR (400 MHz, CDCl$_3$) δppm: 9.60 (d, J=2.1 Hz, 1H), 8.74 (dd, J=4.9, 1.8 Hz, 1H), 8.62 (ddd, J=8.3, 2.1, 1.8 Hz, 1H), 7.43 (ddd, J=8.0, 4.9, 0.6 Hz, 1H), 4.14 (s, 3H), 1.70 (s, 18H)
APCI-MS (m/z): 328.1 [M+H]$^+$ Example 34

Production of 6-hydroxy-2-(3-pyridyl)-5-(trifluoromethyl)-4(3H)-pyrimidinone

In 10.0 ml of dichloromethane, 2.22 g (6.02 mmol) of 4,6-bis(1,1-dimethylethoxy)-2-(3-pyridyl)-5-trifluoromethylpyrimidine obtained in Example 33 was dissolved, 10.0 ml of trifluoroacetic acid (TFA) was added thereto, and the mixture was stirred at room temperature for 20.4 hours. The reaction solution was then concentrated, washed with ethyl acetate, and filtered to give a crude product of 6-hydroxy-2-(3-pyridyl)-5-(trifluoromethyl)-4(3H)-pyrimidinone having the following structure.

[Formula 74]

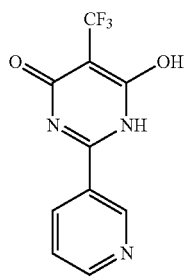

The analysis results were as follows.
$^1$H NMR (400 MHz, DMSO-d6) δppm: 13.10 (br, 2H), 9.15 (d, J=1.7 Hz, 1H), 8.80 (dd, J=4.9, 1.8 Hz, 1H), 8.37 (ddd, J=8.0, 2.1, 1.8 Hz, 1H), 7.61 (ddd, J=8.0, 4.9, 0.6 Hz, 1H)
APCI-MS (m/z): 255.9 [M+H]$^-$ Example 35

Production of 4,6-dichloro-2-(3-pyridyl)-5-trifluoromethylpyrimidine

In 10.0 ml of POCl$_3$, 1.0 g of the crude product of 6-hydroxy-2-(3-pyridyl)-5-(trifluoromethyl)-4(3H)-pyrimidinone obtained in Example 34 was dissolved, 3 drops of DMF were added thereto, and the mixture was stirred under conditions of heat reflux for 6 hours. After being cooled to room temperature in the air, the reaction solution was added dropwise to ice to which baking soda had been added, neutralized, and then extracted with ethyl acetate. After drying over sodium sulfate, filtration was performed. The filtrate was concentrated, followed by column purification, to give 0.63 g (2.16 mmol) of 4,6-dichloro-2-(3-pyridyl)-5-trifluoromethylpyrimidine having the following structure.

[Formula 75]

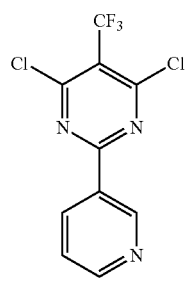

The analysis results were as follows.
$^1$H NMR (400 MHz, CDCl$_3$) δppm: 9.66 (d, J=1.5 Hz, 1H), 8.83 (dd, J=4.9, 1.5 Hz, 1H), 8.73 (ddd, J=8.0, 2.1, 1.8 Hz, 1H), 7.49 (ddd, J=8.0, 4.9, 0.9 Hz, 1H)
APCI-MS (m/z) 293.9 [M+H]$^+$ Example 36

Production of 6-chloro-N-(4-methylphenyl)-2-(3-pyridyl)-5-(trifluoromethyl)-4-pyrimidinamine In 2.0 ml of DMF, 0.23 g (2.17 mmol) of p-toluidine was dissolved, 0.11 g (2.63 mmol) of sodium hydride was added thereto, and the mixture was stirred at room temperature for 30 minutes. Thereafter, 0.63 g (2.16 mmol) of 4,6-dichloro-2-(3-pyridyl)-5-trifluoromethylpyrimidine obtained in Example 35, which has been dissolved in 8.0 ml of DMF, was added thereto, and the mixture was stirred at room temperature for 21.5 hours. Water was added to the reaction solution, the mixture was extracted with ethyl acetate, and the organic phase was dried over sodium sulfate. The dried organic phase was filtered, and the filtrate was concentrated, followed by column purification, to give 0.51 g (1.40 mmol) of 6-chloro-N-(4-methylphenyl)-2-(3-pyridyl)-5-(trifluoromethyl)-4-pyrimidinamine having the following structure. The yield was 65%.

[Formula 76]

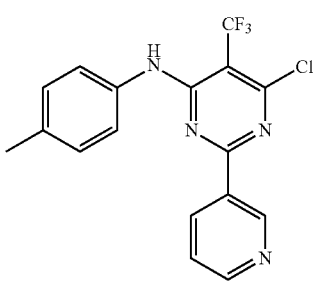

The analysis results were as follows.

¹H NMR (400 MHz, CDCl₃) δppm: 9.45 (dd, J=2.1, 0.6 Hz, 1H), 8.72 (dd, J=4.9, 1.5 Hz, 1H), 8.56 (ddd, J=8.0, 2.1, 1.8 Hz, 1H), 7.49 (br, 1H), 7.36-7.40 (m, 3H), 7.25 (d, J=9.5 Hz, 2H), 2.40 (s, 3H)

APCI-MS (m/z): 365.1 [M+H]⁺

Example 37

Production of 6-methoxy-N-(4-methylphenyl)-2-(6-n-propyl-2-pyridyl)-5-(trifluoromethyl)-4-pyrimidinamine In 2.0 ml of DMF, 0.4 g (3.3 mmol) of p-toluidine was dissolved, 0.13 g (3.3 mmol) of sodium hydride was added thereto, and the mixture was stirred at room temperature for 35 minutes. Thereafter, 0.9 g (2.7 mmol) of 4-fluoro-6-methoxy-2-(3-n-propyl-2-pyridyl)-5-trifluoromethylpyridine dissolved in 7.0 ml of DMF was added thereto, and the mixture was stirred at room temperature for 51.7 hours. Water was added to the reaction solution, the mixture was extracted with ethyl acetate, and the organic phase was dried over sodium sulfate. The dried organic phase was filtered, and the filtrate was concentrated, followed by column purification, to give 0.7 g (1.7 mmol) of 6-methoxy-N-(4-methylphenyl)-2-(6-n-propyl-2-pyridyl)-5-(trifluoromethyl)-4-pyrimidinamine having the following structure. The yield was 61%.

[Formula 77]

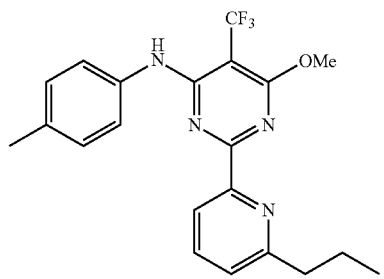

The analysis results were as follows.

¹H NMR (400 MHz, CDCl₃) δppm: 8.14 (d, J=7.6 Hz, 1H), 7.70 (dd, J=8.0, 7.6 Hz, 1H), 7.64 (d, J=8.6 Hz, 2H), 7.36 (br, 1H), 7.25 (d, J=8.3 Hz, 1H), 7.18 (d, J=8.3 Hz, 2H), 4.18 (s, 3H), 2.90 (t, J=7.6 Hz, 1H), 2.36 (s, 3H), 1.92 (tq, J=7.3, 7.3 Hz, 2H), 1.05 (t, J=7.3 Hz, 3H)

APCI-MS (m/z): 403.0 [M+H]⁺

Example 38

Production of 6-methoxy-2-(2-methoxy-5-pyridyl)-N-(4-methylphenyl)-5-(trifluoromethyl)-4-pyrimidinamine In 1.0 ml of DMF, 0.03 g (0.3 mmol) of p-toluidine was dissolved, 0.02 g (0.6 mmol) of sodium hydride was added thereto, and the mixture was stirred at room temperature for 30 minutes. Thereafter, 0.1 g (0.3 mmol) of 4-fluoro-6-methoxy-2-(2-methoxy-5-pyridyl)-5-trifluoromethylpyridine was added thereto, and the mixture was stirred at room temperature for 25 hours. Water was added to the reaction solution, the mixture was extracted with ethyl acetate, and the organic phase was dried over sodium sulfate. The dried organic phase was filtered, and the filtrate was concentrated, followed by column purification, to give 0.002 g (0.005 mmol) of 6-chloro-2-(2-methoxy-5-pyridyl)-N-(4-methylphenyl)-5-(trifluoromethyl)-4-pyrimidinamine having the following structure. The yield was 2%.

[Formula 78]

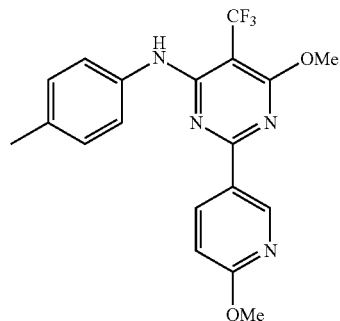

The analysis results were as follows.

¹H NMR (400 MHz, CDCl₃) δppm: 9.14 (d, J=1.8 Hz, 1H), 8.44 (dd, J=2.5, 8.6 Hz, 1H), 7.40 (d, J=8.3 Hz, 2H), 7.26 (br, 1H), 7.21 (d, J=8.3 Hz, 1H), 6.78 (d, J=8.3 Hz, 2H), 4.11 (s, 3H), 4.00 (s, 3H), 2.38 (s, 3H)

APCI-MS (m/z): 390.5 [M]⁺

Example 39

Production of 6-methoxy-2-(2-methoxy-5-pyridyl)-4-[(4-methylphenyl)thio]-5-trifluoromethylpyrimidine In 5.0 ml of DMF, 0.08 g (0.3 mmol) of p-toluenethiol was dissolved, 0.02 g (0.5 mmol) of sodium hydride was added thereto, and the mixture was stirred at room temperature for 30 minutes. Thereafter, the reaction solution was cooled to 0° C., 0.09 g (0.3 mmol) of 4-fluoro-6-methoxy-2-(2-methoxy-5-pyridyl)-5-trifluoromethylpyridine was added thereto, and the mixture was stirred at room temperature for 16.5 hours. Water was added to the reaction solution, the mixture was extracted with ethyl acetate, and the organic phase was dried over sodium sulfate. The dried organic phase was filtered, and the filtrate was concentrated, followed by column purification, to give 0.1 g (0.2 mmol) of 6-methoxy-2-(2-methoxy-5-pyridyl)-4-[(4-methylphenyl)thio]-5-trifluoromethylpyrimidine having the following structure. The yield was 80%.

[Formula 79]

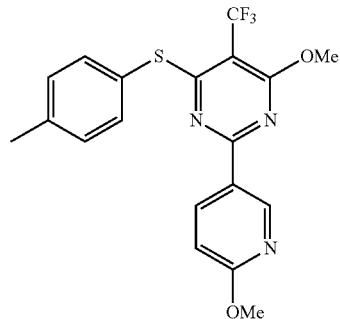

The analysis results were as follows.

¹H NMR (400 MHz, CDCl₃) δppm: 8.82 (d, J=2.5 Hz, 1H), 7.95 (dd, J=8.9, 2.5 Hz, 1H), 7.45 (d, J=8.3 Hz, 2H), 7.30 (d, J=8.0 Hz, 2H), 6.63 (d, J=8.6 Hz, 1H), 4.12 (s, 3H), 3.97 (s, 3H), 2.47 (s, 3H)
APCI-MS (m/z): 407.4 [M]⁺

Example 40

Production of 6-methoxy-2-(2-methoxy-5-pyridyl)-4-(phenylmethoxy)-5-trifluoromethylpyrimidine In 3.0 ml of DMF, 0.05 g (0.5 mmol) of benzyl alcohol was dissolved, 0.03 g (0.7 mmol) of sodium hydride was added thereto, and the mixture was stirred at room temperature for 30 minutes. Thereafter, the reaction solution was cooled to 0° C., 0.09 g (0.3 mmol) of 4-fluoro-6-methoxy-2-(6-methoxy-3-pyridyl)-5-trifluoromethylpyridine was added thereto, and the mixture was stirred at room temperature for 19 hours. Water was added to the reaction solution, the mixture was extracted with ethyl acetate, and the organic phase was dried over sodium sulfate. The dried organic phase was filtered, and the filtrate was concentrated, followed by column purification, to give 0.08 g (0.2 mmol) of 6-methoxy-2-(2-methoxy-5-pyridyl)-4-(phenylmethoxy)-5-trifluoromethylpyrimidin having the following structure. The yield was 72%.

[Formula 80]

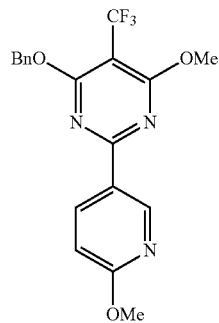

The analysis results were as follows.
¹H NMR (400 MHz, CDCl₃) δppm: 9.26 (ddd, J=7.6, 2.5, 0.6 Hz, 1H), 8.54 (ddd, J=9.5, 8.6, 2.1 Hz, 1H), 7.30-7.50 (m, 5H), 6.83 (d, J=8.6 Hz, 1H), 5.63 (s, 2H), 4.13 (s, 3H), 4.03 (d, J=8.6 Hz, 3H)
APCI-MS (m/z): 391.5 [M]⁺

Example 41

Production of 6-methoxy-N-(4-methylphenyl)-5-(trifluoromethyl)-2-(2-trifluoromethyl-5-pyridyl)-4-pyrimidinamine In 5.0 ml of DMF, 0.04 g (0.4 mmol) of p-toluidine was dissolved, 0.02 g (0.6 mmol) of sodium hydride was added thereto, and the mixture was stirred at room temperature for 30 minutes. Thereafter, the reaction solution was cooled to 0° C., 0.1 g (0.4 mmol) of 4-fluoro-6-methoxy-5-trifluoromethyl-2-(6-trifluoromethyl-3-pyridyl)pyridine was added thereto, and the mixture was stirred at room temperature for 26.8 hours. Water was added to the reaction solution, the mixture was extracted with ethyl acetate, and the organic phase was dried over sodium sulfate. The dried organic phase was filtered, and the filtrate was concentrated, followed by column purification, to give 0.001 g (0.002 mmol) of 6-methoxy-N-(4-methylphenyl)-5-(trifluoromethyl)-2-(2-trifluoromethyl-5-pyridyl)-4-pyrimidinamine having the following structure. The yield was 1%.

[Formula 81]

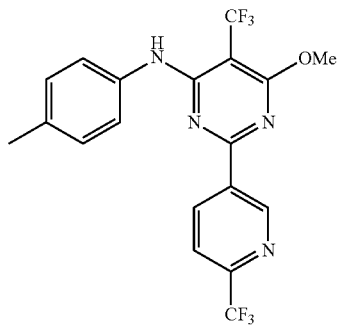

The analysis results were as follows.
¹H NMR (400 MHz, CDCl₃) δppm: 9.59 (s, 1H), 8.72 (dd, J=8.3, 1.2 Hz, 1H), 7.75 (d, J=8.0 Hz, 1H), 7.36 (d, J=8.3 Hz, 2H), 7.34 (br, 1H), 7.22 (d, J=8.3 Hz, 2H), 4.15 (s, 3H), 2.39 (s, 3H)
APCI-MS (m/z): 428.4 [M]⁺

Example 42

Production of 6-methoxy-4-[(4-methylphenyl)thio]-5-trifluoromethyl-2-(2-trifluoromethyl-5-pyridyl)pyrimidine In 5.0 ml of DMF, 0.04 g (0.3 mmol) of p-toluenethiol was dissolved, 0.02 g (0.6 mmol) of sodium hydride was added thereto, and the mixture was stirred at room temperature for 30 minutes. Thereafter, the reaction solution was cooled to 0° C., 0.1 g (0.3 mmol) of 4-fluoro-6-methoxy-5-trifluoromethyl-2-(6-trifluoromethyl-3-pyridyl)pyridine was added thereto, and the mixture was stirred at room temperature for 28.5 hours. Water was added to the reaction solution, the mixture was extracted with ethyl acetate, and the organic phase was dried over sodium sulfate. The dried organic phase was filtered, and the filtrate was concentrated, followed by column purification, to give 0.1 g (0.3 mmol) of 6-methoxy-4-[(4-methylphenyl)thio]-5-trifluoromethyl-2-(2-trifluoromethyl-5-pyridyl)pyrimidine having the following structure. The yield was 89%.

[Formula 82]

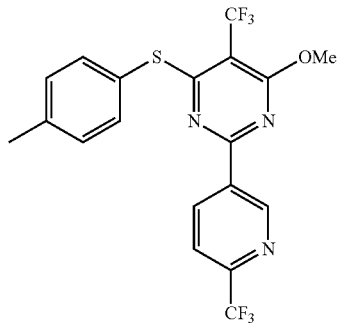

The analysis results were as follows.

¹H NMR (400 MHz, CDCl₃) δppm: 9.23 (d, J=1.8 Hz, 1H), 8.32 (dd, J=8.3, 1.2 Hz, 1H), 7.63 (dd, J=8.3, 0.6 Hz, 1H), 7.45 (m, 2H), 7.31 (m, 2H), 4.17 (s, 3H), 2.48 (s, 3H)
APCI-MS (m/z): 445.2 [M]⁺

Example 43

Production of 6-methoxy-4-phenoxy-5-trifluoromethyl 2-(2-trifluoromethyl-5-pyridyl)pyrimidine In 5.0 ml of DMF, 0.04 g (0.3 mmol) of phenol was dissolved, 0.02 g (0.5 mmol) of sodium hydride was added thereto, and the mixture was stirred at room temperature for 30 minutes. Thereafter, the reaction solution was cooled to 0° C., 0.1 g (0.3 mmol) of 4-fluoro-6-methoxy-5-trifluoromethyl-2-(2-trifluoromethyl-5-pyridyl)pyridine was added thereto, and the mixture was stirred at room temperature for 30.5 hours. Water was added to the reaction solution, the mixture was extracted with ethyl acetate, and the organic phase was dried over sodium sulfate. The dried organic phase was filtered, and the filtrate was concentrated, followed by column purification, to give 0.1 g (0.3 mmol) of 6-methoxy-4-phenoxy-5-trifluoromethyl 2-(2-trifluoromethyl-5-pyridyl)pyrimidine having the following structure. The yield was 97%.

[Formula 83]

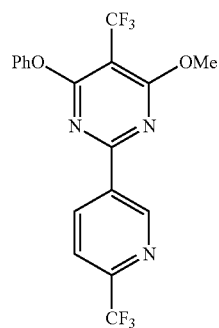

The analysis results were as follows.
¹H NMR (400 MHz, CDCl₃) δppm: 9.41 (d, J=1.8 Hz, 1H), 8.56 (dd, J=8.3, 1.2 Hz, 1H), 7.71 (d, J=7.6 Hz, 1H), 7.26 (br, 1H), 7.43-7.47 (m, 2H), 7.29-7.33 (m, 1H), 7.16-7.19 (m, 2H), 4.22 (s, 3H)
APCI-MS (m/z): 415.4 [M]⁺

Example 44

Production of 6-methoxy-N-(4-methylphenyl)-5-(trifluoromethyl)-2-(4-methylthio-2-pyridyl)-4-pyrimidinamine In 1.0 ml of DMF, 0.02 g (0.1 mmol) of p-toluidine was dissolved, 0.01 g (0.3 mmol) of sodium hydride was added thereto, and the mixture was stirred at room temperature for 30 minutes. Thereafter, the reaction solution was cooled to 0° C., 0.05 g (0.1 mmol) of 4-fluoro-6-methoxy-2-(4-methylthio-2-pyridyl)-5-trifluoromethylpyridine dissolved in 2 ml of DMF was added thereto, and the mixture was stirred at room temperature for 22.6 hours. Water was added to the reaction solution, the mixture was extracted with ethyl acetate, and the organic phase was dried over sodium sulfate. The dried organic phase was filtered, and the filtrate was concentrated, followed by column purification, to give a trace amount of 6-methoxy-N-(4-methylphenyl)-5-(trifluoromethyl)-2-(4-methylthio-2-pyridyl)-4-pyrimidinamine having the following structure.

[Formula 84]

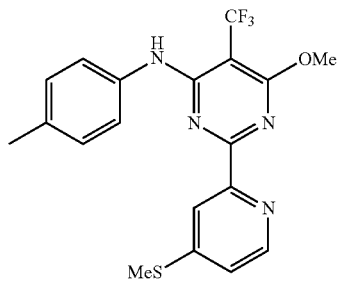

The analysis results were as follows.
¹H NMR (400 MHz, CDCl₃) δppm: 8.56 (d, J=5.5 Hz, 1H), 8.14 (d, J=2.1, 1H), 7.46 (d, J=8.6 Hz, 2H), 7.32-7.54 (m, 1H), 7.18-7.21 (m, 3H), 4.22 (s, 3H), 2.48 (s, 3H), 2.37 (s, 3H)
APCI-MS (m/z): 406.3 [M]⁺

Example 45

Production of 2-(2-bromo-3-pyridyl)-6-methoxy-N-(4-methylphenyl)-5-(trifluoromethyl)-4-pyrimidinamine In 3.0 ml of DMF, 0.03 g (0.2 mmol) of p-toluidine was dissolved, 0.01 g (0.4 mmol) of sodium hydride was added thereto, the mixture was stirred at room temperature for 30 minutes. Thereafter, the reaction solution was cooled to 0° C., 0.09 g (0.3 mmol) of 2-(2-bromo-5-pyridyl)-4-fluoro-6-methoxy-5-trifluoromethylpyridine was added thereto, and the mixture was stirred at room temperature for 22 hours. Water was added to the reaction solution, the mixture was extracted with ethyl acetate, and the organic phase was dried over sodium sulfate. The dried organic phase was filtered, and the filtrate was concentrated, followed by column purification, to give a trace amount of 2-(2-bromo-3-pyridyl)-6-methoxy-N-(4-methylphenyl)-5-(trifluoromethyl)-4-pyrimidinamine having the following structure.

[Formula 85]

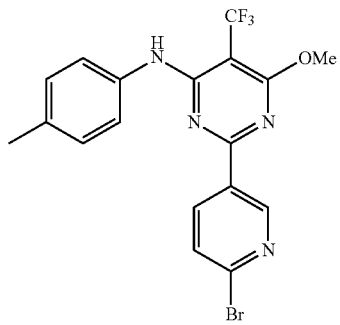

The analysis results were as follows.
¹H NMR (400 MHz, CDCl₃) δppm: 9.23 (ddd, J=2.5, 0.6 Hz, 1H), 8.38 (dd, J=8.3, 2.5 Hz, 1H), 7.54 (dd, J=8.3, 0.6

Hz, 1H), 7.36 (d, J=11.0 Hz, 2H), 7.30-7.32 (m, 1H), 7.20 (d, J=8.0 Hz, 1H), 4.13 (s, 3H), 2.38 (s, 3H)

APCI-MS (m/z): 440.3 [M+H]+

Example 46

Production of 2-(2-bromo-5-pyridyl)-6-methoxy-4-[(4-methylphenyl)thio]-5-trifluoromethylpyrimidine In 3.0 ml of DMF, 0.04 g (0.3 mmol) of p-toluenethiol was dissolved, 0.02 g (0.5 mmol) of sodium hydride was added thereto, the mixture was stirred at room temperature for 30 minutes. Thereafter, the reaction solution was cooled to 0° C., 0.10 g (0.3 mmol) of 2-(2-bromo-5-pyridyl)-4-fluoro-6-methoxy-5-trifluoromethylpyridine was added thereto, and the mixture was stirred at room temperature for 21.6 hours. Water was added to the reaction solution, the mixture was extracted with ethyl acetate, and the organic phase was dried over sodium sulfate. The dried organic phase was filtered, and the filtrate was concentrated, followed by column purification, to give 0.02 g (0.03 mmol) of 2-(2-bromo-5-pyridyl)-6-methoxy-4-[(4-methylphenyl)thio]-5-trifluoromethyprimidine having the following structure. The yield was 12%.

[Formula 86]

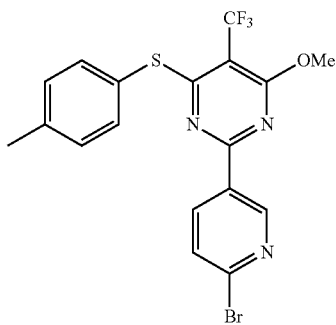

The analysis results were as follows.

1H NMR (400 MHz, CDCl3) δppm: 8.83 (d, J=2.5 Hz, 1H), 8.01 (dd, J=8.3, 2.5 Hz, 1H), 7.43-7.45 (m, 3H), 7.29 (d, J=8.3 Hz, 2H), 4.14 (s, 3H), 2.47 (s, 3H)

APCI-MS (m/z): 457.1 [M+H]+

Example 47

Production of 2-(2-bromo-5-pyridyl)-6-methoxy-4-phenoxy-5-trifluoromethylpyrimidine In 3.0 ml of DMF, 0.03 g (0.3 mmol) of phenol was dissolved, 0.02 g (0.4 mmol) of sodium hydride was added thereto, the mixture was stirred at room temperature for 30 minutes. Thereafter, the reaction solution was cooled to 0° C., 0.1 g (0.3 mmol) of 2-(2-bromo-5-pyridyl)-4-fluoro-6-methoxy-5-trifluoromethylpyridine was added thereto, and the mixture was stirred at room temperature for 19.8 hours. Water was added to the reaction solution, the mixture was extracted with ethyl acetate, and the organic phase was dried over sodium sulfate. The dried organic phase was filtered, and the filtrate was concentrated, followed by column purification, to give 0.13 g (0.3 mmol) of 2-(2-bromo-5-pyridyl)-6-methoxy-4-phenoxy-5-trifluoromethylpyrimidine having the following structure. The yield was 80%.

[Formula 87]

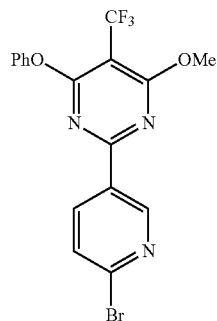

The analysis results were as follows.

1H NMR (400 MHz, CDCl3) δppm: 9.06 (d, J=2.0 Hz, 1H), 8.21 (dd, J=8.6, 2.5 Hz, 1H), 7.50 (d, J=8.3 Hz, 1H), 7.44 (t, J=7.8 Hz, 2H), 7.30 (t, J=7.6 Hz, 1H), 7.17 (d, J=8.0 Hz, 2H), 4.19 (s, 3H)

APCI-MS (m/z): 427.0 [M+H]+

Example 48

Production of 2-(2-dimethylamino-4-pyridyl)-6-methoxy-N-(4-methylphenyl)-5-(trifluoromethyl)-4-pyrimidinamine In 3.0 ml of DMF, 0.03 g (0.3 mmol) of p-toluidine was dissolved, 0.02 g (0.4 mmol) of sodium hydride was added thereto, the mixture was stirred at room temperature for 30 minutes. Thereafter, the reaction solution was cooled to 0° C., 0.08 g (0.3 mmol) of 2-(2-dimethylamino-4-pyridyl)-4-fluoro-6-methoxy-5-trifluoromethylpyridine was added thereto, and the mixture was stirred at room temperature for 41.4 hours. Water was added to the reaction solution, the mixture was extracted with ethyl acetate, and the organic phase was dried over sodium sulfate. The dried organic phase was filtered, and the filtrate was concentrated, followed by column purification, to give 0.008 g (0.02 mmol) of 2-(2-dimethylamino-4-pyridyl)-6-methoxy-N-(4-methylphenyl)-5-(trifluoromethyl)-4-pyrimidinamine having the following structure. The yield was 8%.

[Formula 88]

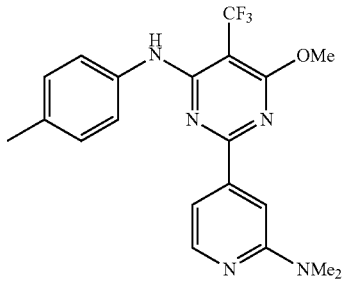

The analysis results were as follows.

1H NMR (400 MHz, CDCl3) δppm: 8.27 (d, J=5.5, 1H), 7.48 (s, 1H), 7.45 (d, J=8.3 Hz, 2H), 7.41 (dd, J=5.2, 1, 2 Hz, 1H), 7.30-7.32 (m, 1H), 7.19 (d, J=8.6 Hz, 2H), 4.40 (s, 3H), 3.14 (s, 6H), 2.37 (s, 3H)

APCI-MS (m/z): 403.3 [M]+

Example 49

Production of 2-(2-dimethylamino-4-pyridyl)-6-methoxy-4-[(4-methylphenyl)thio]-5-trifluoromethylpyrimidine In 1.0 ml of DMF, 0.04 g (0.3 mmol) of p-toluenethiol was dissolved, 0.02 g (0.5 mmol) of sodium hydride was added thereto, the mixture was stirred at room temperature for 30 minutes. Thereafter, the reaction solution was cooled to 0° C., 0.09 g (0.4 mmol) of 2-(2-dimethylamino-4-pyridyl)-4-fluoro-6-methoxy-5-trifluoromethylpyridine dissolved in 3.5 ml of DMF was added thereto, and the mixture was stirred at room temperature for 17.5 hours. Water was added to the reaction solution, the mixture was extracted with ethyl acetate, and the organic phase was dried over sodium sulfate. The dried organic phase was filtered, and the filtrate was concentrated, followed by column purification, to give 0.10 g (0.2 mmol) of 2-(2-dimethylamino-4-pyridyl)-6-methoxy-4-[(4-methylphenyl)thio]-5-trifluoromethylpyrimidine having the following structure. The yield was 82%.

[Formula 89]

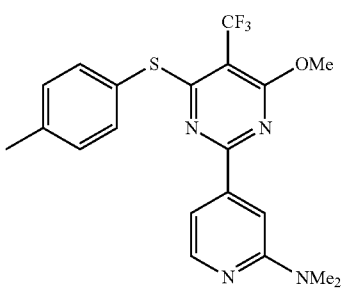

The analysis results were as follows.

$^1$H NMR (400 MHz, CDCl$_3$) δppm: 8.18 (d, J=5.2, 0.9 Hz, 1H), 7.47 (d, J=8.3 Hz, 2H), 7.28 (d, J=8.0 Hz, 2H), 7.25-7.60 (m, 1H), 6.89 (s, 1H), 4.15 (s, 3H), 2.98 (s, 6H), 2.41 (s, 3H)

APCI-MS (m/z): 420.2 [M]$^+$

Example 50

Production of 2-(2-dimethylamino-4-pyridyl)-6-methoxy-4-phenoxy-5-trifluoromethylpyrimidine In 3.0 ml of DMF, 0.04 g (0.4 mmol) of phenol was dissolved, 0.02 g (0.5 mmol) of sodium hydride was added thereto, the mixture was stirred at room temperature for 30 minutes. Thereafter, the reaction solution was cooled to 0° C., 0.09 g (0.3 mmol) of 2-(2-dimethylamino-4-pyridyl)-4-fluoro-6-methoxy-5-trifluoromethylpyridine was added thereto, and the mixture was stirred at room temperature for 15.4 hours. Water was added to the reaction solution, the mixture was extracted with ethyl acetate, and the organic phase was dried over sodium sulfate. The dried organic phase was filtered, and the filtrate was concentrated, followed by column purification, to give 0.09 g (0.2 mmol) of 2-(2-dimethylamino-4-pyridyl)-6-methoxy-4-phenoxy-5-trifluoromethylpyrimidine having the following structure. The yield was 85.6%.

[Formula 90]

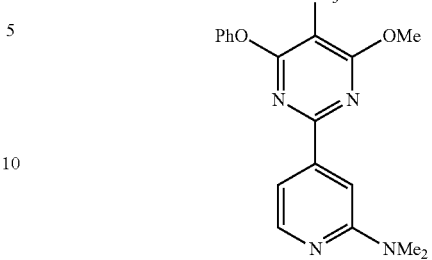

The analysis results were as follows.

$^1$H NMR (400 MHz, CDCl$_3$) δppm: 8.21 (d, J=5.2, 0.9 Hz, 1H), 7.41-7.47 (m, 2H), 7.19-7.31 (m, 5H), 7.20 (s, 3H), 3.04 (s, 3H)

APCI-MS (m/z): 390.3 [M]$^+$

Example 51

Production of 6-methoxy-2-(4-nitro-2-pyridyl)-4-phenoxy-5-trifluoromethylpyrimidine In 1.0 ml of DMF, 0.04 g (0.4 mmol) of phenol was dissolved, 0.01 g (0.3 mmol) of sodium hydride was added thereto, and the mixture was stirred at room temperature for 30 minutes. Thereafter, the reaction solution was cooled to 0° C., 0.06 g (0.2 mmol) of 4-fluoro-2-(4-nitro-2-pyridyl)-6-methoxy-5-trifluoromethylpyridine dissolved in 2.0 ml of DMF was added thereto, and the mixture was stirred at room temperature for 23.3 hours. Water was added to the reaction solution, the mixture was extracted with ethyl acetate, and the organic phase was dried over sodium sulfate. The dried organic phase was filtered, and the filtrate was concentrated, followed by column purification, to give 0.01 g of a crudely purified product of 6-methoxy-2-(4-nitro-2-pyridyl)-4-phenox-5-trifluoromethlpyrimidine having the following structure.

[Formula 91]

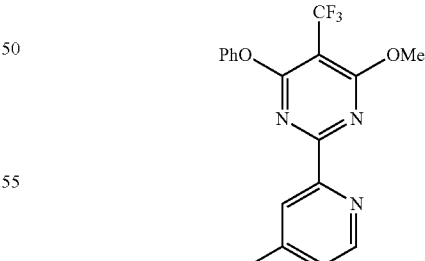

The analysis results were as follows.

$^1$H NMR (400 MHz, CDCl$_3$) δppm: 9.05 (d, J=5.2, 0.6 Hz, 1H), 8.72 (d, J=1.8 Hz, 1H), 8.08 (dd, J=5.2, 2.1 Hz, 1H), 7.45-7.51 (m, 2H), 7.32-7.36 (m, 1H), 7.23-7.26 (m, 2H), 4.29 (s, 3H)

APCI-MS (m/z): 392.3 [M]$^+$

Example 52

Production of methyl 2-[6-methoxy-4-[(4-methylphenyl)amino]-5-(trifluoromethyl)-2-pyrimidinyl]-4-pyridinecarboxylate In 6.0 ml of DMF, 0.07 g (0.6 mmol) of p-toluidine was dissolved, 0.03 g (0.7 mmol) of sodium hydride was added thereto, and the mixture was stirred at room temperature for 30 minutes. Thereafter, the reaction solution was cooled to 10° C., 0.2 g (0.6 mmol) of methyl 2-[(4-fluoro-6-methoxy-5-trifluoromethyl)-2-pyrimidinyl]-4-pyridinecarboxylate was added thereto, and the mixture was stirred at room temperature for 62.6 hours. Water was added to the reaction solution, the mixture was extracted with ethyl acetate, and the organic phase was dried over sodium sulfate. The dried organic phase was filtered, and the filtrate was concentrated, followed by column purification, to give 0.02 g (0.05 mmol) of methyl 2-[6-methoxy-4-[(4-methylphenyl)amino]-5-(trifluoromethyl)-2-pyrimidinyl]-4-pyridinecarboxylate having the following structure. The yield was 8%.

[Formula 92]

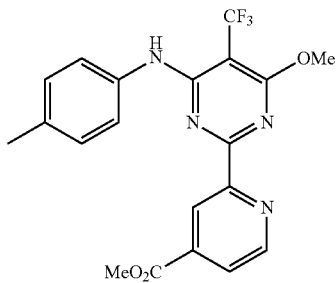

The analysis results were as follows.

$^1$H NMR (400 MHz, CDCl$_3$) δppm: 8.96% (dd, J=4.9, 0.9 Hz, 1H), 8.87 (dd, J=1.5, 0.9, 1H), 7.94 (dd, J=4.9, 1.5 Hz, 1H), 7.53 (d, J=8.3 Hz, 2H), 7.38-7.41 (m, 1H), 7.23 (d, J=8.3 Hz, 2H), 4.22 (s, 3H), 4.00 (s, 3H), 2.38 (s, 3H)

APCI-MS (m/z): 418.6 [M]$^+$

Example 53

Production of methyl 2-[6-methoxy-4-[(4-methylphenyl)thio]-5-(trifluoromethyl)-2-pyrimidinyl]-4-pyridinecarboxylate In 3.0 ml of DMF, 0.05 g (0.4 mmol) of p-toluenethiol was dissolved, 0.02 g (0.5 mmol) of sodium hydride was added thereto, and the mixture was stirred at room temperature for 30 minutes. Thereafter, the reaction solution was cooled to 0° C., 0.1 g (0.3 mmol) of methyl 2-[(4-fluoro-6-methoxy-5-trifluoromethyl)-2-pyrimidinyl]-4-pyridinecarboxylate was added thereto, and the mixture was stirred at room temperature for 16.6 hours. Water was added to the reaction solution, the mixture was extracted with ethyl acetate, and the organic phase was dried over sodium sulfate. The dried organic phase was filtered, and the filtrate was concentrated, followed by column purification, to give 0.10 g (0.2 mmol) of methyl 2-[6-methoxy-4-[(4-methylphenyl)thio]-5-(trifluoromethyl)-2-pyrimidinyl]-4-pyridinecarboxylate having the following structure. The yield was 75%.

[Formula 93]

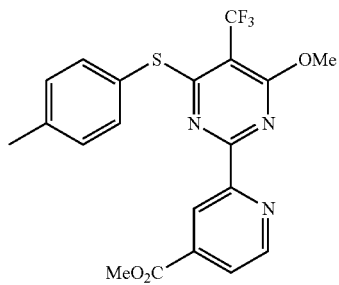

The analysis results were as follows.

$^1$H NMR (400 MHz, CDCl$_3$) δppm: 8.88 (d, J=4.9, 0.9 Hz, 1H), 8.23 (m, 1H), 7.86 (dd, J=4.9, 1.5 Hz, 1H), 7.50 (d, J=8.0 Hz, 2H), 7.34 (d, J=8.3 Hz, 2H), 4.25 (s, 3H), 3.97 (s, 3H), 2.49 (s, 3H)

APCI-MS (m/z): 435.9 [M]$^+$

Example 54

Production of methyl 2-[6-methoxy-4-phenoxy-5-(trifluoromethyl)-2-pyrimidinyl]-4-pyridinecarboxylate In 3.0 ml of DMF, 0.03 g (0.3 mmol) of phenol was dissolved, 0.02 g (0.5 mmol) of sodium hydride was added thereto, and the mixture was stirred at room temperature for 30 minutes. Thereafter, the reaction solution was cooled to 0° C., 0.10 g (0.3 mmol) of methyl 2-[(4-fluoro-6-methoxy-5-trifluoromethyl)-2-pyrimidinyl]-4-pyridinecarboxylate was added thereto, and the mixture was stirred at room temperature for 16 hours. Water was added to the reaction solution, the mixture was extracted with ethyl acetate, and the organic phase was dried over sodium sulfate. The dried organic phase was filtered, and the filtrate was concentrated, followed by column purification, to give 0.09 g (0.2 mmol) of methyl 2-[6-methoxy-4-phenoxy-5-(trifluoromethyl)-2-pyrimidinyl]-4-pyridinecarboxylate having the following structure. The yield was 74%.

[Formula 94]

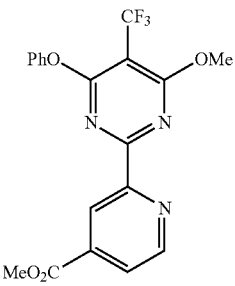

The analysis results were as follows.

$^1$H NMR (400 MHz, CDCl$_3$) δppm: 8.91 (d, J=4.9 Hz, 1H), 8.59 (m, 1H), 7.91 (dd, J=4.9, 1.5 Hz, 1H), 7.45-7.49 (m, 2H), 7.29-7.33 (m, 1H), 7.25-7.27 (m, 2H), 4.29 (s, 3H), 3.95 (s, 3H)

APCI-MS (m/z): 405.9 [M]$^+$

Example 55

Production of 6-methoxy-N-(4-methylphenyl)-2-(3-methyl-2-pyridyl)-5-(trifluoromethyl)-4-pyrimidinamine In 1.0 ml of DMF, 0.02 g (0.2 mmol) of p-toluidine was dissolved, 0.02 g (0.4 mmol) of sodium hydride was added thereto, and the mixture was stirred at room temperature for 30 minutes. Thereafter, the reaction solution was cooled to 0° C., 0.05 g of a crudely purified product of 4-fluoro-6-methoxy-2-(3-methyl-2-pyridyl)-5-trifluoromethylpyridine dissolved in 2.0 ml of DMF was added thereto, and the mixture was stirred at room temperature for 17.1 hours. Water was added to the reaction solution, the mixture was extracted with ethyl acetate, and the organic phase was dried over sodium sulfate. The dried organic phase was filtered, and the filtrate was concentrated, followed by column purification, to give a trace amount of 6-methoxy-N-(4-methylphenyl)-2-(3-methyl-2-pyridyl)-5-(trifluoromethyl)-4-pyrimidinamine having the following structure.

[Formula 95]

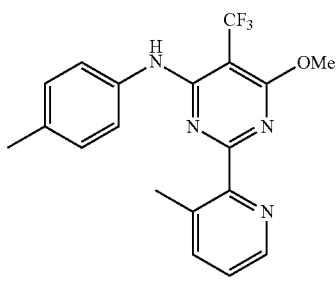

The analysis results were as follows.
APCI-MS (m/z): 374.3 [M]$^+$

Example 56

Production of 6-methoxy-2-(3-methyl-2-pyridyl)-4-[(4-methylphenyl)thio]-5-trifluoromethylpyrimidine In 1.0 ml of DMF, 0.03 g (0.2 mmol) of p-toluenethiol was dissolved, 0.02 g (0.4 mmol) of sodium hydride was added thereto, and the mixture was stirred at room temperature for 30 minutes. Thereafter, the reaction solution was cooled to 0° C., 0.05 g (0.2 mmol) of 4-fluoro-6-methoxy-2-(3-methyl-2-pyridyl)-5-trifluoromethylpyridine was added thereto, and the mixture was stirred at room temperature for 16 hours. Water was added to the reaction solution, the mixture was extracted with ethyl acetate, and the organic phase was dried over sodium sulfate. The dried organic phase was filtered, and the filtrate was concentrated, followed by column purification, to give 0.01 g (0.03 mmol) of 6-methoxy-2-(3-methyl-2-pyridyl)-4-[(4-methylphenyl)thio]-5-trifluoromethylpyrimidine having the following structure. The yield was 21%.

[Formula 96]

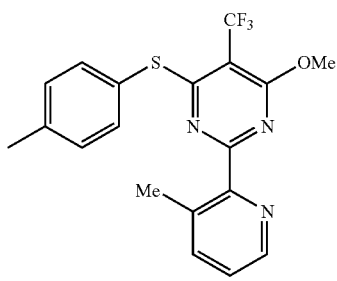

The analysis results were as follows.
$^1$H NMR (400 MHz, CDCl$_3$) δppm: 8.52 (dd, J=4.9, 0.9 Hz, 1H), 7.44 (d, J=7.6 Hz, 1H), 7.41 (d, J=8.0 Hz, 2H), 7.21 (dd, J=8.0, 4.9 Hz, 1H), 7.18 (d, J=8.0 Hz, 2H), 4.15 (s, 3H), 2.38 (s, 3H), 1.84 (s, 3H)
APCI-MS (m/z): 391.5 [M]$^+$

Example 57

Production of 6-methoxy-2-(3-methyl-2-pyridyl)-4-phenoxy-5-trifluoromethylpyrimidine In 1.0 ml of DMF, 0.03 g (0.3 mmol) of phenol was dissolved, 0.02 g (0.5 mmol) of sodium hydride was added thereto, and the mixture was stirred at room temperature for 30 minutes. Thereafter, the reaction solution was cooled to 15° C., 0.09 g of a crudely purified product of 4-fluoro-6-methoxy-2-(3-methyl-2-pyridyl)-5-trifluoromethylpyridine dissolved in 2 ml of DMF was added thereto, and the mixture was stirred at room temperature for 26.3 hours. Water was added to the reaction solution, the mixture was extracted with ethyl acetate, and the organic phase was dried over sodium sulfate. The dried organic phase was filtered, and the filtrate was concentrated, followed by column purification, to give 0.06 g (0.2 mmol) of 6-methoxy-2-(3-methyl-2-pyridyl)-4-phenoxy-5-trifluoromethylpyrimidine having the following structure. The yield was 1.9% in two steps.

[Formula 97]

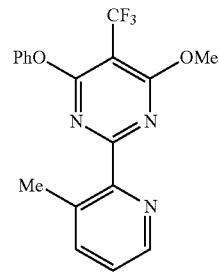

The analysis results were as follows.
$^1$H NMR (400 MHz, CDCl$_3$) δppm: 8.54 (dd, J=4.6, 0.9 Hz, 1H), 7.50 (dd, J=7.6, 0.9 Hz, 1H), 7.27-7.41 (m, 2H), 7.21-7.25 (m, 2H), 7.14-7.16 (m, 2H), 4.19 (s, 3H), 2.16 (s, 3H)
APCI-MS (m/z): 361.3 [M]$^+$

Example 58

Production of 4,6-bis(1,1-dimethylethoxy)-2-(6-n-propyl-2-pyridyl)-5-trifluoromethylpyrimidine and 4-(1,1-dimethylethoxy)-6-methoxy-2-(6-n-propyl-2-pyridyl)-5-trifluoromethylpyrimidine In 6.8 ml of THF, 0.6 g (2.0 mmol) of 4-fluoro-6-methoxy-2-(3-n-propyl-2-pyridyl)-5-trifluoromethylpyridine was dissolved, 0.6 g (5.2 mmol) of potassium tert-butoxide was added thereto, and the mixture was stirred at room temperature for 18.8 hours. After the reaction solution was concentrated, saturated aqueous ammonium chloride solution was added thereto, the mixture was extracted with ethyl acetate, and the organic phase was dried over sodium sulfate. The dried organic phase was filtered, and the filtrate was concentrated, followed by column purification, to give 0.4 g (0.9 mmol) of 4,6-bis(1,1-dimethylethoxy)-2-(6-n-propyl-2-pyridyl)-5-trifluoromethylpyrimidine having the following structure. The yield was 44%.

[Formula 98]

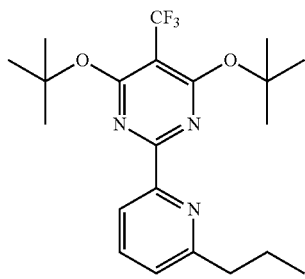

Analysis results of 4,6-bis(1,1-dimethylethoxy)-2-(6-n-propyl-2-pyridyl)-5-trifluoromethylpyrimidine were as follows.

$^1$H NMR (400 MHz, CDCl$_3$) δppm: 8.08 (d, J=8.0 Hz, 1H), 7.71 (dd, J=7.6, 7.6 Hz, 1H), 7.22 (d, J=7.6 Hz, 1H), 2.86 (t, J=7.0 Hz, 2H), 1.85-1.94 (m, 2H), 1.70 (s, 18H), 1.00 (t, J=7.3 Hz, 3H)

APCI-MS (m/z): 411.9 [M]$^+$

At the same time, 0.04 g (yield: 5%) of 4-(1,1-dimethylethoxy)-6-methoxy-2-(6-n-propyl-2-pyridyl)-5-trifluoromethylpyrimidine was also obtained.

[Formula 99]

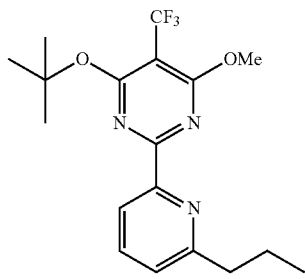

Analysis results of 4-(1,1-dimethylethoxy)-6-methoxy-2-(6-n-propyl-2-pyridyl)-5-trifluoromethylpyrimidine were as follows.

$^1$H NMR (400 MHz, CDCl$_3$) δppm: 8.14 (d, J=7.6 Hz, 1H), 7.73 (dd, J=7.6, 7.6 Hz, 1H), 7.26-7.27 (m, 1H), 4.17 (s, 3H), 2.90 (t, J=7.6 Hz, 2H), 1.87 (tq, J=7.3, 7.3 Hz, 2H), 1.71 (s, 9H), 1.03 (t, J=7.5 Hz, 3H)

APCI-MS (m/z): 369.9 [M]$^+$

Example 59

Production of 6-hydroxy-2-(6-n-propyl-2-pyridyl)-5-(trifluoromethyl)-4(3H)-pyrimidinone In 0.9 ml of dichloromethane, 0.4 g (0.9 mmol) of 4,6-bis(1,1-dimethylethoxy)-2-(6-n-propyl-2-pyridyl)-5-trifluoromethylpyrimidine obtained in Example 58 was dissolved, 0.9 ml of trifluoroacetic acid (TFA) was added thereto, and the mixture was stirred at room temperature for 3 hours. The reaction solution was then concentrated, washed with ethyl acetate, and filtered to give 0.4 g of a crudely purified product of 6-hydroxy-2-(6-n-propyl-2-pyridyl)-5-(trifluoromethyl)-4(3H)-pyrimidinone having the following structure.

[Formula 100]

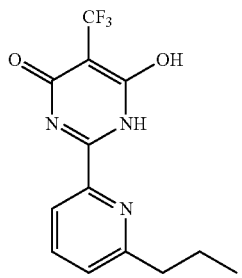

The analysis results were as follows.

$^1$H NMR (400 MHz, DMSO-d6) δppm: 12.6 (br, 2H), 8.09 (d, J=7.0 Hz, 1H), 7.99 (dd, J=8.0, 7.6 Hz, 1H), 7.58 (d, J=7.0 Hz, 1H), 2.83 (t, J=7.6 Hz, 2H), 1.79 (tq, J=7.3, 7.3 Hz, 2H), 0.94 (t, J=7.3 Hz, 3H)

APCI-MS (m/z): 299.8 [M]$^+$

Example 60

Production of 4,6-dichloro-2-(6-n-propyl-2-pyridyl)-5-trifluoromethylpyrimidine

In 1.8 ml of toluene and 0.4 ml of POCl$_3$, 0.4 g of the crude product of 6-hydroxy-2-(6-n-propyl-2-pyridyl)-5-(trifluoromethyl)-4(3H)-pyrimidinone obtained in Example 59 was dissolved, and the mixture was stirred under conditions of heat reflux for 6 hours. After being cooled to room temperature in the air, the reaction solution was added dropwise to ice to which baking soda was added and extracted with ethyl acetate. After drying over sodium sulfate, filtration was performed. Further, the filtrate was concentrated, followed by column purification, to give 0.2 g (0.7 mmol) of 4,6-dichloro-2-(6-n-propyl-2-pyridyl)-5-trifluoromethylpyrimidine having the following structure. The yield was 79% in two steps.

[Formula 101]

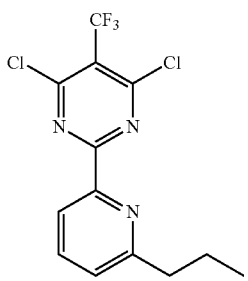

The analysis results were as follows.
$^1$H NMR (400 MHz, CDCl$_3$) δppm: 8.33 (d, J=7.6 Hz, 1H), 7.81 (dd, J=8.0, 7.6 Hz, 1H), 7.38 (d, J=7.6 Hz, 1H), 2.% (t, J=7.6 Hz, 2H), 1.83 (tq, J=7.3, 7.6 Hz, 2H), 1.02 (t, J=7.0 Hz, 3H)
APCI-MS (m/z): 337.5 [M+H]$^+$ Example 61

Production of 6-methoxy-2-(6-n-propyl-2-pyridyl)-5-(trifluoromethyl)-4(3H)-pyrimidinone In 0.5 ml of dichloromethane, 0.04 g (0.1 mmol) of 4-(1,1-dimethylethoxy)-6-methoxy-2-(6-n-propyl-2-pyridyl)-5-trifluoromethylpyrimidine obtained in Example 58 was dissolved, 0.5 ml of trifluoroacetic acid (TFA) was added thereto, and the mixture was stirred at room temperature for 1.7 hours. Thereafter, the reaction solution was concentrated, washed with ethyl acetate, and filtered to give 0.04 g of a crudely purified product of 6-hydroxy-2-(6-n-propyl-2-pyridyl)-5-(trifluoromethyl)-4(3H)-pyrimidinone having the following structure.

[Formula 102]

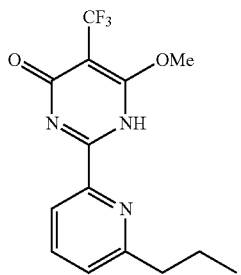

The analysis results were as follows.
$^1$H NMR (400 MHz, CDCl$_3$) δppm: 8.26 (d, J=7.0 Hz, 1H), 7.86 (dd, J=7.6, 7.6 Hz, 1H), 7.43 (d, J=7.0 Hz, 1H), 4.18 (s, 3H), 3.10 (br, 1H), 2.87 (t, J=8.0 Hz, 2H), 1.80 (tq, J=7.3, 7.3 Hz, 2H), 0.99 (t, J=7.3 Hz, 3H)
APCI-MS (m/z): 313.8 [M]$^+$ Example 62

Production of 4-chloro-6-methoxy-2-(6-n-propyl-2-pyridyl)-5-trifluoromethylpyrimidine In 1.0 ml of toluene and 0.04 ml of POCl$_3$, 0.04 g of the crudely purified product of 6-methoxy-2-(6-n-propyl-2-pyridyl)-5-(trifluoromethyl)-4(3H)-pyrimidinone obtained in Example 61 was dissolved, and the mixture was stirred under conditions of heat reflux for 6 hours. After being cooled to room temperature in the air, the reaction solution was added dropwise to ice to which baking soda was added and extracted with ethyl acetate. After drying over sodium sulfate, filtration was performed. Further, the filtrate was concentrated, followed by column purification, to give 0.004 g (0.01 mmol) of 4-chloro-6-methoxy-2-(6-n-propyl-2-pyridyl)-5-trifluoromethylpyrimidine having the following structure. The yield was 12% in two steps.

[Formula 103]

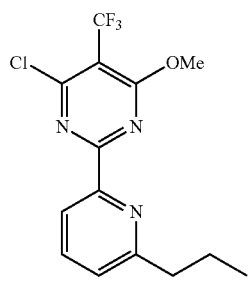

The analysis results were as follows.
$^1$H NMR (400 MHz, CDCl$_3$) δppm: 8.25 (d, J=7.6 Hz, 1H), 7.78 (dd, J=8.0, 7.6 Hz, 2H), 7.34 (d, J=8.0 Hz, 1H), 4.25 (s, 3H), 2.94 (t, J=7.6 Hz, 2H), 1.84 (tq, J=7.6, 7.3 Hz, 2H), 1.03 (t, J=7.3 Hz, 3H)
APCI-MS (m/z): 331.6 [M]$^+$ Example 63

Production of 6-chloro-2-(4-pyridyl)-4-[(4-methylphenyl)thio]-5-trifluoromethylpyrimidine In 3.0 ml of THF, 0.16 g (0.6 mmol) of 4,6-dichloro-2-(4-pyridyl)-5-trifluoromethylpyrimidine obtained by repeating Example 11 was dissolved, 0.06 g (0.6 mmol) of triethylamine and 0.05 g (0.4 mmol) of p-toluenethiol were added thereto, and the mixture was stirred at room temperature for 24.3 hours. Water was added to the reaction solution, the mixture was extracted with ethyl acetate, and the organic phase was dried over sodium sulfate. The dried organic phase was filtered, and the filtrate was concentrated, followed by column purification, to give 0.13 g (0.3 mmol) of 6-chloro-2-(4-pyridyl)-4-[(4-methylphenyl)thio]-5-trifluoromethylpyrimidine having the following structure. The yield was 63%.

[Formula 104]

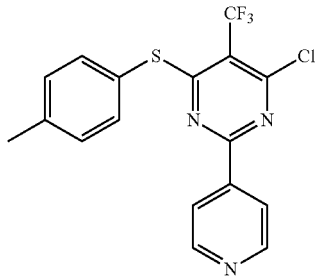

The analysis results were as follows.

¹H NMR (400 MHz, CDCl₃) δppm: 8.63 (dd, J=4.6, 1.8 Hz, 2H), 7.70 (dd, J=4.6, 1.5 Hz, 2H), 7.45 (d, J=8.3 Hz, 2H), 7.36 (d, J=8.3 Hz, 2H), 2.51 (s, 3H)

APCI-MS (m/z): 381.8 [M]⁺

Example 64

Production of 6-chloro-4-hydroxy-2-(2-pyridyl)-5-(trifluoromethyl)-pyrimidine

In 1.0 ml of a 1N NaOH solution, 0.05 g (0.2 mmol) of 4,6-dichloro-2-(2-pyridyl)-5-trifluoromethylpyrimidine obtained in Example 31 was dissolved and stirred at room temperature for 2.3 hours. The reaction solution was neutralized with 10% aqueous sulfuric acid solution, and precipitated crystals were washed with water to give 0.02 g (0.06 mmol) of 6-chloro-4-hydroxy-2-(2-pyridyl)-5-(trifluoromethyl)-pyrimidine having the following structure. The yield was 39%.

[Formula 105]

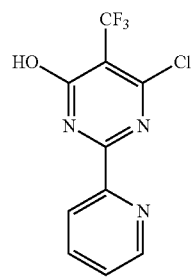

The analysis results were as follows.
¹H NMR (400 MHz, CDCl₃) δppm: 11.23 (br, 1H), 8.72-8.73 (m, 1H), 8.49 (d, J=8.0 Hz, 1H), 7.98 (ddd, J=8.0, 7.6, 1.5 Hz, 1H), 7.61 (ddd, J=7.6, 4.9, 1.2 Hz, 1H)

APCI-MS (m/z): 275.5 [M]⁺

Example 65

Production of 6-chloro-2-(2-pyridyl)-5-(trifluoromethyl)-4-pyrimidinamine

In 1.0 ml of THF, 0.05 g (0.2 mmol) of 4,6-dichloro-2-(2-pyridyl)-5-trifluoromethylpyrimidine obtained in Example 31 was dissolved, 0.02 g (0.2 mmol) of triethylamine and 7 drops of a 2M ammonia methanol solution were added thereto, and the mixture was stirred at room temperature for 4 hours. The reaction solution was concentrated, and the precipitated crystals were washed with diethyl ether to give a crudely purified product of 6-chloro-2-(2-pyridyl)-5-(trifluoromethyl)-4-pyrimidinamine having the following structure.

[Formula 106]

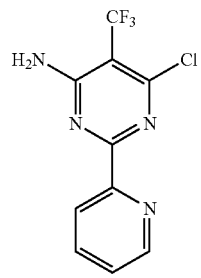

The analysis results were as follows.
¹H NMR (400 MHz, CDCl₃) δppm: 8.84-8.85 (m, 1H), 8.50 (d, J=8.0 Hz, 1H), 7.87 (ddd, J=8.0, 7.6, 1.8 Hz, 1H), 7.45 (ddd, J=7.3, 4.9, 0.9 Hz, 1H), 5.96 (br, 2H)

APCI-MS (m/z): 274.6 [M]⁺

Example 66

Production of 4-chloro-6-ethoxy-2-(2-pyridyl)-5-trifluoromethylpyrimidine

In 1.7 ml of THF, 0.05 g (0.2 mmol) of 4,6-dichloro-2-(2-pyridyl)-5-trifluoromethylpyrimidine obtained in Example 31 was dissolved, 0.01 g (0.2 mmol) of sodium ethoxide was added thereto, the mixture was stirred at 0° C. for 1 hour. Water was added to the reaction solution, the mixture was extracted with ethyl acetate, and the organic phase was dried over sodium sulfate. The dried organic phase was filtered, and the filtrate was concentrated, followed by column purification, to give a crudely purified product of 4-chloro-6-ethoxy-2-(2-pyridyl)-5-trifluoromethylprimidine having the following structure.

[Formula 107]

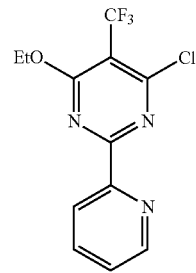

The analysis results were as follows.
¹H NMR (400 MHz, CDCl₃) δppm: 8.87-8.88 (m, 1H), 8.47 (d, J=8.0 Hz, 1H), 7.86-7.90 (m, 1H), 7.45-7.49 (m, 1H), 4.73 (q, J=7.0 Hz, 2H), 1.51 (t, J=7.0 Hz, 3H)

APCI-MS (m/z): 303.5 [M]⁺

Example 67

Production of 4,6-diethoxy-2-(2-pyridyl)-5-trifluoromethylpyrimidine

In 1.7 ml of THF, 0.05 g (0.2 mmol) of 4,6-dichloro-2-(2-pyridyl)-5-trifluoromethylpyrimidine obtained in Example 31 was dissolved and cooled to 0° C. Thereafter, 0.13 g (0.3 mmol) of sodium ethoxide ethanol solution was added thereto, and the mixture was stirred at room temperature for 23 hours. The reaction solution was concentrated, followed by column purification, to give 0.05 g (0.2 mmol) of 4,6-diethoxy-2-(2-pyridyl)-5-trifluoromethylprimidine having the following structure. The yield was 88%.

[Formula 108]

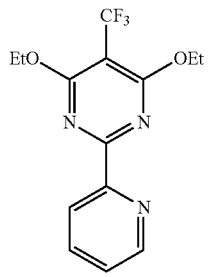

The analysis results were as follows.

$^1$H NMR (400 MHz, CDCl$_3$) δppm: 8.84 (m, 1H), 8.43 (d, J=7.9 Hz, 1H), 7.85 (ddd, J=8.0, 7.6, 1.8 Hz, 1H), 7.24 (ddd, J=7.6, 4.9, 1.2 Hz, 1H), 4.68 (q, J=7.0 Hz, 4H), 1.46 (t, J=7.0 Hz, 6H)

APCI-MS (m/z): 313.7 [M]$^+$

Example 68

Production of 4,6-diphenoxy-2-(2-pyridyl)-5-trifluoromethylpyrimidine

In 1.7 ml of THF, 0.03 g (0.3 mmol) of phenol was dissolved, 0.01 g (0.3 mmol) of sodium ethoxide was added thereto, and the mixture was stirred at room temperature for 30 minutes. The reaction solution was then cooled to 0° C., 0.05 g (0.2 mmol) of 4,6-dichloro-2-(2-pyridyl)-5-trifluoromethylpyrimidine obtained in Example 31 was added thereto, and the mixture was stirred at room temperature for 15.3 hours. Water was added to the reaction solution, the mixture was extracted with ethyl acetate, and the organic phase was dried over sodium sulfate. The dried organic phase was filtered, and the filtrate was concentrated, followed by column purification, to give 0.04 g (0.10 mmol) of 4,6-diphenoxy-2-(2-pyridyl)-5-trifluoromethylpyrimidine having the following structure. The yield was 55%.

[Formula 109]

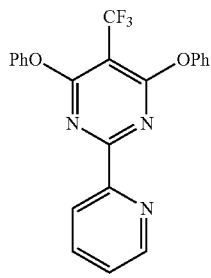

The analysis results were as follows.

$^1$H NMR (400 MHz, CDCl$_3$) δppm: 8.63-8.64 (m, 1H), 7.89 (d, J=8.0 Hz, 1H), 7.64 (ddd, J=7.6, 7.6, 1.5 Hz, 1H), 7.44-7.48 (m, 5H), 7.29-7.31 (m, 6H)

APCI-MS (m/z): 409.4 [M]$^+$

Example 69

Production of 6-methoxy-4-methyl-2-(4-pyridyl)-5-trifluoromethylpyrimidine

In 1.2 ml of THF, 0.10 g (0.38 mmol) of 4-fluoro-6-methoxy-2-(4-pyridyl)-5-trifluoromethylpyrimidine was dissolved, 0.4 ml of 1M methyllithium (about 3 to 5% ethyl ether solution) was added thereto, and the mixture was stirred at 0° C. for 22.8 hours. Thereafter, another 0.4 ml of 1M methyllithium (about 3 to 5% ethyl ether solution) was added thereto, and the mixture was stirred for 7.5 hours. To the reaction solution was added saturated aqueous ammonium chloride solution, the mixture was extracted with ethyl acetate, and the organic phase was dried over sodium sulfate. The dried organic phase was filtered, and the filtrate was concentrated, followed by column purification, to give 0.003 g (0.01 mmol) of 6-methoxy-4-methyl-2-(4-pyridyl)-5-trifluoromethylpyrimidine having the following structure. The yield was 3%.

[Formula 110]

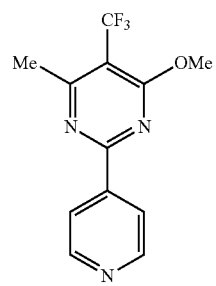

The analysis results were as follows.

$^1$H NMR (400 MHz, CDCl$_3$) δppm: 8.79 (dd, J=4.3, 1.5 Hz, 2H), 8.29 (dd, J=4.6, 1.5 Hz, 2H), 4.19 (s, 3H), 2.73 (q, J=2.8 Hz, 3H)

APCI-MS (m/z): 270.0 [M+H]$^+$

Example 70

Production of 6-methoxy-2-(5-methyl-2-pyridyl)-4-[(4-methylphenyl)thio]-5-trifluoromethylpyrimidine In 3.0 ml of DMF, 0.05 g (0.4 mmol) of p-toluenethiol was dissolved, 0.02 g (0.6 mmol) of sodium hydride was added thereto, and the mixture was stirred at room temperature for 30 minutes. Thereafter, the reaction solution was cooled to 0° C., 0.1 g (0.4 mmol) of 6-fluoro-4-methoxy-2-(5-methyl-2-pyridyl)-5-trifluoromethylpyridine was added thereto, and the mixture was stirred at room temperature for 20 hours. Water was added to the reaction solution, the mixture was extracted with ethyl acetate, and the organic phase was dried over sodium sulfate. The dried organic phase was filtered, and the filtrate was concentrated, followed by column purification, to give 0.08 g (0.2 mmol) of 6-methoxy-2-(5-methyl-2-pyridyl)-4-[(4-methylphenyl)thio]-5-trifluoromethylprimidine having the following structure. The yield was 57%.

[Formula 111]

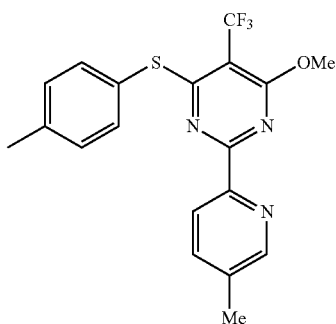

The analysis results were as follows.

$^1$H NMR (400 MHz, CDCl$_3$) δppm: 8.56 (m, 1H), 7.46-7.49 (m, 3H), 7.37-7.39 (m, 1H), 7.29 (d, J=8.0 Hz, 2H), 4.24 (s, 3H), 2.47 (s, 3H), 2.35 (s, 3H)

APCI-MS (m/z): 391.9 [M]$^+$

Example 71

Production of 6-methoxy-2-(5-methyl-2-pyridyl)-4-phenoxy-5-trifluoromethylpyrimidine In 3.0 ml of DMF, 0.05 g (0.5 mmol) of phenol was dissolved, 0.02 g (0.6 mmol) of sodium hydride was added thereto, and the mixture was stirred at room temperature for 30 minutes. Thereafter, the reaction solution was cooled to 0° C., 0.10 g (0.4 mmol) of 6-fluoro-4-methoxy-2-(5-methyl-2-pyridyl)-5-trifluoromethylpyridine was added thereto, and the mixture was stirred at room temperature for 21.2 hours. Water was added to the reaction solution, the mixture was extracted with ethyl acetate, and the organic phase was dried over sodium sulfate. The dried organic phase was filtered, and the filtrate was concentrated, followed by column purification, to give 0.13 g (0.4 mmol) of 6-methoxy-2-(5-methyl-2-pyridyl)-4-phenoxy-5-trifluoromethylpyrimidine having the following structure. The yield was 99%.

[Formula 112]

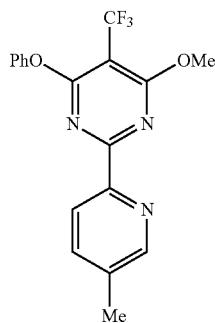

The analysis results were as follows.

$^1$H NMR (400 MHz, CDCl$_3$) δppm: 8.59 (m, 1H), 7.93 (d, J=8.3 Hz, 1H), 7.51 (dd, J=8.0, 2.2 Hz, 1H), 7.42-7.46 (m, 2H), 7.28-7.30 (m, 1H), 7.22-7.23 (m, 2H), 4.27 (s, 3H), 2.37 (s, 3H)

APCI-MS (m/z): 362.0 [M+H]$^+$

Example 72

Production of 6-methoxy-N-(4-methylphenyl)-2-(5-methyl-2-pyridyl)-5-(trifluoromethyl)-4-pyrimidinamine In 6.0 ml of DMF, 0.09 g (0.8 mmol) of p-toluidine was dissolved, 0.03 g (0.9 mmol) of sodium hydride was added thereto, and the mixture was stirred at room temperature for 30 minutes. Thereafter, the reaction solution was cooled to 0° C., 0.2 g (0.7 mmol) of 6-fluoro-4-methoxy-2-(5-methyl-2-pyridyl)-5-trifluoromethylpyridine was added thereto, and the mixture was stirred at room temperature for 64 hours. Water was added to the reaction solution, the mixture was extracted with ethyl acetate, and the organic phase was dried over sodium sulfate. The dried organic phase was filtered, and the filtrate was concentrated, followed by column purification, to give 0.07 g (0.18 mmol) of 6-methoxy-N-(4-methylphenyl)-2-(5-methyl-2-pyridyl)-5-(trifluoromethyl)-4-pyrimidinamine having the following structure. The yield was 26%.

[Formula 113]

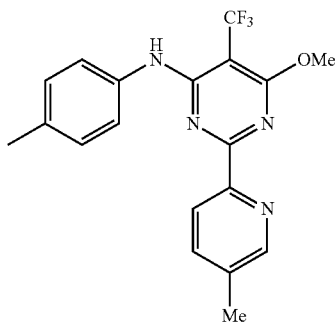

The analysis results were as follows.

$^1$H NMR (400 MHz, CDCl$_3$) δppm: 8.63 (m, 1H), 8.20 (d, J=8.0, 1H), 7.58-7.61 (m, 1H), 7.49 (d, J=8.3 Hz, 2H), 7.33 (br, 1H), 7.20 (d, J=8.3 Hz, 2H), 4.21 (s, 3H), 2.41 (s, 3H), 2.37 (s, 3H)

APCI-MS (m/z): 374.8 [M]$^+$

Example 73

Production of 4,6-bis(1,1-dimethylethoxy)-5-trifluoromethyl-2-(2-trifluoromethyl-5-pyridyl)pyrimidine In 9.3 ml of THF, 0.6 g (2.8 mmol) of 6-fluoro-4-methoxy-2-(2-trifluoro-5-pyridyl)-5-trifluoromethylpyridine was dissolved, 0.8 g (7.0 mmol) of potassium tert-butoxide was added thereto, and the mixture was stirred at room temperature for 21.5 hours. After the reaction solution was concentrated, saturated aqueous ammonium chloride solution was added thereto, the mixture was extracted with ethyl acetate, and the extract was dried over sodium sulfate, filtered, concentrated, and purified by column to give 0.2 g (0.5 mmol) of 4,6-bis(1,1-dimethylethoxy)-5-trifluoromethyl-2-(2-trifluoromethyl-5-pyridyl)pyrimidine having the following structure. The yield was 19%.

[Formula 114]

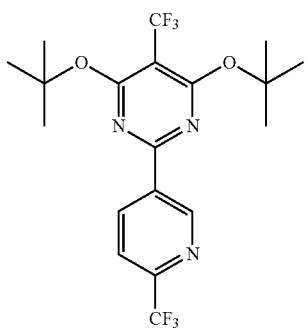

The analysis results were as follows.
$^1$H NMR (400 MHz, CDCl$_3$) δppm: 9.66 (d, J=1.8 Hz, 1H), 8.70-8.23 (m, 1H), 7.82 (dd, J=8.0, 0.6 Hz, 1H), 1.70 (s, 18H)
APCI-MS (m/z): 437.8 [M]$^+$ Example 74

Production of 6-hydroxy-2-5-(trifluoromethyl)-(2-trifluoromethyl-5-pyridyl)-4(3H)-pyrimidinone In 0.5 ml of dichloromethane, 0.2 g (0.5 mmol) of 4,6-bis(1,1-dimethylethoxy)-5-trifluoromethyl-2-(2-trifluoromethyl-5-pyridyl)pyrimidine obtained in Example 73 was dissolved, 0.5 ml of TFA was added thereto, and the mixture was stirred at room temperature for 3.7 hours. The reaction solution was then concentrated, washed with ethyl acetate, and filtered to give 0.2 g of a crudely purified product of 6-hydroxy-2-5-(trifluoromethyl)-(2-trifluoromethyl-5-pyridyl)-4(3H)-pyrimidinone having the following structure.

[Formula 115]

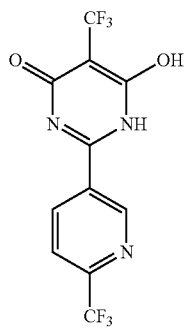

The analysis results were as follows.
$^1$H NMR (400 MHz, DMSO-d6) δppm: 13.3 (br, 2H), 9.32 (d, J=1.2 Hz, 1H), 8.65 (dd, J=8.3, 2.1 Hz, 1H), 8.16 (d, J=8.3 Hz, 1H)
APCI-MS (m/z): 325.8 [M]$^+$ Example 75

Production of 4,6-bis(1,1-dimethylethoxy)-2-(5-methyl-2-pyridyl)-5-trifluoromethylpyrimidine and 4-(1,1-dimethylethoxy)-6-methoxy-2-(5-methyl-2-pyridyl)-5-trifluoromethylpyrimidine In 11.6 ml of THF, 1.0 g (3.4 mmol) of 6-fluoro-4-methoxy-2-(5-methyl-2-pyridyl)-5-trifluoromethylpyridine was dissolved, 1.0 g (8.7 mmol) of potassium tert-butoxide was added thereto, and the mixture was stirred at room temperature for 21.3 hours. After the reaction solution was concentrated, saturated aqueous ammonium chloride solution was added thereto, the mixture was extracted with ethyl acetate, and the extract was dried over sodium sulfate, filtered, concentrated, and purified by column to give 0.3 g (0.9 mmol) of 4,6-bis(1,1-dimethylethoxy)-2-(5-methyl-2-pyridyl)-5-trifluoromethylpyrimidine having the following structure. The yield was 25%.

[Formula 116]

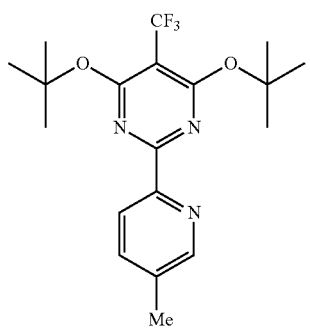

Analysis results of 4,6-bis(1,1-dimethylethoxy)-2-(5-methyl-2-pyridyl)-5-trifluoromethylpyrimidine were as follows.
$^1$H NMR (400 MHz, CDCl$_3$) δppm: 8.62-8.63 (m, 1H), 8.18 (d, J=8.3, 1H), 7.61 (ddd, J=8.0, 2.1, 0.6 Hz, 1H), 2.41 (s, 3H), 1.70 (s, 18H)
APCI-MS (m/z): 383.8 [M]$^+$ At the same time, 0.2 g (yield: 13%) of 4-(1,1-dimethylethoxy)-6-methoxy-2-(5-methyl-2-pyridyl)-5-trifluoromethylpyrimidine was also obtained.

[Formula 117]

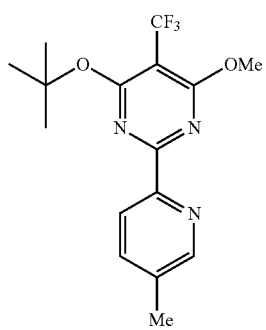

Analysis results of 4-(1,1-dimethylethoxy)-6-methoxy-2-(5-methyl-2-pyridyl)-5-trifluoromethylpyrimidine were as follows.
$^1$H NMR (400 MHz, CDCl$_3$) δppm: 8.66 (d, J=2.1 Hz, 1H), 8.25 (d, J=8.0 Hz, 1H), 7.64 (ddd, J=8.0, 2.1, 0.6 Hz, 1H), 4.19 (s, 3H), 2.43 (s, 3H), 1.70 (s, 9H)
APCI-MS (m/z): 341.8 [M]$^+$ Example 76

Production of 6-hydroxy-2-(5-methyl-2-pyridyl)-5-(trifluoromethyl)-4(3H)-pyrimidinone In 1.0 ml of dichloromethane, 0.3 g (0.8 mmol) of 4,6-bis(1,1-dimethylethoxy)-2-(5-methyl-2-pyridyl)-5-trifluoromethylpyrimidine obtained in Example 75 was dissolved, 1.0 ml of TFA was added thereto, and the mixture was stirred at room temperature for 17.4 hours. The reaction solution was then concentrated, washed with ethyl acetate, and filtered to give 0.3 g of a crudely purified product of 6-hydroxy-2-(5-methyl-2-pyridyl)-5-(trifluoromethyl)-4(3H)-pyrimidinone having the following structure.

[Formula 118]

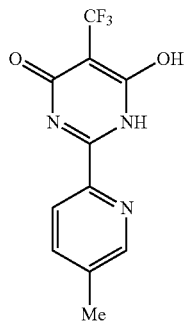

The analysis results were as follows.
$^1$H NMR (400 MHz, DMSO-d6) δppm: 12.7 (br, 2H), 8.63 (m, 1H), 8.17 (d, J=8.3 Hz, 1H), 7.91 (ddd, J=8.0, 2.1, 0.6 Hz, 1H), 2.43 (s, 3H)
APCI-MS (m/z): 371.9 [M]$^+$ Example 77

Production of 4,6-dichloro-2-(5-methyl-2-pyridyl)-5-trifluoromethylpyrimidine

In 1.7 ml of toluene and 0.4 ml of POCl$_3$, 0.3 g of the crudely purified product of 6-hydroxy-2-(5-methyl-2-pyridyl)-5-(trifluoromethyl)-4(3H)-pyrimidinone obtained in Example 76 was dissolved, and the mixture was stirred under conditions of heat reflux for 6 hours. After being cooled to room temperature in the air, the reaction solution was added dropwise to ice to which baking soda was added and extracted with ethyl acetate. After drying over sodium sulfate, filtration was performed. The filtrate was concentrated, followed by column purification, to give 0.2 g (0.6 mmol) of 4,6-dichloro-2-(5-methyl-2-pyridyl)-5-trifluoromethylpyrimidine having the following structure. The yield was 73% in two steps.

[Formula 119]

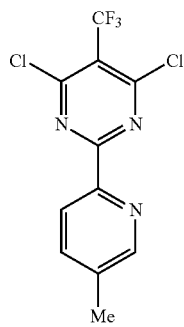

The analysis results were as follows.

$^1$H NMR (400 MHz, CDCl$_3$) δppm: 8.73 (m, 1H), 8.46 (d, J=8.0 Hz, 1H), 7.71 (ddd, J=8.0, 2.5, 0.9 Hz, 1H), 2.47 (s, 3H)
APCI-MS (m/z): 307.8 [M]$^+$ Example 78

Production of 6-methoxy-2-(5-methyl-2-pyridyl)-5-(trifluoromethyl)-4(3H)-pyrimidinone In 2.0 ml of dichloromethane, 0.2 g (0.5 mmol) of 4-(1,1-dimethylethoxy)-6-methoxy-2-(5-methyl-2-pyridyl)-5-trifluoromethylpyrimidine obtained by carrying out Example 75 was dissolved, 1.0 ml of TFA was added thereto, and the mixture was stirred at room temperature for 12.8 hours. The reaction solution was then concentrated, washed with ethyl acetate, and filtered to give 0.2 g of a crudely purified product of 6-methoxy-2-(5-methyl-2-pyridyl)-5-(trifluoromethyl)-4(3H)-pyrimidinone having the following structure.

[Formula 120]

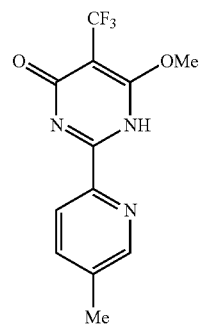

The analysis results were as follows.
$^1$H NMR (400 MHz, DMSO-d6) δppm: 12.6 (br, 1H), 8.64 (m, 1H), 8.33 (d, J=8.0 Hz, 1H), 7.93 (ddd, J=8.0, 2.1, 0.9 Hz, 1H), 4.11 (s, 3H), 2.44 (s, 3H)
APCI-MS (m/z): 285.9 [M]$^+$ Example 79

Production of 4-chloro-6-methoxy-2-(5-methyl-2-pyridyl)-5-trifluoromethylpyrimidine In 1.0 ml of toluene and 0.2 ml of POCl$_3$, 0.2 g of the crudely purified product of 6-methoxy-2-(5-methyl-2-pyridyl)-5-(trifluoromethyl)-4(3H)-pyrimidinone obtained in Example 78 was dissolved, and the mixture was stirred under conditions of heat reflux for 6 hours. After being cooled to room temperature in the air, the reaction solution was added dropwise to ice to which baking soda was added and extracted with ethyl acetate. After drying over sodium sulfate, filtration was performed. The filtrate was concentrated, followed by column purification, to give 0.02 g (0.06 mmol) of 4-chloro-6-methoxy-2-(5-methyl-2-pyridyl)-5-trifluoromethylpyrimidine having the following structure. The yield was 12% in two steps.

[Formula 121]

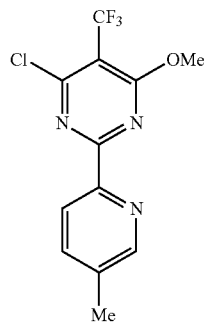

The analysis results were as follows.
$^1$H NMR (400 MHz, CDCl$_3$) δppm: 8.70 (d, J=2.1 Hz, 1H), 8.39 (d, J=8.3 Hz, 1H), 7.68 (d, J=8.0, 2.1, 0.6 Hz, 1H), 4.25 (s, 3H), 2.45 (s, 3H)
APCI-MS (m/z): 303.8 [M]$^+$ Example 80

Production of 6-chloro-4-phenoxy-2-(2-pyridyl)-5-trifluoromethylpyrimidine

In 1.0 ml of DMF, 0.01 g (0.1 mmol) of phenol was dissolved, 0.006 g (0.2 mmol) of sodium hydride was added thereto, and the mixture was stirred at room temperature for 30 minutes. The reaction solution was then cooled to 0° C., 0.04 g (0.1 mmol) of 4,6-dichloro-2-(2-pyridyl)-5-trifluoromethylpyridine dissolved in 2 ml of DMF was added thereto, and the mixture was stirred at room temperature for 16.7 hours. Water was added to the reaction solution, the mixture was extracted with ethyl acetate, and the organic phase was dried over sodium sulfate. The dried organic phase was filtered, and the filtrate was concentrated, followed by column purification, to give 0.03 g of a crudely purified product of 6-chloro-4-phenoxy-2-(2-pyridyl)-5-trifluoromethylpyrimidine having the following structure.

[Formula 122]

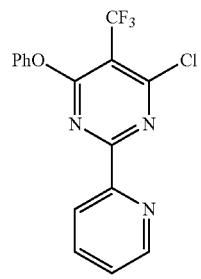

The analysis results were as follows.
APCI-MS (m/z): 351.8 [M]$^+$

Example 81

Production of 6-chloro-4-methyl-2-(2-pyridyl)-5-trifluoromethylpyrimidine

In 1.2 ml of THF, 0.1 g (0.3 mmol) of 4,6-dichloro-2-(2-pyridyl)-5-trifluoromethylpyridine was dissolved, 0.4 ml of about 3-5% methyllithium was added thereto, and the mixture was stirred at 0° C. for 29.2 hours. To the reaction solution was added saturated aqueous ammonium chloride solution, the mixture was extracted with ethyl acetate, and the organic phase was dried over sodium sulfate. The dried organic phase was filtered, and the filtrate was concentrated, followed by column purification, to give 0.008 g of a crudely purified product of 6-chloro-4-methyl-2-(2-pyridyl)-5-trifluoromethylpyrimidine having the following structure.

[Formula 123]

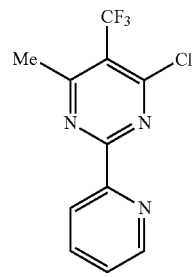

APCI-MS (m/z): 273.8 [M]$^+$

Example 82

Production of 6-chloro-N-(4-methylphenyl)-2-(6-n-propyl-2-pyridyl)-5-(trifluoromethyl)-4-pyrimidinamine In 3.0 ml of DMF, 0.04 g (0.3 mmol) of p-toluidine was dissolved, 0.02 g (0.2 mmol) of sodium hydride was added thereto, and the mixture was stirred at room temperature for 30 minutes. Thereafter, the reaction solution was cooled to 0° C., 0.1 g (0.3 mmol) of 4,6-dichloro-2-(6-n-propyl-2-pyridyl)-5-trifluoromethylpyrimidine obtained in Example 60 was added thereto, and the mixture was stirred at room temperature for 15.8 hours. Water was added to the reaction solution, the mixture was extracted with ethyl acetate, and the organic phase was dried over sodium sulfate. The dried organic phase was filtered, and the filtrate was concentrated, followed by column purification, to give 0.09 g (0.2 mmol) of 6-chloro-N-(4-methylphenyl)-2-(6-n-propyl-2-pyridyl)-5-(trifluoromethyl)-4-pyrimidinamine having the following structure. The yield was 26%.

[Formula 124]

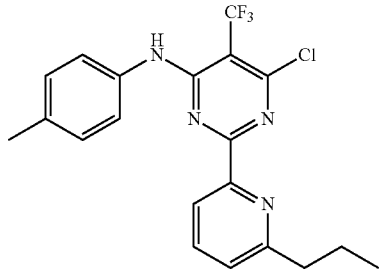

The analysis results were as follows.
$^1$H NMR (400 MHz, CDCl$_3$) δppm: 8.11 (dd, J=8.0, 0.9 Hz, 1H), 7.71 (dd, J=8.0, 7.6 Hz, 1H), 7.59 (d, J=8.3 Hz, 2H), 7.53 (br, 1H), 7.28 (dd, J=7.6, 0.9 Hz, 1H), 7.22 (d, J=8.0 Hz, 2H), 2.92 (t, J=8.1 Hz, 2H), 2.38 (s, 3H), 1.88 (tq, J=7.6, 7.3 Hz, 2H), 1.03 (t, J=7.3 Hz, 3H)
APCI-MS (m/z): 406.9 [M]$^+$ (Evaluation Test for Cucumber Powdery Mildew)

Each of the fluorine-containing pyrimidine compounds prepared in Examples 32 and 36 was dissolved in acetone and diluted to a concentration of 500 ppm. Subsequently, a cucumber leaf disc (20 mm in diameter) was put into the diluted acetone solution and completely wetted, and then the cucumber leaf disc was placed so that the back surface of the cucumber leaf disc was in contact with a plain agar medium that had been prepared separately, and air-dried. After air-drying, a spore suspension of the cucumber powdery mildew was uniformly sprayed on the cucumber leaf disc and air-dried. The cucumber leaf disc was then left in a thermostat (25° C., 12 hours illumination), and after 14 days, the area of lesions was examined to calculate the control value. The results are shown in Table 1. Note that the control value was calculated according to the following formula. In the following formula, "untreated" means that a cucumber leaf disc was wetted with only acetone as a test solution, and "untreated section" means a section of the wetted cucumber leaf disc.

TABLE 1

| Test compound | Control value |
| --- | --- |
| Example 32 | 57.1 |
| Example 36 | 67.9 |

Control value = {(average of disease area in untreated section − average of disease area in treated section)/ average of disease area in untreated section} × 100  [Expression 1]

As shown in Table 1, it can be seen that the fluorine-containing pyrimidine compound in the present disclosure exhibits a disinfecting effect on pathogenic bacteria of cucumber powdery mildew and is effective as a compound exhibiting biological activity, especially as a bactericide.

The invention claimed is:

1. A fluorine-containing pyrimidine compound represented by the following general formula (1), (2), or (3):

[Formula 1]

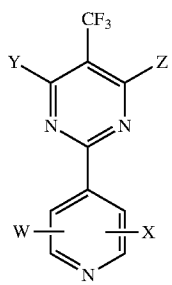

(1)

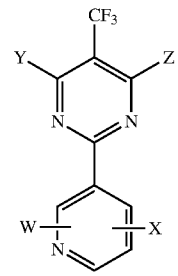

(2)

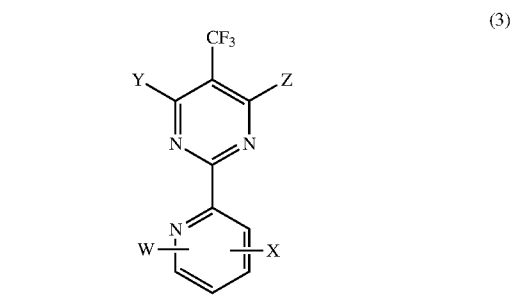

(3)

wherein:

W and X each independently represent a hydrogen atom, a halogen atom, a hydrocarbon group having 1 to 10 carbon atoms, $-C_nF_{2n+1}$ where n is an integer of 1 to 10, a nitro group, $-OA^1$, $-SO_mA^1$ where m is an integer of 1 to 3, $-SA^1$, $-NA^1A^2$, $-B(OA^1)(OA^2)$, $-COA^1$, $-COOA^1$, or $-CONA^1A^2$;

Y represents a halogen atom, a hydrocarbon group having 1 to 10 carbon atoms, $-C_nF_{2n+1}$ where n is an integer of 1 to 10, a cyano group, a nitro group, $-OA^1$, $-SO_mA^1$ where m is an integer of 1 to 3, $-SA^1$, $-NA^1A^2$, $-B(OA^1)(OA^2)$, $-COA^1$, $-COOA^1$, or $-CONA^1A^2$;

Z represents a halogen atom or $-OA^3$;

$A^1$ and $A^2$ each independently represent a hydrogen atom or a hydrocarbon group having 1 to 10 carbon atoms; and $A^3$ represents a hydrocarbon group having 1 to 12 carbon atoms.

2. The fluorine-containing pyrimidine compound according to claim 1, wherein each of W and X is a hydrogen atom.

3. A fluorine-containing pyrimidinone compound represented by the following general formula (31), (32) or (33):

[Formula 2]

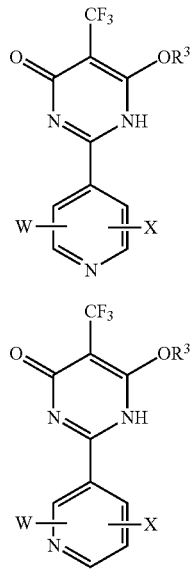

(31)

(32)

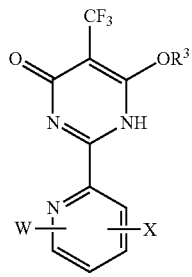

(33)

wherein:
R³ represents a hydrogen atom or a hydrocarbon group having 1 to 12 carbon atoms;
W and X each independently represent a hydrogen atom, a halogen atom, a hydrocarbon group having 1 to 10 carbon atoms, —$C_nF_{2n+1}$ where n is an integer of 1 to 10, a nitro group, —$OA^1$, —$SO_mA^1$ where m is an integer of 1 to 3, —$SA^1$, —$NA^1A^2$, —$B(OA^1)(OA^2)$, —$COA^1$, —$COOA^1$, or —$CONA^1A^2$; and
$A^1$ and $A^2$ each independently represent a hydrogen atom or a hydrocarbon group having 1 to 10 carbon atoms.

4. The fluorine-containing pyrimidinone compound according to claim 3, wherein each of W and X is a hydrogen atom.

* * * * *